US008208654B2

(12) United States Patent
Coutinho et al.

(10) Patent No.: US 8,208,654 B2
(45) Date of Patent: Jun. 26, 2012

(54) NOISE CANCELLATION FOR WIRELESS AUDIO DISTRIBUTION SYSTEM

(75) Inventors: Roy S. Coutinho, North Babylon, NY (US); Lawrence Richenstein, Brookville, NY (US)

(73) Assignee: Unwired Technology LLC, Woodbury, NY (US)

(*) Notice: Subject to any disclaimer, the term of this patent is extended or adjusted under 35 U.S.C. 154(b) by 1087 days.

(21) Appl. No.: 11/747,080

(22) Filed: May 10, 2007

(65) Prior Publication Data

US 2007/0242834 A1 Oct. 18, 2007

Related U.S. Application Data

(63) Continuation-in-part of application No. 11/266,900, filed on Nov. 4, 2005, now Pat. No. 7,359,671, which is a continuation-in-part of application No. 10/691,899, filed on Oct. 22, 2003, now Pat. No. 6,987,947, and a continuation-in-part of application No. 10/189,091, filed on Jul. 3, 2002, now Pat. No. 7,076,204.

(60) Provisional application No. 60/747,090, filed on May 11, 2006, provisional application No. 60/420,375, filed on Oct. 22, 2002, provisional application No. 60/350,646, filed on Jan. 22, 2002, provisional application No. 60/347,073, filed on Jan. 8, 2002, provisional application No. 60/340,744, filed on Oct. 30, 2001.

(51) Int. Cl.
*H04B 3/00* (2006.01)

(52) U.S. Cl. ............. 381/81; 381/71.4; 381/77; 381/78; 381/71.6; 381/85; 381/123

(58) Field of Classification Search .................. 381/309, 381/74, 77–80, 94.1–94.7, 71.1–71.4, 71.5, 381/86, 389, 71.6, 81, 85, 123; 455/569.1, 455/570
See application file for complete search history.

(56) References Cited

U.S. PATENT DOCUMENTS

| | | | | |
|---|---|---|---|---|
| 5,089,826 | A | 2/1992 | Yano et al. | |
| 5,481,615 | A * | 1/1996 | Eatwell et al. | 381/71.6 |
| 5,621,458 | A | 4/1997 | Mann et al. | |
| 5,732,074 | A | 3/1998 | Spaur et al. | |
| 5,872,588 | A | 2/1999 | Aras et al. | |
| 5,970,386 | A | 10/1999 | Williams | |
| 5,970,390 | A | 10/1999 | Koga et al. | |
| 6,067,570 | A | 5/2000 | Kreynin et al. | |
| 6,122,617 | A | 9/2000 | Tjaden | |
| 6,128,668 | A | 10/2000 | Barber et al. | |
| 6,154,658 | A | 11/2000 | Caci | |
| 6,212,282 | B1 | 4/2001 | Mershon | |
| 6,215,981 | B1 | 4/2001 | Borchardt et al. | |
| 6,230,295 | B1 | 5/2001 | Watkins | |
| 6,243,427 | B1 | 6/2001 | Stockton et al. | |
| 6,301,513 | B1 | 10/2001 | Divon et al. | |

(Continued)

*Primary Examiner* — Devona Faulk
*Assistant Examiner* — Disler Paul
(74) *Attorney, Agent, or Firm* — Reed Smith LLP

(57) ABSTRACT

A wireless audio distribution system may have a wireless transmitter, responsive to a plurality of audio input channels, for transmitting signals carrying the audio, a receiver, responsive to the transmitted signals for selecting one or more of the audio input channels to be reproduced in accordance with local setting selectors at the receiver. Speaker audio channel anti-noise signals can be subtracted from the head audio channel to cancel the noise related to the playing of the speaker audio on the speakers while the headset audio is played on the headset. Analog anti-noise signals can be produced by use of a microphone associated with the headset and later subtracted from the headset audio.

10 Claims, 24 Drawing Sheets

U.S. PATENT DOCUMENTS

| | | | | |
|---|---|---|---|---|
| 6,314,289 | B1 | 11/2001 | Eberlein et al. | |
| 6,452,483 | B2 | 9/2002 | Chen et al. | |
| 6,466,832 | B1 | 10/2002 | Zuqert et al. | |
| 6,510,182 | B1 | 1/2003 | Lee et al. | |
| 6,519,448 | B1 | 2/2003 | Dress et al. | |
| 6,609,039 | B1 * | 8/2003 | Schoen | 700/94 |
| 6,614,849 | B1 | 9/2003 | Chan et al. | |
| 6,671,325 | B2 | 12/2003 | Lee et al. | |
| 6,687,683 | B1 | 2/2004 | Harada et al. | |
| 6,741,659 | B1 | 5/2004 | Chan et al. | |
| 6,882,492 | B1 | 4/2005 | Lee | |
| 6,980,663 | B1 * | 12/2005 | Linhard | 381/86 |
| 6,987,947 | B2 | 1/2006 | Richenstein et al. | |
| 7,706,821 | B2 * | 4/2010 | Konchitsky | 455/501 |
| 7,983,428 | B2 * | 7/2011 | Ma et al. | 381/94.7 |
| 2006/0262935 | A1 * | 11/2006 | Goose et al. | 381/17 |

* cited by examiner

NOISE CANCELLATION FOR WIRELESS AUDIO DISTRIBUTION SYSTEM

CROSS REFERENCE TO RELATED APPLICATIONS

This application claims priority of Provisional Application No. 60/747,090, filed on May 11, 2006 and is a Continuation in Part of application Ser. No. 11/266,900, filed on Nov. 4, 2005, now U.S. Pat. No. 7,359,671 which is a Continuation-in-Part of application Ser. No. 10/691,899 filed on Oct. 22, 2003, now U.S. Pat. No. 6,987,947 which claims priority of International Application No. PCT/US 03/00566 filed Jan. 8, 2003 and Provisional Application No. 60/420,375 filed Oct. 22, 2002; which is a Continuation-in-Part of application Ser. No. 10/189,091 filed Jul. 3, 2002 now U.S. Pat. No. 7,076,204 which claims priority of Provisional Application No. 60/350,646 filed Jan. 22, 2002, Provisional Application No. 60/347,073 filed Jan. 8, 2002, and Provisional Application No. 60/340,744 filed Oct. 30, 2001.

BACKGROUND OF THE INVENTION

1. Field of the Invention

This invention relates to wireless communication systems, and more particularly to wireless audio and video systems for providing a plurality of selectable audio-video signals from one or more sources to one or more listeners in an automobile, airplane, or building.

2. Description of the Prior Art

Wireless audio systems currently known and available generally include an audio source such as a tuner transmitting a signal to one or more wireless headphones, wherein the signal carries a single stereo channel of audio data. To select a different channel of audio data, someone must operate the tuner to transmit the newly desired channel, at which point all wireless headphones receiving the signal will begin reproducing the new channel.

Dual-channel systems are currently known. For instance, the Two-Channel Automotive Infrared Headphone System marketed by Unwired Technology LLC provides an infrared transmitter that may be connected to two stereo sources and that will transmit a different IR signal for each channel. Wireless headphones are provided with a channel A/B selector switch to allow the user of the headphone to select among the two channels. This system requires two separate stereo sources, and relies on IR LEDs of different frequencies (i.e. color) the differentiate between the two channels of audio. This system also requires installation of the transmitter at a location where the two signals being broadcast may be received at any location within the vehicle.

Wireless video systems are also known.

What is needed is an improved wireless communication system including one or more wireless reception devices such as headphones, wherein the system offers multiple channels of audio and video signals, and other data, for individual selection therebetween by each respective reception device. The system should occupy a minimum of space within the home or vehicle, and should ideally be flexible enough to allow both analog and digital communications and minimize interference between different signals transmitted concurrently.

SUMMARY OF THE INVENTION

A noise canceling wireless audio distribution system is disclosed which includes a plurality of monaural and/or stereo audio channels, a selection switch for selecting a speaker audio channel, from the plurality of audio channels, to be played on a plurality of speakers in a vehicle, a wireless transmitter for transmitting a serial bitstream including at least a subset of the plurality of audio channels combined with digital control codes, a wireless receiver responsive to the serial bitstream for selecting, and playing on a headset associated with the wireless receiver, a headset audio channel from the plurality of audio channel and a noise cancellation processor in the headset, for canceling noise related to the playing of the speaker audio channel on the speakers while the headset audio channel is played on the headset in accordance with the control codes in the serial bitstream, by subtracting speaker anti-noise signals related to the wirelessly received speaker audio channel from the headset audio channel being played.

Operation of the selector switch to select the speaker audio channel may cause the speaker audio channel to be identified by the wireless receiver in the serial bitstream. Operation of the selector switch to select the speaker audio channel causes the speaker audio channel to be included in the serial bitstream in a known position related to the other audio channels.

The noise cancellation processor may include a correction table for modifying the wirelessly received speaker audio channels, in accordance with a path between the headset and at least one of the plurality of speakers, to develop the anti-noise signals.

The system may include at least one microphone associated with the headset for detecting ambient audio. The characteristics of the path may be applied to the correction table in response to the detected ambient audio. A correction table generator may be provided for controlling the correction table in accordance with the wirelessly received speaker audio. The correction table generator may be responsive to ambient audio to produce an analog anti-noise signals to be subtracted from the headset audio channel. A digital to analog converter may be provided for converting the headset audio channel, after the speaker anti-noise signals have been subtracted therefrom, to analog signals so that the analog anti-noise signals can be subtracted therefrom to produce analog headset audio to be played by the headset.

These and other features and advantages will become further apparent from the detailed description and accompanying figures that follow. In the figures and description, numerals indicate the various features, like numerals referring to like features throughout both the drawings and the description.

DETAILED DESCRIPTION OF THE INVENTION

Figure 1:
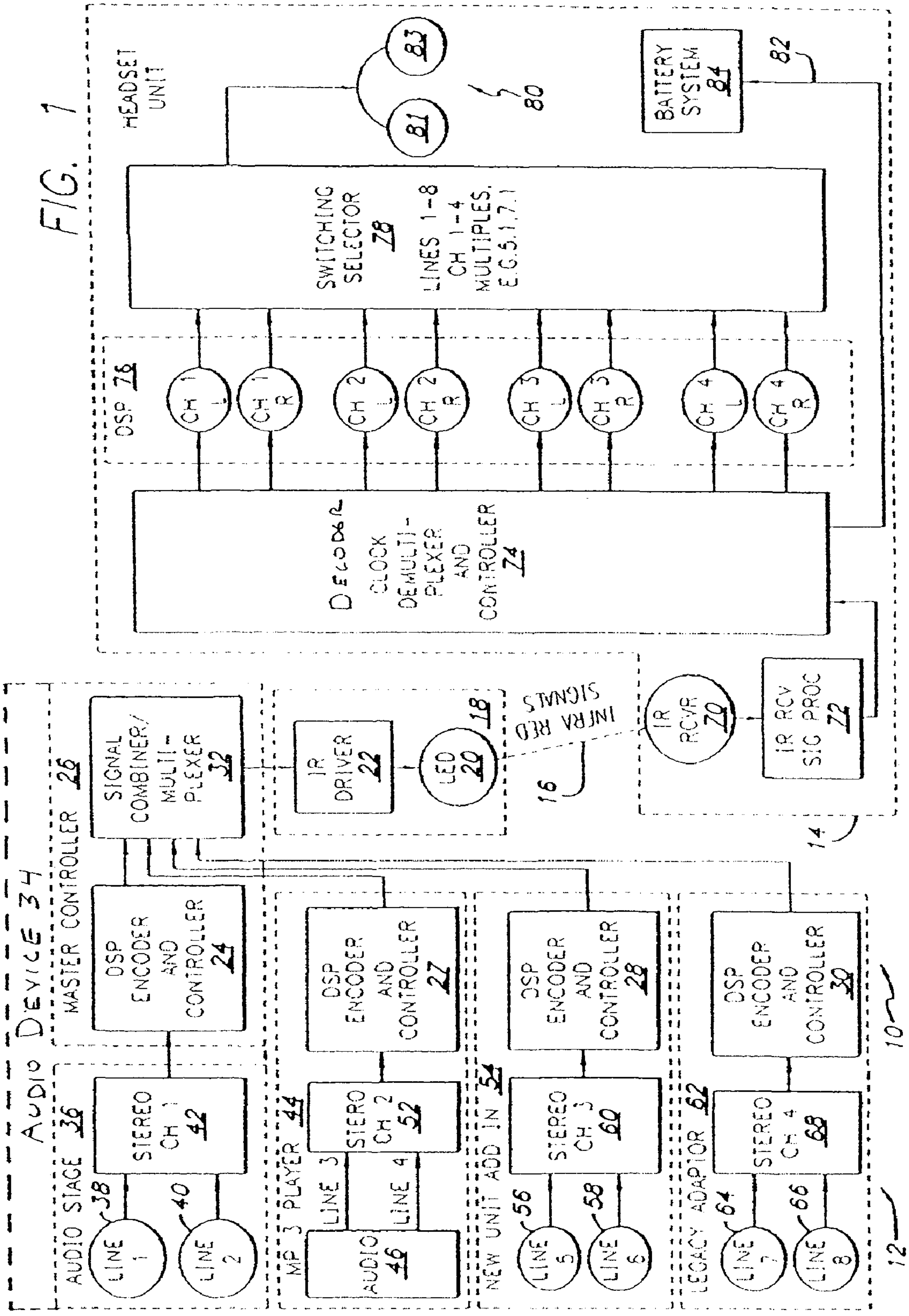
FIG. 1 is a block diagram of wireless headphone system.

Referring to FIG. 1, one embodiment of a wireless communication system disclosed is wireless headphone system 10 that includes transmitter subsystem 12 that communicates with headset unit 14 via infra-red (IR) or radio frequency (RF) signals 16, preferably a formatted digital bit stream including multi-channel digitized audio data, calibration data as well as code or control data. The data being transmitted and received may comply with, or be compatible with, an industry standard for IR data communications such as the Infra Red Data Association or IRDA.

Transmitter subsystem 12 IR transmitter section 18 including IR transmitter 20, such as an infra-red light emitting diode or LED, driven by an appropriate IR transmitter driver 22 receiving digitized audio data from one or more digital signal processors, or DSPs, such as DSP encoder and controller 24, 27, 28 and/or 30. The digital data stream provided by IR transmitter section 18 is preferably formatted in accordance with any one of the proprietary formats described herein below with reference to FIGS. 3, 10 and 16.

The digitized audio data may be applied to IR transmitter driver 22 from a plurality of such DSP encoder and controllers that are combined in signal combiner/multiplexer 32 that may be separately provided, combined with IR transmitter section 18 or combined with DSP encoder and controller 24 in master controller 26. Master controller 26 may be included within a first audio device, such as audio device 34 as shown, provided as a separate unit or included within IR transmitter section 18.

In a system configuration in which master controller 26 is included within audio device 34, wireless headphone system 10 including audio device 34, IR transmitter section 18 and headset unit 14 may advantageously serve as a base or entry level system suitable for use as a single channel wireless headphone system that, in accordance with the proprietary formats described herein below with regard to FIGS. 3, 10 and 16 may be easily upgraded for use as a multi-channel wireless headphone system. For illustrative purposes, audio device 34 is depicted in FIG. 1 as including audio stage 36, having first and second audio sources such as line 1 source 38 and line 2 source 40 each connected to stereo processing circuitry such as stereo channel 1 circuitry 42, the output of which is applied to master controller 26. Audio device 34 thereby represents any audio, video or data source including mono and stereo radios, CD and cassette players, mini-disc players, as well as the audio portions of electronic devices that provide other types of signals such as computers, television sets, DVD players and the like.

Whether included as part of an initial installation, or later upgraded, a second audio source, such as MP3, WMA, or other digital audio format player 44, may be included within wireless headphone system 10 to provide a second channel of stereo audio signals. In particular, MP3 player 44 may conveniently be represented by audio stage 46 that provides line 3 source 48 and line 4 source 50 to stereo channel circuitry 52, the output of which may be a line out, speaker out or headphone out port. As shown in FIG. 1, the output of stereo channel circuitry 52 may be applied to DSP encoder and controller 27 for combining in signal combiner/multiplexer 32 of master controller 26 included within audio device 34. In this manner, an unmodified conventional stereo audio source such as MP3 player 44 may be added to wireless headphone system 10 by use of an add on DSP device such as DSP encoder and controller 27.

Alternately, a DSP device included within an audio source for other purposes, such as related to the production of a digitized audio signal, may be programmed to provide the control and formatting required for providing an additional channel of data for wireless headphone system 10. In particular, new unit add in device 54 is shown as an exemplar of an audio source in which an included DSP has been programmed for compatibility with the proprietary format described herein below with regard to FIG. 3. Device 54 generally includes line 5 source 56 as well as line 6 source 58, both connected through stereo channel circuitry 60 to DSP encoder and controller 28 for application to signal combiner/multiplexer 32.

Similarly, an analog audio device may be included in wireless headphone system 10 by use of a legacy adapter, such as legacy adapter 62. Legacy adapter 62 is illustrated as including line 7 analog audio input 64 and line 8 analog audio input 66 both connected to stereo channel circuitry 68 for application to DSP encoder and controller 30. It should be noted that any one of the audio inputs designated as lines 1 through 8, may be paired as stereo input lines, used singly as separate monaural inputs, or in any other convenient combinations of stereo and mono inputs or as part of a more complex audio format, such as a home theater 5.1 or 7.1 system. Any one or more of lines 1 through 8 may also be used to transmit non-audio data, as described in more detail elsewhere herein.

As depicted in FIG. 1, wireless headphone system 10 may include one or more digital audio sources and may also include one or more analog audio sources. As shown, transmitter subsystem 12 may include a single digital signal combiner, such as signal combiner/multiplexer 32, fed by digital signals from each of a plurality of DSPs, such as DSP encoder and controllers 24, 27, 28 and 30. An alternate configuration of transmitter subsystem 12 using analog signal inputs will be described below in greater detail with respect to FIG. 2.

Still referring to FIG. 1, IR transmitter 20 in IR transmitter section 18 produces a digital bit stream of IR data, designated as IR signals 16, from a convenient location having a direct line of sight path to IR receiver 70 in headset receiver unit 14. In a home theater application, IR transmitter 20 might conveniently be located at the top of a TV cabinet having a clear view of the room in which the listener will be located. In a vehicular application, IR transmitter 20 could be located in a dome light in the center of the passenger compartment, or may be a separate component mounted at a desirable and practicable location (such as near the dome light). In a larger area in which multiple headset receiver units 14 are to be driven by the same IR transmitter 20, IR transmitter section 18 may include a plurality of IR transmitters 20 each conveniently located to have a direct line of sight path to one or more headset receiver units 14. In other embodiments, as described elsewhere with regard to FIG. 17, IR transmission repeaters may be provided to relay the digital bit stream transmitted by a single transmitter 20 over longer distances or around obstacles that may otherwise block the direct line(s) of sight from transmitter 20 to any one or more of headset receiver units 14.

In many applications, the output of IR receiver 70 may conveniently be processed by IR received signal processor 72. In either event, after being received, IR signals 16 are then applied to decoder 74, containing a clock, de-multiplexer, and controller, for processing to provide separate digital signals for stereo channels 1-4 to be applied to DSP 76 for processing. DSP 76 may conveniently be a multiplexed DSP so that only a single DSP unit is required. Alternately, a plurality of DSP units or sub units may be provided.

The stereo audio channels 1-4 may conveniently each be processed as individual left and right channels, resulting in channels 1L, 2R, 2L, 2R, 3L, 3R, 4L and 4R as shown. It should be noted, as discussed above that each of these audio channels may be used as a single monaural audio, or data channel, or combined as shown herein to form a sub-plurality of stereo channels. The resultant audio channels are then made available to switching selector 78 for selective application to wireless headphone headset earphones, generally designated as headphones 80.

In general, switching selector 78 may be conveniently used by the listener to select one of stereo channels 1-4 to be applied to headphones 80. Alternately, one or more of the stereo channels can be used to provide one or two monaural channels that may be selected by the listener, or in specific circumstances automatically selected upon the occurrence of a particular event. In the event headphones 80 are equipped to receive four (or any other number of) stereo audio channels, but a lesser number of channels are available for transmission by audio device 34, the number of actual channels being transmitted may be incorporated into the digital bit stream of signals 16, and the headphones may then allow a user to select only those channels that are available (e.g. if only two channels are being transmitted, the user would only be able to toggle between these two channels, without having to pass through two or more "dead" channels).

For example, switching selector 78 may be configured to permit the listener to select one of three stereo channels, such as channels 1-3, while stereo channel 4L may be used to provide a monaural telephone channel and channel 4R may be used to provide an audio signal such as a front door monitor or a baby monitor. In the case of a baby monitor, for example, switching selector 78 may be configured to automatically override the listener's selection of one of the stereo channels to select the baby monitor audio whenever the audio level in the baby monitor channel exceeds a preset level. Further, a fixed or adjustable time period after the audio level in the baby monitor channel no longer exceeds the preset level, switching selector 78 may be configured to automatically return to the stereo channel earlier selected by the listener.

Alternately, stereo channels 1-3 may be utilized to provide an audio format, such as the 5.1 format used for home and professional theaters. In this type of format, a first stereo channel is used to provide a front stereo sound source located left and right of the video being displayed. Similarly, a second stereo channel may be used to provide a rear stereo sound source located left and right behind the listener. A so-called fifth channel may be a monaural channel providing a non-stereo sound source located at a center position between the left and right front stereo sources. A further monaural channel, representing the so-called "0.1" channel, may conveniently be a low frequency woofer or subwoofer channel whose actual location may not be very critical as a result of the lower audio frequencies being presented. Similarly, stereo channels 1-4 may be utilized to provide audio in the so-called 7.1 audio format.

Headphones 80 may conveniently be a pair of headphones speakers mounted for convenient positioning adjacent the listener's ears, particularly for use with wireless headphone system 10 configured for permitting user or automatic or override selection of a plurality of stereo or monaural channels. Headphones 80 may be used in this configuration to present audio to the listener in a format, such as the 5.1 format, by synthesis. For example, the center channel of the 5.1 format may be synthesized by combining portions of the front left and right channels.

Alternately, as described below with respect to FIG. 5, alternate configurations of headphones 80 may be used to provide a more desirable rendition of a particular format by providing a plurality of pairs of headphone speakers mounted in appropriate positions adjacent the listener's ears. For example, a first pair of speakers may be positioned in a forward position to reproduce the front left and right channels and to synthesize the center channel, a second pair of speakers may be positioned in a rearward position to reproduce the rear left and right channels, with a resonant chamber mounted to a headband supporting the speakers is used to provide the subwoofer (0.1) channel.

Referring now again to FIG. 1, decoder 74 may also be used to produce control signals used for providing additional functions. For example, control signals may be incorporated into the digital bit stream transmitted by audio device 34 for error checking, power saving, automatic channel selection, and other features as described elsewhere herein. In addition to audio signals provided to DSP 76, decoder 74 may also be used to provide power control signal 82 for application to battery system 84. In particular, in response to the decoding of a code contained in the proprietary formats discussed elsewhere, decoder 74 may provide a signal, such as power control signal 82, maintaining the application of battery power from battery system 84 to wireless headphone system 10. Thereafter, when the coded signal has not been received for an appropriate time period, battery power would cease to be applied to system 10 to provide an automatic auto-off feature that turns off system 10 to preserve battery power when the sources of audio signals, or at least the formatted signals, are no longer present. This feature can conveniently be used in an application in which system 10 is used in a car. When the ignition of the car has been turned off, the power applied to headset receiver unit 14 from battery system 84 is stopped in order to preserve battery life. As discussed elsewhere, the automatic auto-off feature may also be invoked when an error checking feature detects a predetermined number of errors.

Figure 2:
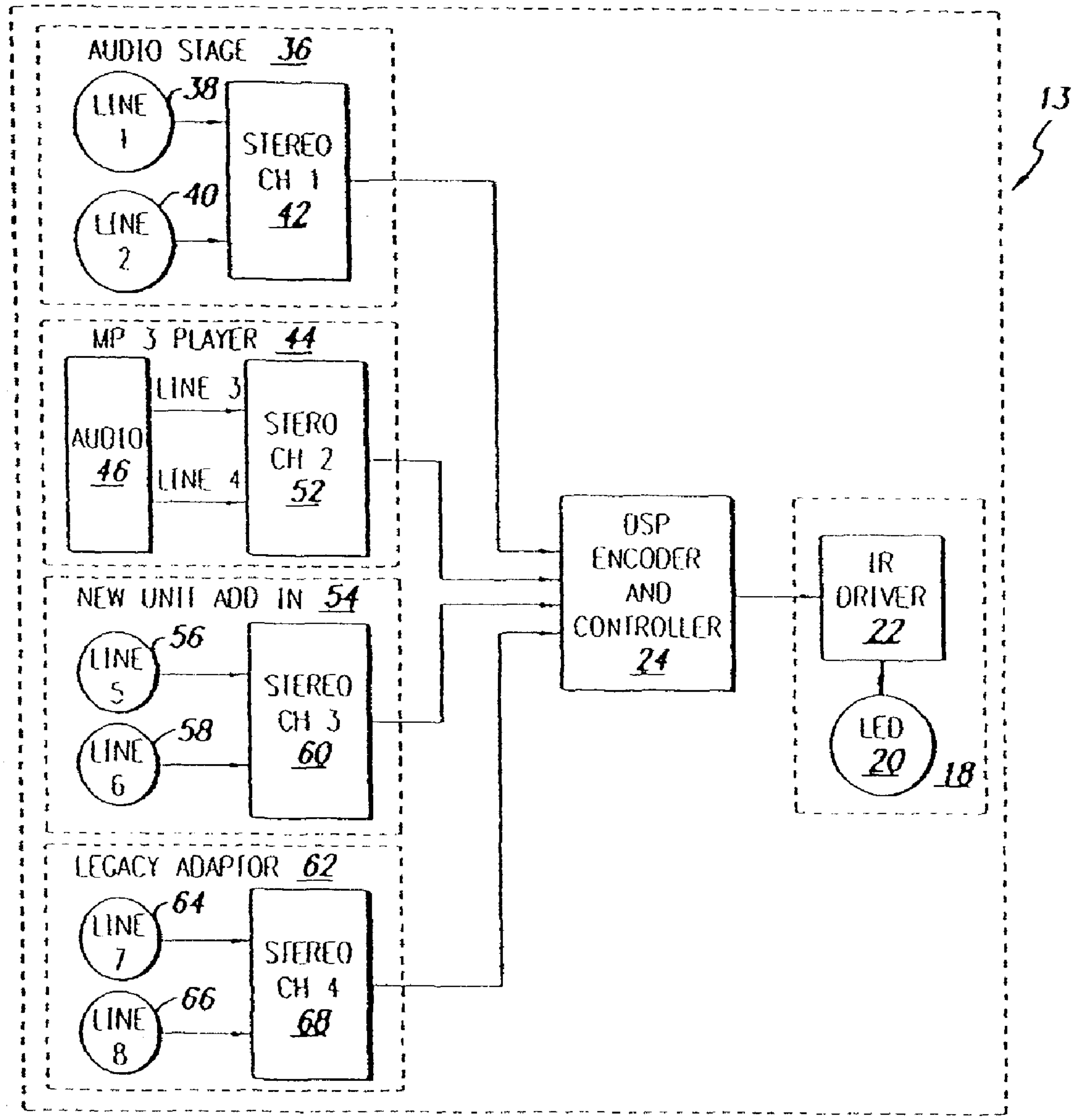
FIG. 2 is a block diagram of wireless headphone system 10 using an analog signal combining configuration.

Referring now to FIG. 2, in an alternative embodiment, transmitter subsystem 13 may be configured with a single DSP, for digitizing audio signals, that is programmed to provide signal combining and format control functions. In particular, the input to IR transmitter section 18 may be provided directly by a properly configured DSP encoder and controller 24 that receives as its inputs, the analog audio signal pairs from stereo channels 1, 2, 3 and 4 provided by stereo integrated circuits, or ICs, 42, 52, 60 and 68, respectively. As alternatives to the use of a DSP, any practicable means for performing the functions herein described, including any other electronic circuit such as a gate array or an ASIC (Application Specific Integrated Circuit) also may be employed. For ease of understanding, however, the term DSP is used throughout this specification.

The source of stereo inputs for stereo channel circuitry 42 in audio stage 36 may conveniently be line 1 source 38 and audio stage 36. The source of stereo input for stereo channel circuitry 52 in MP3 player 44 may be line 3 source 48 and line 4 source 50, provided by audio stage 46. Similarly, the sources of stereo input for stereo channel circuitry 60 and 68 in new unit add in device 54 and legacy adapter 62 may be line 5 source 56 and line 6 source 58 as well as line 7 analog audio input 64 and line 8 analog audio input 66, respectively. It is important to note that all four stereo sources may be combined to provide the required audio signals for a complex format, such as 5.1, or one or more of such stereo channels can be used as multiple audio channels.

Figure 3:
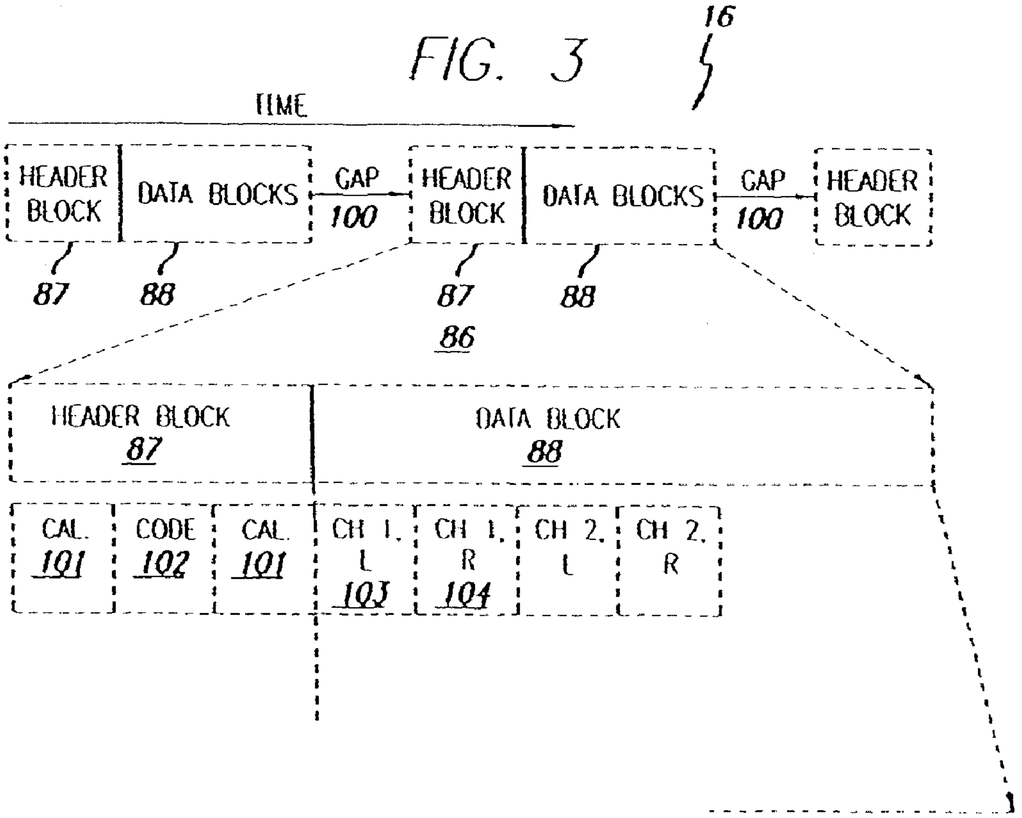
FIG. 3 is a block diagram of one embodiment of a data stream format used in a wireless headphone system, such as wireless headphone system 10 depicted in FIGS. 1 and 2.

Referring now to FIG. 3, the format or structure of IR signals 16 is shown in greater detail. IR signals 16 form a bit stream of digital data containing the digitized audio data for four stereo channels, as well as various calibration and control data. In one embodiment, IR signals 16 are an uncompressed stream of digital data at a frequency or rate of at least 10.4 MHz. Pulse position modulation (PPM) encoding is preferably used. This encoding increases the power level of pulses actually transmitted, without substantially increasing the average power level of the signals being transmitted, by using the position of the pulse in time or sequence to convey information or data. This power saving occurs because in PPM encoding, the same amount of information carried in a pair of bits at a first power level in an unencoded digital bitstream may be conveyed by a single bit used in one of four possible bit positions (in the case of four pulse position modulation, or PPM-4, encoding). In this way, the power level in the single bit transmitted in pulse position encoding can be twice the level of each of the pair of bits in the unencoded bitstream while the average power level remains the same.

As shown in FIG. 3, IR signals 16 include a plurality of transmitted signals (or packets, as described elsewhere herein) 86 separated from each other by gap 100 that may conveniently simply be a 16 bit word formed of all zeros. Gap 100 is useful to convey clocking information for synchronizing the receiver decoding to the clock rate of the transmitter, as described below in greater detail with respect to FIG. 4.

Transmitted signals or packets 86 may conveniently be partitioned into two sections, header section 87 and data section 88, as shown. Data section 88 may conveniently be composed of 25 samples of each of the 8 audio data streams included in the four stereo signals being processed. For example, data section 88 may include word 103 representing the sampled digital output or stereo channel 1, left while word 104 represents the sampled digital output of stereo channel 1, right, followed by representations of the remaining 3 stereo channels. This first described group of 8 digital words represents a single sample and is followed by another 24 sets of sequential samples of all 8 audio signals. In this example, each data section 88 includes 400 digital words to provide the 25 samples of audio data. If the data rate of the analog to digital, or A/D, conversion function included within DSP encoder and controller 24 shown in FIG. 1 is 16 bits, the first 8 bit word for each channel could therefore represent the high bit portion of each sample while the second 8 bit word could represent the low bit portion of the sample.

Referring now also to FIG. 1, if switching selector 78 is operated to select a particular monaural or stereo channel, such as channel 3, left, the known order of the samples may be utilized to reduce the energy budget of headset receiver unit 14. In particular, digital to analog (D/A) conversions may be performed during each data section 88 only at the time required for the selected audio or stereo channels such as channel 3, left. In this manner, because the D/A conversions are not being performed for all 8 monaural or 4 stereo channels, the power consumed by the D/A conversions (that are typically a substantial portion of the energy or battery system budget) may be substantially reduced, thereby extending battery and/or battery charge, life.

The organization of data block 92 described herein may easily be varied in accordance with other known data transmission techniques, such as interleaving or block transmission. Referring specifically to FIG. 3, in one embodiment each transmitted packet 86 may include header section 87 positioned before data section 88. Each header section 87 may include one or more calibration sections 101 and control code sections 102. In general, calibration sections 101 may provide timing data, signal magnitude data, volume and/or frequency data as well as control data related, for example, to audio format or other acoustic information. Control code sections 102 may include information used for error detection and/or correction, automatic channel selection, automatic power-off, and other features of system 10. Another preferred embodiment is described elsewhere herein with reference to FIG. 12.

In particular installations, desired acoustic characteristics or the actual acoustic characteristics of the installed location of transmitter subsystem 12 may be synthesized or taken into account for the listener. For example, the relative positions including azimuth and distance of the various sound sources or speakers to the listener, in a particular concert hall or other location, may be represented in the calibration data so that an appropriate acoustic experience related to that concert hall may be synthesized for the listener using headset receiver unit 14 by adjusting the relative delays between the channels. Such techniques are similar to those used to establish particular audio formats such as the 5.1 format.

Alternately, undesirable acoustic characteristics, such as the high pitched whine of an engine, the low pitched rumble of the road or airplane noise, that may penetrate the acoustic barrier of headphones 80 may be reduced or eliminated by proper use of the calibration data. This synthesis or sound modification may be controlled or aided by information in calibration portions or IR signals 16, such as calibration sections 101, and/or controlled or adjusted by the listener by proper operation of switching selector 78, shown in FIG. 1.

Similarly, the acoustic experiences of different types or styles of headphones 80 may be enhanced or compensated for. Conventional headphone units typically include a pair of individual speakers, such as left and right ear speakers 81 and 83 as shown in FIG. 1. A more complex version of headphones 80, such as multi-channel headphones 118 described below in greater detail with respect to FIG. 5, may benefit from calibration data included in calibration sections 98.

Techniques for adjusting the listener's acoustic experience may be aided by data within calibration sections 101, and/or by operation of switching selector 78, as noted above, and also be controlled, adjusted or affected by the data contained in control code section 102. Control code data 102 may also be used for controlling other operations of system 10, such as an auto-off function of battery system 84, error detection and/or correction, power saving, and automatic available channel selection.

Figure 4:
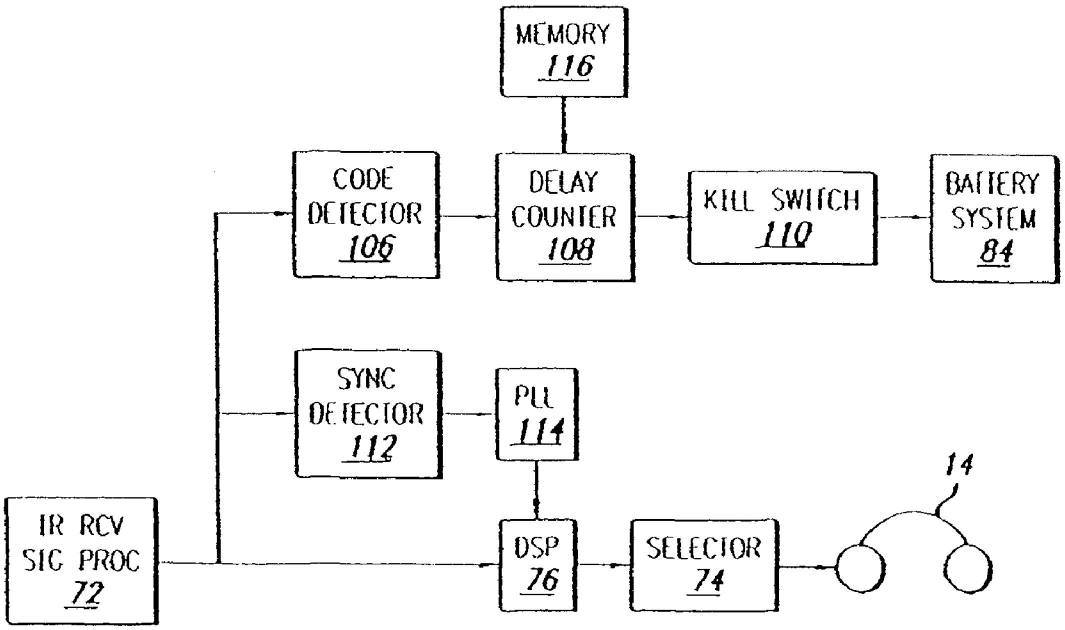
FIG. 4 is a block diagram schematic of one embodiment of a receiver or headset unit, such as headset receiver unit 14 depicted in FIG. 1.
Figure 5:
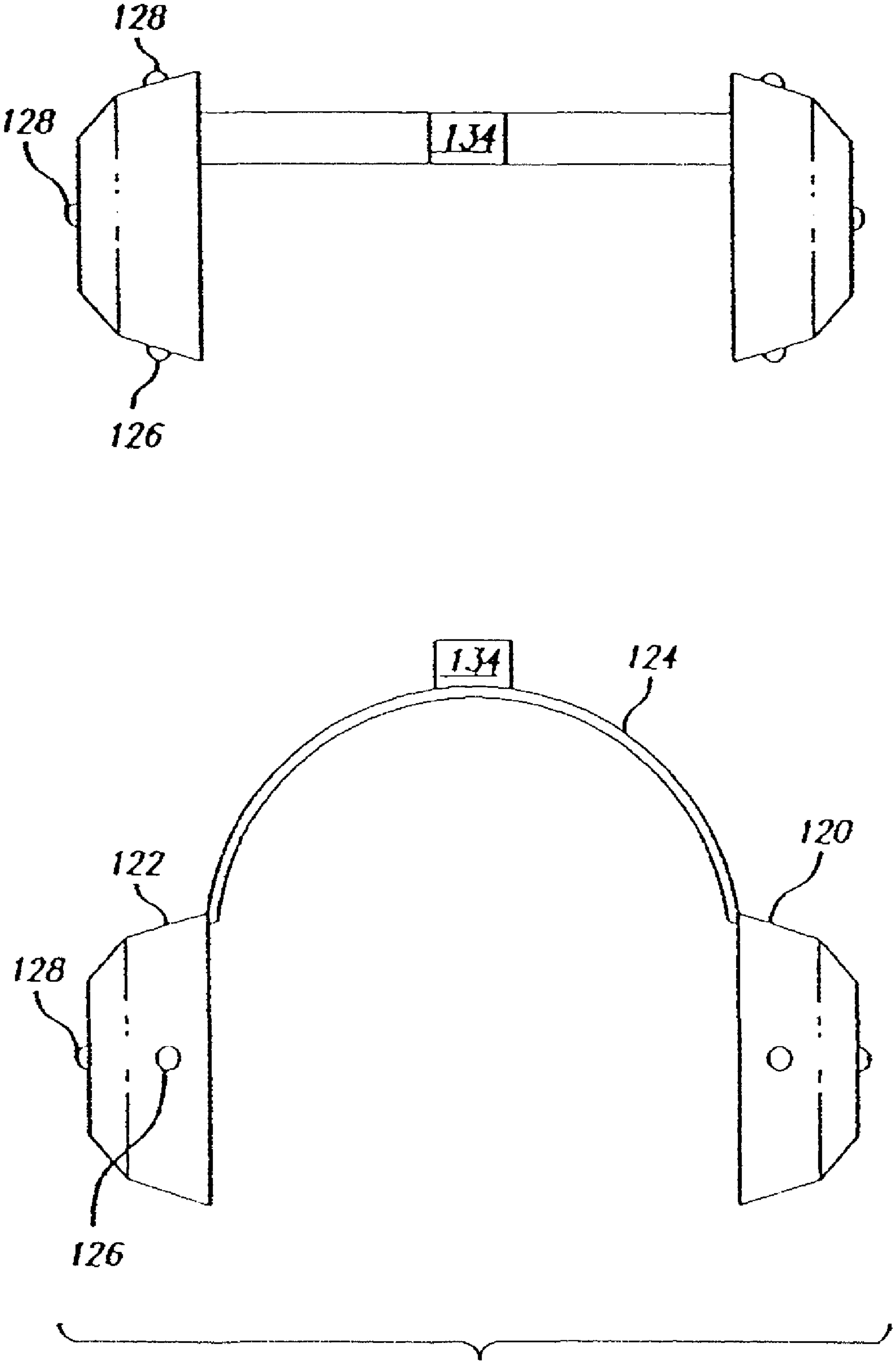
FIG. 5 includes top and front views of one embodiment of multi-channel headphones for use in system 10.

Referring now to FIGS. 4, 5 and 1, IR data in processed IR packets 86, such as data section 88, may conveniently be applied to DSP 76, via decoder 74, for conversion to analog audio data. IR data in header section 87 may be further processed by other circuits, conveniently included within or associated with decoder 74, for various purposes.

For use in an auto-off function, the portion of the IR data processed by IR received signal processor 72 including control code section 102 may be applied to code detector 106 to detect the existence of a predetermined code or other unique identifier. Upon detection of the appropriate code, delay counter 108 may be set to a predetermined delay, such as 30 seconds. Upon receipt of another detection of the selected code, delay counter 108 may then be reset to the predetermined delay. Upon expiration of the predetermined delay, that is, upon expiration of the predetermined delay with recognition of the pre-selected auto-off control word, a signal may be sent to kill switch 110 that then sends power control signal 82 to battery system 84 to shut off headset unit 14.

In operation, the above described procedure serves to turn off the battery power for headset unit 14 unless an appropriate code signal has been recognized within the previous 60 seconds. The auto-off function may therefore be configured to turn off battery power 60 seconds (or any other predetermined period) after the cessation of accurate IR data transmissions by transmitter subsystem 12. As described elsewhere, system 10 may incorporate error detection methods. In such an embodiment, the auto-off function may also be configured to turn off battery power after a predetermined number and/or type of errors has been detected. This approach provides an advantageous auto-off function that may be used to save headset battery power by turning off the headphones a predetermined period after a radio, or other transmitter, in an automobile is turned off, perhaps by turning off the ignition of the car, or alternatively/additionally when too many transmission/reception errors have degraded audio performance to an unacceptable level. Headset unit 14 may also be configured to only power down upon detection of too many errors, wherein all processing ceases and is reactivated at predetermined intervals (e.g. 30 seconds) to receive a predetermined number of packets 86 and check for errors in these received packets. Headset unit 14 may further be configured to resume full, constant operation after receiving a preselected number of packets 86 having no, or below, a preselected number of errors.

In an advantageous mode, kill switch 110 may also be used to provide an auto-on function in the same manner by maintaining the power applied to IR received signal processor 72, delay counter 108 and code detector 106 if the power required thereby is an acceptable minimum. Upon activation of an appropriate signal source as part of transmitter subsystem 12, the predetermined code signal may be detected and power control signal 82 sent to battery system 84 to turn on the remaining unpowered systems in headset receiver unit 14.

Referring again to FIGS. 1 and 4, one important task in maintaining proper operation of system 10 is to maintain synchronization between the operations, particularly the sampling and/or A/D operations of transmitter subsystem 12 and the decoding and related operations of headset receiver unit 14. Although synchronization may be maintained in several different ways, it has been found to be advantageous particularly for use in a system (such as system 10) including a possible plurality of battery powered remote or receiver units (such as headset units 14) to synchronize the timing of the operations of headset receiver units 14 to timing information provided by transmitter subsystem 12 and included within IR signals 16 to assure that the synchronization was accurately achieved for multiple receiver units that may be replaced or moved between automobiles from time to time.

Referring still to FIGS. 4 and 5, IR data is applied from IR received signal processor 72 to synch detector 112 that may conveniently detect gap 100 by, for example, detecting the trailing edge of data section 88 in a particular transmitted packet 86 and, after an appropriate pre-selected delay or gap, detect the leading edge of header section 87 of a subsequent transmitted packet 86. Simple variations of this sync signal detection may alternately be performed by synch detector 112 by combining information related to the trailing edge, gap length and/or expected data content such as all 1's or all 0's or the like and the actual or expected length of the gap and/or the leading edge.

Upon detection of appropriate synchronization data, sync detector 112 may then maintain appropriate clocking information for headset receiver unit 14 by adjusting a clock or, preferably, maintaining synchronization by updating a phase lock loop circuit (or PLL), such as PLL 114. The output of PLL 114 may then be applied to DSP 76 for synchronizing the decoding and/or sampling of the IR data, for example, by controlling the clock rate of the D/A conversion functions of DSP 76. The resultant synchronized signals are then applied by switching selector 78 to headphones 80. Without such synchronization, the audio quality of the sounds produced by headphones 80 may be seriously degraded.

Another function that may be provided by decoder 74 includes updating the operation of headset receiver unit 14. In particular, upon recognition of an appropriate update code by code detector 106, the data in data section 88 from one or more subsequent transmitted signals or packets 86 may be applied by code detector 106 to an appropriate memory in headset receiver unit 14, such as rewritable memory 116. The data stored in memory 116 may then be used to control subsequent operations of headset receiver unit 14 by, for example, decoder 74.

The update function described above with respect to FIG. 4 may be used to revise or update headset receiver unit 14 for operating modes that vary the processing of data in multiple channel format, such as variations in the 5.1 or 7.1 audio format. Other uses of the update format may be in automatically selecting the language or age appropriate format used on various audio channels to control what is provided to a particular listener.

For example, system 10 may be used in a museum to provide information, in audio format, for one or more exhibits. Before a particular headset receiver unit 14 is provided to, or rented by, a museum visitor, that headset unit might be programmed by use of the update format to provide age appropriate audio for the listener to be using the headset unit.

Alternately, the updating may be performed upon rental of a headset unit to correspond to the audio services to be provided. A particular headset might be programmed to automatically activate upon receipt of an audio signal of a sufficient magnitude to indicate proximity to the exhibit to be described. One headset might be programmed to provide audio only for exhibits in a certain collection while other headsets might be programmed to receive all related audio. This programming or updating may easily be performed at the time of rental or other distribution for each headset.

Another use of the updating or programming function is to permit the reprogramming of a larger number of headsets at the same time. For example, continuing to use the museum exemplar, a paging system, emergency or other notification system may be implemented with the upgrade function so that museum patrons with a selected code in their headset, or all such patrons, may be selectively paged or notified of specified information, such as museum closing times or the procedure to follow upon declaration of an emergency such as a fire. In this way, such information may be provided in real time, from a simple telephone or paging interface, by controllably switching the audio produced in one or more selected headphones rather than by altering the audio being normally produced.

Another example of the use of the upgrade function might be to change codes that permit operation of the headphones, or related equipment, to prevent stealing or tampering with the headphones. Headphones being improperly removed from a listening chamber, such as a vehicle, may be programmed to issue a warning, to the listener or to others, upon passing through an exit. In order to prevent tampering with the headsets to foil such operations, the codes may be randomly or frequently changed.

A further use of the upgrade function is to permit headphone units to be sold or provided for use at one level and later upgraded to a higher level of operation. As one simple example, multi-channel headphones may be distributed without coding required to perform multi channel operation. Such headphones, although desirable for single channel operation, may then temporarily or permanently upgraded for higher performance upon payment of an appropriate fee.

Referring now to FIG. 5, top and front views of multi-channel headphones 118 use with system 10 are depicted in which left earphone system 120 and right earphone system 122 are mounted on head band 124 that is used to position the earphones on the listener's head. Each of the earphone systems includes a plurality of speakers, such as front speaker 126, center speaker 128 and rear speaker 130 as designated on right earphone system 122 together with effective aperture 132 and effective audio paths 134.

The apparent distances along effective audio paths 134 from speakers 126, 128 and 130 to effective aperture 132 in each earphone are controlled to provide the desired audio experience so that both the apparent azimuthal direction and distance between each speaker as a sound source and the listener is consistent with the desired experience. For example, audio provided by speakers 126 and 128 may be provided at slightly different times, with different emphasis on the leading and trailing edges of the sounds so that an apparent spatial relationship between the sound sources may be synthesized to duplicate the effect of home theater formatted performances. Although the spatial relationships for some types of sounds, like high frequency clicks, may be easier to synthesize than for other types of sounds, the effect of even partial synthesis of spatial sound relationships in a headset is startling and provides an enhanced audio experience.

In addition to the speakers noted above for use in stereo and multiple channel stereo formats, a low frequency, non-directional monaural source, such as sub woofer 134, may be advantageously mounted to headband 124 to enhance the user's audio experience.

Figure 6:
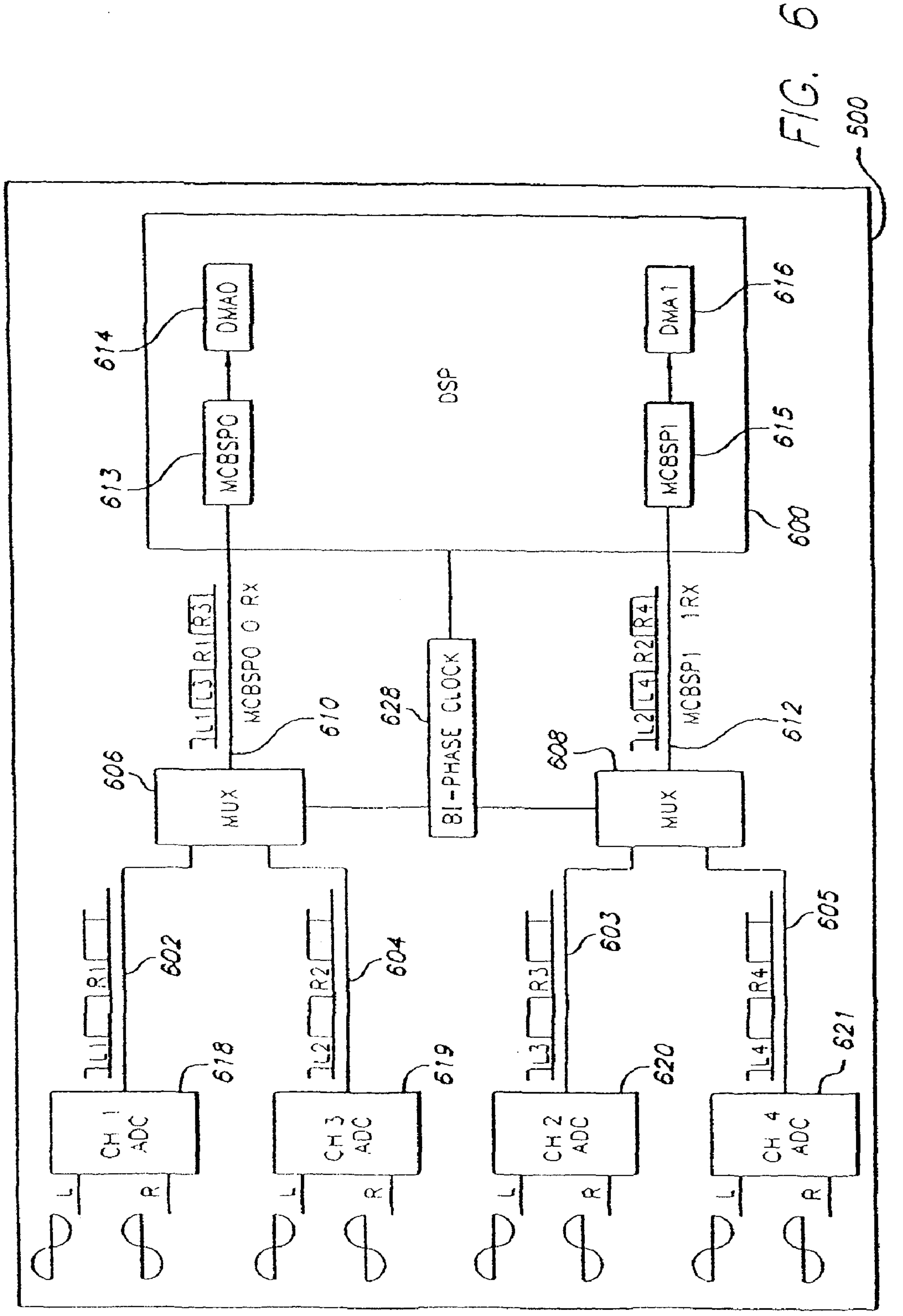
FIG. 6 depicts a functional block diagram of transmitter apparatus 500.

With reference now to FIG. 6, audio transmission device 500 includes single DSP 600 which may receive four digitized audio input streams 602, 603, 604, 605 multiplexed by two multiplexers 606, 608 into two signals 610, 612 for input into direct memory access (DMA) buffers DMA0 614 and DMA1 616 connected to serial ports 613, 615 of the DSP 600. Audio streams 602-605 may be digitized by analog-to-digital converters (ADCs) 618, 619, 620, 621 located for example in audio modules 622, 623, 624, 625 shown in FIG. 7. Audio device 34 and MP3 player 44 of FIG. 1 are typical examples of such audio modules. As noted above with respect to FIG. 1, audio devices utilizing multiple analog inputs provided to a single ADC, as well as multiple digital inputs that are provided directly to multiplexers such as multiplexers 606, 608, may be used.

Figure 7:
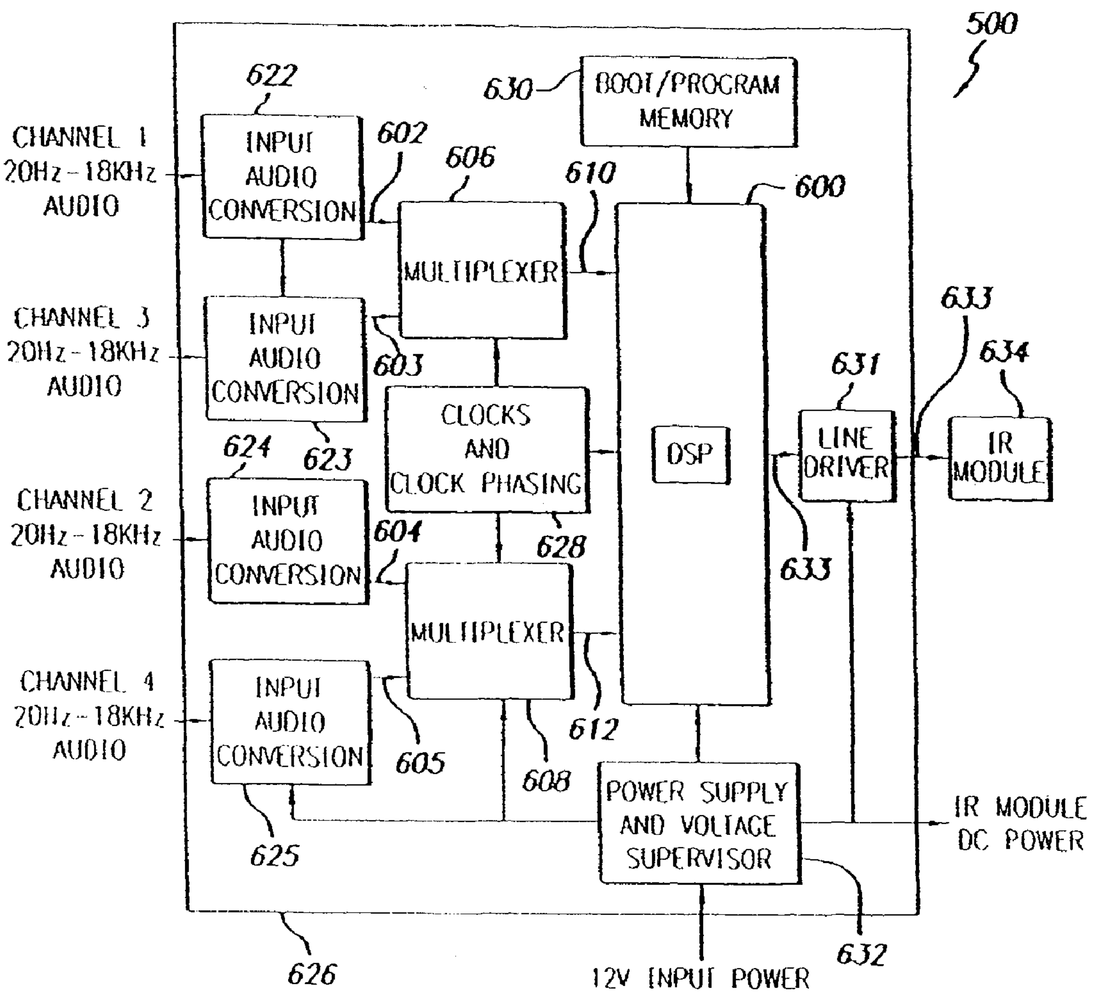
FIG. 7 depicts a hardware block diagram of encoder 626 of transmitter apparatus 500 of FIG. 6.

Referring to FIG. 7, the data multiplexing circuitry of audio transmission device 500 combines two channels of digitized data 602, 603 and 604, 605 into one serial data stream 610, 612 respectively. The data stream slots for two differently phased digital audio stereo pairs (two stereo pairs) 610, 612 are combined to create one constant digital data stream 633. The left/right clocking scheme for the audio modules, described in greater detail elsewhere herein, is configured such that two stereo channels (four analog audio input lines) share one data line. Outputs 602, 603 and 604, 605 of in-phase ADCs 618, 620 and 619, 621 are multiplexed with the 90 degrees phase shifted data. The higher ordered channels (Channels 3 and 4) are clocked 90 degrees out of phase of the lower channels (Channels 1 and 2). This allows two channels pairs (Channel 1 left and right and channel 3 left and right) to share a single data line. Two sets of serial digitized audio data are input to DSP 600. Both odd numbered channels are on the same serial line and both even numbered channels are on the same serial line. Clock and clock phasing circuitry 628 provides the input data line selection of multiplexers 606, 608.

With continued reference to FIG. 7, DSP 600, together with multiplexers 606, 608, may be provided in encoder 626 within transmitter 500. Encoder 626 accepts the four digitized audio inputs 602, 603, 604, 605 from audio modules 622, 623, 624, 625 and uses line driver 631 to send digitized serial data stream 633 to IR transmitter module 634 for transmission to headphones 80.

Encoder 626 also includes clock and clock phasing circuitry 628, boot/program memory 630, and power supply

632. DSP 600 serves as the central control for the encoder 626 circuitry, including control of all inputs and outputs of audio transmission device 500. A clocking divider provided within clocking circuit 628 is activated by DSP 600 to provide signals to drive the clocks for any audio modules (e.g. ADCs) and audio data inputs to the DSP. DSP 600 combines audio data 610, 612 from two serial sources (multiplexers 606, 608) and formats the audio data into single serial data stream 633 of data packets that is provided to line driver 631 to send to IR transmitter 634. In one embodiment, line driver 631 may be a differential line driver with an RS485 transceiver, and an inverter may be used to invert and buffer data from DSP 600. DSP 600 uses the base 10.24 MHz clock of clocking circuit 628 multiplied by a phase locked loop (PLL) internal to the DSP. In one embodiment the DSP clock speed is 8× MHz, but this may be reduced so as to reduce overall power consumption by audio transmission device 500.

With continued reference to FIG. 7, boot memory 630 stores the program memory for DSP 600 (that contains the software controlling the DSP) during shut down. An 8-bit serial EEPROM may be used as boot memory 630. Upon power up, the DSP may be programmed to search external memory circuits for its boot program to load and commence executing. Boot memory 630 is attached to multi-channel buffered serial port 615 (McBSP 1) of DSP 600. In alternative embodiments, the DSP software may be provided in DSP read-only-memory (ROM).

Figure 8:
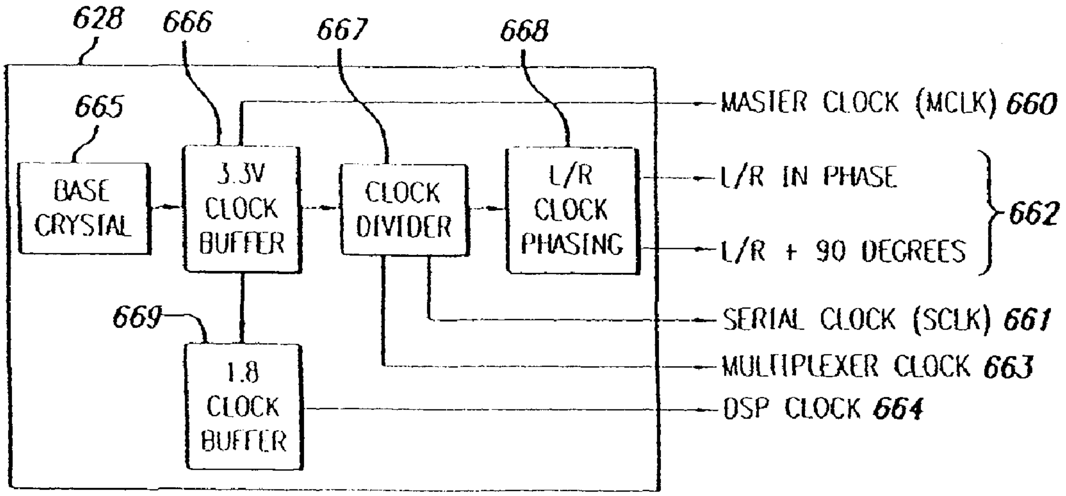
FIG. 8 is a functional block diagram of clock and clock phasing circuitry 628 of transmitter apparatus 500.

With reference now to FIG. 8, clock and clock phasing circuitry 628 develops all clocks required by encoder 626 and audio modules 622, 623, 624, 625. Four separate clocks are required for the DSP, audio data transfer and audio digitizing. These are master clock 660, serial clock 661, left/right clock 662 and multiplexer clock 663. Clock phasing is also required by multiplexers 606, 608 to multiplex digitized audio input streams 602, 603, 604, 605 as previously described with respect to FIG. 6. Master clock 660 is used to drive the master-synchronizing clock signal for the audio digitizing modules and the DSP. Master clock signal 660 is generated from stand-alone crystal oscillator circuit 660 and has buffered output 661. The master clock frequency is 10.24 MHz, which allows the derivation of the serial clock and left/right clock from the master clock. The serial clock is used to clock each individual bit of digitized audio input streams 602, 603, 604, 605 from audio modules 622, 623, 624, 625 into DSP 600. Serial clock signal 661 is derived from the master clock using one-fourth clock divider 667 to generate a clocking signal at a frequency of 2.56 MHz.

The left/right clock is used to clock the Left and Right data words from digital audio data streams 610, 612 generated by multiplexers 606, 608 for input to DSP 600, and to develop the DSP frame sync. Left/right clock signals 662 are derived from the master clock using clock divider 667 to generate a signal at a frequency that is 256 times slower than the master clock. Clock phasing circuitry 668 separates the left/right clock into two phases by providing a 90-degree phase shift for one of the left/right clocks. This allows two of the four audio modules 622, 623, 624, 625 to produce a 90-degree phase shifted output. The outputs of the in phase left/right clocked audio module outputs are multiplexed with the 90 degrees phase shifted data on one line. Each left/right clock phase serves as a separate frame sync for digitized audio input streams 602, 603, 604, 605 from audio modules 622, 623, 624, 625.

Multiplexer clock 663 is used by the multiplexer logic for toggling the selected input data lines to combine the digital audio packets in digitized audio input streams 602, 603, 604, 605 from audio modules 622, 623, 624, 625. Multiplexer clock signal 663 is also generated by clock divider 667. DSP clock signal 664 is used to drive DSP 600 and is generated by converting master clock signal 660 to a lower voltage (e.g. 1.8V from 3.3V), as required by the DSP, by buffer/voltage converter 669. Other clocking schemes may be used by changing the base crystal oscillator frequency (i.e. the 9.216 MHz base clock for a 40 KHz left/right clock may be changed to a 11.2896 MHz base clock for a 44.1 KHz left/right clock).

Power supply 632 develops all of the required voltages for encoder 626. In one embodiment, encoder power supply 632 may accept an input voltage range from +10 VDC to +18 VDC. Four separate voltages may be used on the transmitter baseboard; Input voltage (typically +12VDC), +5VDC, +3.3VDC, and +1.8VDC. Transient protection may be used to prevent any surges or transients on the input power line. A voltage supervisor may also be used to maintain stability with DSP 600. The unregulated input voltage is used as the source voltage for the +5 VDC. A regulated +5 VDC is used to supply IR transmitter module 634. Audio modules 622, 623, 624, 625 use +5 VDC for input audio protection and input audio level bias. IR transmitter 634 uses +5 VDC for bias control and IR driver circuit 650. Regulated +3.3 VDC is used to supply DSP 600 and logic of encoder 626, and is also supplied to the audio modules for their ADCs. The +3.3 VDC is developed from the regulated +5VDC supply voltage and is monitored by a voltage supervisor. If the level falls below 10% of the +3.3 VDC supply, the voltage supervisor may hold DSP 600 in reset until a time period such as 200 ms has passed after the voltage has increased above +3.0 VDC. Regulated +1.8 VDC is used to supply the DSP core of encoder 626 and is developed from the regulated +3.3 VDC supply voltage.

Figure 9:
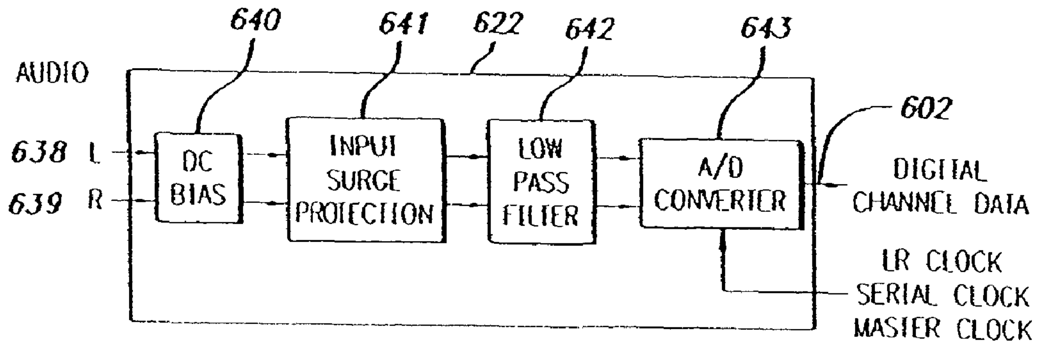
FIG. 9 is a functional block diagram of input audio conversion module 622 of transmitter apparatus 500.

Referring now to FIG. 9, in one embodiment audio modules 622, 623, 624, 625 may be used to provide digitized audio input streams 602, 603, 604, 605 to DSP 600. The audio modules may be external or internal plug-in modules to encoder 626 or may be incorporated into the encoder. In an embodiment providing four channels of audio, four audio modules may be used with the transmitter baseboard. Each audio module, such as audio module 622 shown in FIG. 9. accepts one stereo audio pair (left and right) of inputs 638, 639. Power and the master clock, serial clock, and left/right clock are all supplied by encoder 626. Signal conditioning and input protection circuitry may be used to prepare the signals 638, 639 prior to being digitized and protect the input circuitry against transients.

Signals 638, 639 may be conditioned separately. DC Bias circuit 640 sets signals 638, 639 to the midrange of the five-volt power supply so as to allow the input signal to be symmetric on a DC bias. In this manner, any clipping that occurs will occur equally on each positive and negative peak. Input Surge Protection circuit 641 may be used to protect the input circuitry against transients and over voltage conditions. Transient protection may be provided by two back-to-back diodes in signal conditioning and input protection circuit 640 to shunt any high voltages to power and to ground. Line level inputs may be limited to two volts, or some other practicable value, peak to peak. Low pass filter 642 may be provided to serve as a prefilter to increase the stopband attenuation of the D/A internal filter. In one embodiment, each analog input audio channel frequency is 20 Hz to 18 KHz and the low pass filter 642 corner frequency is above 140 KHz so that it has minimal effect on the band pass of the audio input.

With continued reference to FIG. 9, ADC 643 is used to digitize both left and right analog inputs 638, 639. Single serial digital data stream 602 containing both the left and right channels is output by ADC 643 to encoder 626. The 10.24 MHz master clock is used to develop the timing for ADC 643, and the 2.56 MHz serial data clock is used to clock the data from the ADC. The 40 KHz left/right clock is used to frame the data into distinct audio samples. Each left and right analog sample may be a 16-bit value.

Figure 10:
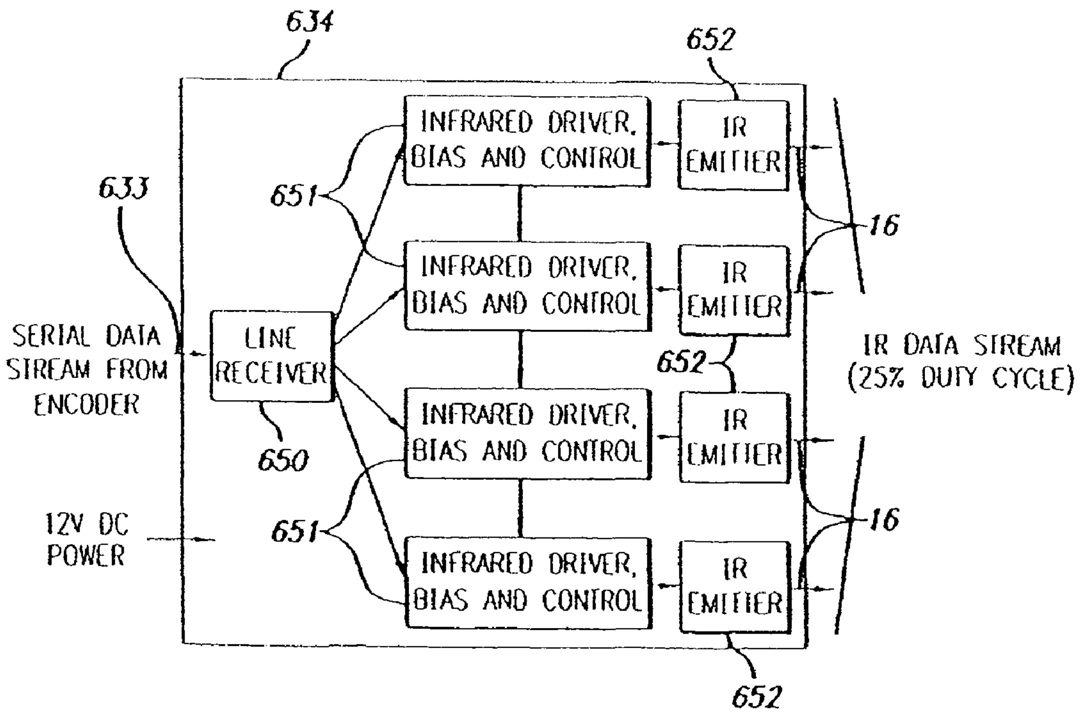
FIG. 10 is a functional block diagram of IR module emitter 634 of transmitter apparatus 500.

With reference now to FIG. 10, IR transmitter or module 634 converts digital data stream 633 to IR (Infrared) transmission signals 16. PPM (Pulse Position Modulation) encoding is used to increase transmitter power by using a bit position value. IR transmitter 634 includes line receiver 650 to receive differential RS485 signal 633 from line driver 631 and transform it into a single ended data stream. The data stream is then buffered and transferred to infrared bias and control circuits 650, which drives the light emitting diode(s) (LEDs) of emitters 652 and controls the amount of energy transmitted. IR transmitter 634 includes four infrared bias and control circuits 650 and four respective emitters 652, with a 25% duty cycle for each emitter 652. Bias control maintains the IR emitter(s) in a very low power-on state when a zero bit is sensed in data stream 633 to allow the direct diode drive to instantly apply full power to the IR emitter diodes when a positive pulse (one bit) is sensed. A sensing resistor is used to monitor the amount of current supplied to the diodes so that when the emitter diode driver is pulsed, the bias control maintains a constant current flow through the diodes. IR emitters 652 transform digital data stream 633 into pulses of infrared energy using any practicable number (e.g. four per IR emitter) of IR emitter diodes. The bandwidth of the electrical data pulses are mainly limited by the fundamental frequency of the square wave pulses applied to the IR emitter diodes due to the physical characteristics of the diodes. In one embodiment, the IR energy may be focused on a center wavelength of 870 nM. Encoder 626 supplies all power to IR transmitter module 634. +5 VDC is used for driver and bias control circuitry 650. In one embodiment, encoder 626 supplies PPM-encoded digital data stream 633 to IR transmitter 634 at 11.52 Mb/s.

Figure 11:
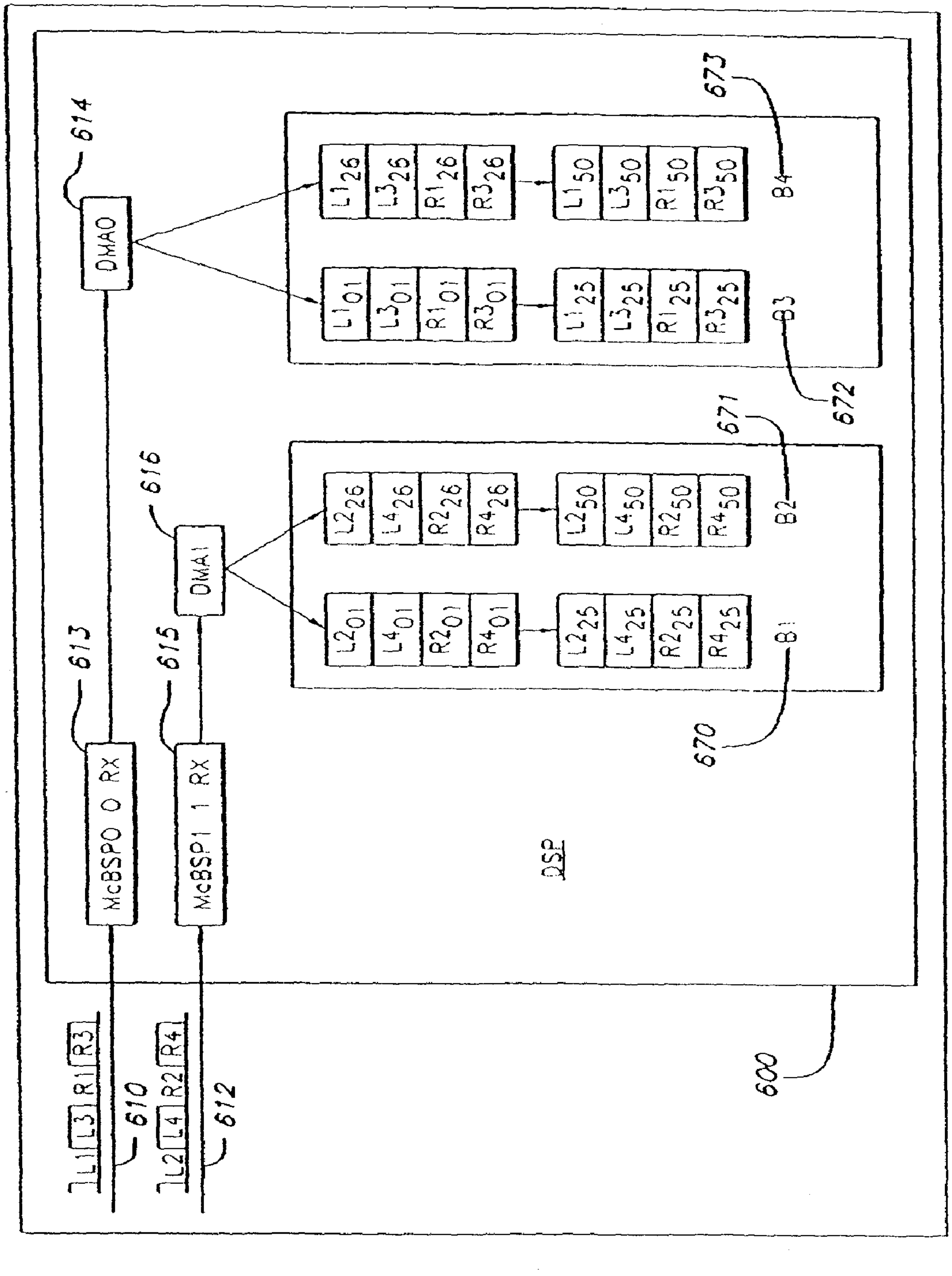
FIG. 11 depicts a configuration of transmission data input buffers for use with transmitter apparatus 500.

Referring now to FIG. 11, MCBSPs 613, 615 and DMAs 614, 616 are used to independently gather four stereo (eight mono) channels of data. When either of the McBSPs has received a complete 16-bit data word, the respective DMA transfers the data word into one of two holding buffers 670, 671 (for DMA1 616) or 672, 673 (for DMA0 614) for a total of four holding buffers. Each McBSP 613, 615 uses it's own DMA 614, 616 and buffer pair 672/673, 670/671 to move and store the digitized data. While one buffer is being filled, DSP 600 is processing the complementary buffer. Each buffer stores twenty-five left and twenty-five right data samples from two different ADCs (for a total of 100 16-bit samples). Each word received by each McBSP increments the memory address of the respective DMA. When each buffer is full, an interrupt is sent from the respective DMA to DSP 600. DSP 600 resets the DMA address and the other buffer is filled again with a new set of data. This process is continuously repeated.

DSP 600 creates two transmit buffers that are each the size of a full transmit packet 86. In one embodiment, 450 (16-bit) words are used in each packet (as more fully discussed below). When a packet 86 is first initialized, static header/trailer values are inserted in the packet. For the initial packet and subsequent packets, the User ID/Special Options/Channel Status (USC) values of control block 96, data offsets, dynamic header values, and channel audio data are added to each packet. The USC values calculated from the previous packet audio data are preferably used. The audio data is PPM encoded and placed in data blocks packet. Once a predetermined number (e.g. twenty-five) of samples from each channel have been processed, packet 86 is complete.

When DSP 600 fills one of the output buffers completely, a transmission DMA (DMA2) is enabled. DMA2 then transfers the data in the filled output buffer to a serial port (McBSP0) of transmission device 500. McBSP0 in turn sends serial data 633 to line driver 631 to send to IR transmitter 634. Once the Output DMA and McBSP are started, they operate continuously. While DSP 600 fills one of the buffers, the other buffer is emptied by DMA2 and sent to McBSP0. Synchronization is maintained via the input data.

DSP 600 handles interrupts from DMAs 614, 616, monitors Special Options and Channel Status information as described elsewhere herein, constructs each individual signal (or transmission packet) 86, and combines and modulates the audio data and packet information. The DMA interrupts serve to inform DSP 600 that the input audio buffer is full, at which time the DSP reconfigures the respective DMA to begin filling the alternate holding buffer and then begins to process the "full" holding buffer. No interrupt is used on the output DMA. Once the output buffer is full, the output DMA is started to commence filling the other buffer.

As more fully described elsewhere herein, Special Options information may be used to indicate if audio transmission device 500 is being used in a unique configuration and may be provided through hardware switches or hard coded in the firmware. Special Options may include, but are not limited to, 5.1 and 7.1 Surround Sound processing. In one embodiment, four bits may be used to indicate the status of the Special Options. Four bits will provide for up to four user selectable switch(es) or up to fifteen hard coded Special Options. The Headphone normal operation may be a reserved option designated as 0000h.

When a switch option is used, a minimum of one or more of the fifteen Special Options will be unavailable for additional options (i.e. if two switches are used, only four additional Special Options may be available. If four switches are used, no additional Special Options may be available.) For instance, to utilize a 5.1 or 7.1 Surround Sound option, a hardware switch may be used to toggle a bit level on a HPI (Host Port Interface) of DSP 600. A one (high) on the HPI may indicate that an option is used. A zero (low) on the HPI may indicate normal four-channel operation. DSP 600 may read the HPI port and set the appropriate bit in the Special Options value.

Channel Status information may be used to indicate which stereo channels (left and right channels) contain active audio data. The amplitude of the digital audio data may determine whether a stereo channel is active or inactive. If active audio is not detected on a stereo channel, the Channel Status can be flagged in the outgoing packets as OFF (zero). If active audio is sensed on a stereo channel the Channel Status can be flagged in the outgoing packets as ON (one).

In one embodiment, to determine if a stereo channel is active, the absolute values for each set of the four stereo channel data samples are accumulated. Twenty-five samples (the number of individual channel data samples in one packet) of each left channel and each right channel are combined and accumulated. If the sum of the stereo channel samples exceeds the audio threshold, the Channel Status may be tagged as active. If the total of the stereo channel samples does not exceed the audio threshold, the Channel Status may be tagged as inactive. Four bits (one for each stereo channel) may be used to indicate the stereo Channel Status and preferably are updated each time a packet is created.

Figure 12:
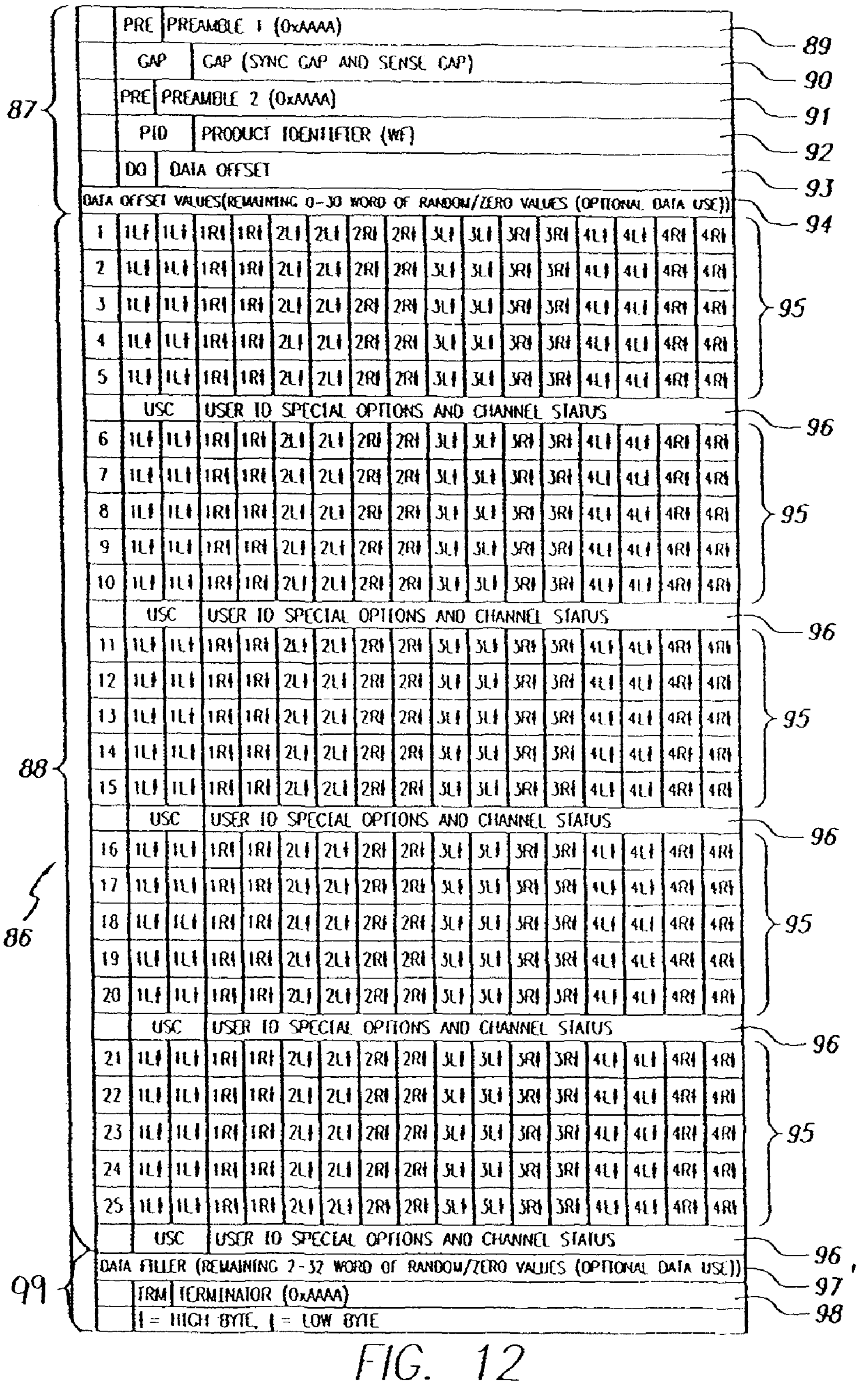
FIG. 12 depicts a digital data transmission scheme, that may be used with transmitter apparatus 500.

Referring to FIG. 12, an embodiment for encoding the four channels into individual signals or transmission packets 86 is shown to partition each signal 86 into header section 87 and data section 88. Header section 87 contains all of the information for receiver 700 (detailed herein below) to sense, synchronize and verify the start of a valid transmission packet 86. In one embodiment, the header section includes Preamble, Terminator, and Gap values that are not PPM encoded, and further includes Product Identifier and Data Offset values that are PPM encoded.

Gap value 90 may be a 32-bit (double word) value used by receiver 700 to sense header section 87 and synchronize with transmission packet 86. Gap 90 may be composed of a Sense Gap, a Trigger Gap, and a Sync Gap. The Gap is preferably not PPM encoded and is a static value that is never changed. The first part of Gap 90 is the Sense Gap, which contains seven leading zeros. These bits are used by receiver 700 to recognize the beginning of the Gap period. The second part of Gap 90 is the Trigger Gap, which contains alternating one and zero bits. These bits are by receiver 700 to stabilize the clock recovery circuitry over the Gap period. The third part of the Gap is the Sync Gap, which contains three zero bits. These bits are used by receiver 700 to mark the beginning of each transmission packet 86.

Preamble PRE may consist of a predetermined number of equal values (e.g. AAAA hexadecimal) to further enable synchronization of receiver 700 with transmitter 500. The preamble consists of two separate 16-bit (double word) values 89, 91 and are used by receiver 700 to identify the start of each packet 86. Preamble 1 word 89 is also used to assist in stabilizing the clock recovery circuitry. The Preamble is not PPM encoded and may be a static value that is never changed. Preamble 1 word 89 is preferably placed at the start of packet 86 and preamble 2 word 91 preferably follows Gap 90. Preamble words 1 and 2 are composed of alternating ones and zeros (AAAAh). The first "one" bit of the Preamble 2 word 91 may signal the start of the particular packet 86.

Following the Preamble 2 word 91 is predetermined code or unique identifier ID (PID) 92, which may be selected to uniquely identify transmitter 500 to receiver 700. PID 92 is preferably PPM encoded and is a static value that does not change. This feature may be used, for example, to prepare headphones that may only be used in a car, or limited to use with a particular make of car, or with a particular make of transmitter. Thus, for headphones used in a museum wherein visitors rent the headphones, the receivers in the headphones may be programmed to become operation only upon detection of a unique identifier ID that is transmitted only by transmitters 500 installed in the museum. This feature would discourage a visitor from misappropriating the headphones because the headphones would simply not be functional anywhere outside of the museum. This feature may further be used to control quality of after market accessories by an OEM. For instance, a vehicle manufacturer or a car audio system manufacturer may install transmitters in their equipment but control the licensing/distribution of the unique ID transmitted by their equipment to those accessory (headphones, loudspeakers, etc.) manufacturers that meet the OEM's particular requirements.

Following PID 92 is data offset value (DO) 93 followed by offset portion 94, the final portion of header section 87. Offset value 93 indicates the length of (i.e. number of words in) offset portion 94 and data filler portion 97, and may be a fixed value that is constant and equal in each transmitted signal or packet 86, or alternatively may be dynamically varied, either randomly or according to a predetermined scheme. Varying the length of the offset portion from signal to signal may help avoid fixed-frequency transmission and/or reception errors and reduce burst noise effects. Offset portion 94 and data filler portion 97 together preferably contain the same number of words (e.g. 30), and thereby allow the random placement of data section within a particular packet 86 while maintaining a constant overall length for all packets. Offset portion 94 serves to space unique PID 92 from data section 88 and may contain various data. This data may be unused and thus composed of all random values, or all zero values, to be discarded or ignored by receiver 700. Alternatively, offset portion 94 may contain data used for error detection and/or error correction, such as values indicative of the audio data or properties of the audio data contained in data section 88.

Data section 88 is formed by interleaving data blocks 95 with control blocks 96. In one embodiment data block 95 consist of 5 samples of 4 channels of left and right encoded 16-bit values (1 word) of audio information, for a total of 80 PPM-encoded words. Data blocks 95 may consist of any other number of words. Furthermore, the data blocks in each signal 86 transmitted by transmitter 500 do not have to contain equal numbers of words but rather may each contain a number of words that varies from signal to signal, either randomly or according to a predetermined scheme. Consecutive data blocks 95 within a single packet 86 may also vary in length. Additionally, consecutive packets 86 may contain varying numbers of data blocks 95 in their data sections 88. Indicators representing, e.g., the number of data blocks and the number of words contained in each data block may be included in header block 87 of each packet 86, such as in offset portion 94, to enable transmitter 700 to properly process the data contained in each packet 86.

Control block 96 follows each data block 95, and in one embodiment includes the Special Options and Channel Status information discussed previously, as well as a predetermined code or unique identifier User ID. As described elsewhere herein, User ID may be a value used for error detection, such as by comparing a User ID value contained in header 87 with each successive User ID value encountered in subsequent control blocks 96. If the values of User ID throughout a packet 86 are not identical, the packet may be discarded as a bad packet and the audio output of the headphones may be disabled after a predetermined number of sequential bad packets has been received. The User ID may further be used to differentiate between various transmission devices 500 such that, for instance, a receiver 700 programmed for use with a transmission device installed in a particular manufacturer's automobile will not be useable with the transmission devices in any other manufacturers automobiles or in a building such as a museum or a private home (as further detailed elsewhere herein). Channel Status information may be used to control the channel selection switch on receiver 700 to only allow selection of an active channel, and to minimize power consumption by powering down the receiver DSP to avoid processing data words in each packet 86 that are associated with an inactive channel, as more fully described elsewhere in the specification.

At the end of data section 88 is trailer 99 which may include data filler 97 and end block or terminator block (TRM) 98. TRM 98 may preferably a 16-bit (single word) value and may be used by receiver 700 to allow a brief amount of time to reconfigure the McBSP parameters and prepare for a new packet 86. TRM 98 may also be used to assist in stabilizing the receiver 700 hardware clock recovery over the GAP 90 period, and may also contain data for error detection and/or correction, as discussed elsewhere. TRM 98 is preferably not PPM encoded and is a static value preferably composed of alternating ones and zeros (AAAAh).

Figure 13:
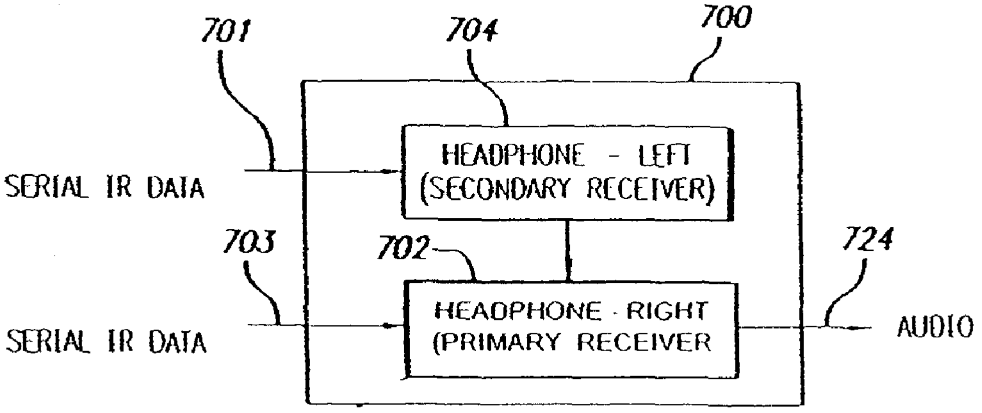
FIG. 13 depicts a functional block diagram of receiver apparatus or headset unit 700, that may be used in conjunction with a transmitter apparatus such as transmitter apparatus 500.

With reference now to FIG. 13, receiver apparatus or headset unit 700 has two separate sections to enable omni-directivity of reception and to more evenly distribute the circuitry of the receiver throughout the enclosure of headphones 80.

The main section of the receiver is primary receiver 702. The secondary module is secondary receiver 704. Both primary receiver 702 and secondary receiver 704 contain an IR receiver preamplifier. In one embodiment, primary receiver 702 may contain the bulk of the receiver circuitry and secondary receiver 702 may be used as a supplementary preamplifier for IR signal 16 when the primary receiver IR receiver is not within line of sight of the transmitted IR signal due to the orientation or location of the listener wearing headphones 80.

Figure 14:
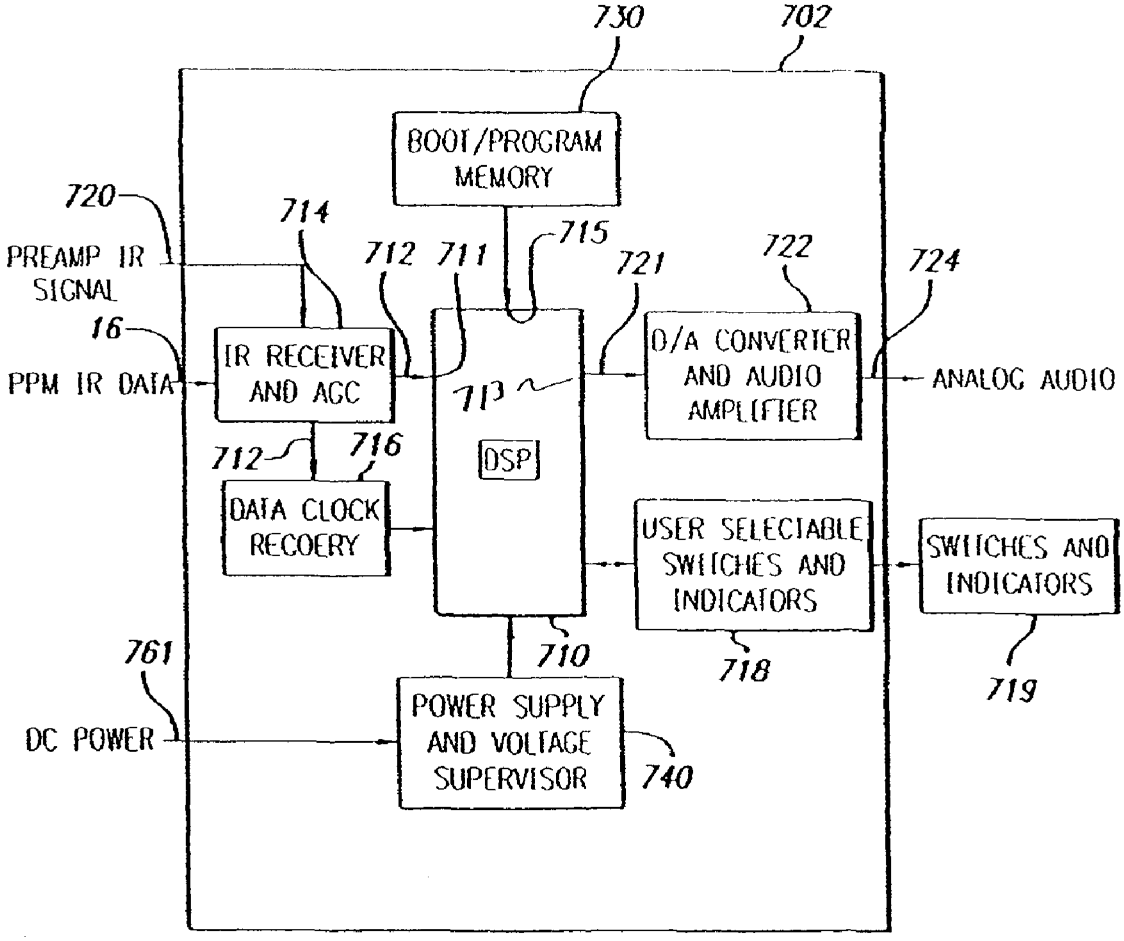
FIG. 14 is a functional block diagram of primary receiver 702 of receiver apparatus 700.

Referring to FIG. 14, primary receiver 702 contains receiver DSP 710, IR receiver/AGC 714, data clock recovery circuit 716, D/A converter (DAC) and audio amplifier circuit 722, user selectable switches and indicators control circuit 718, boot/program memory 730, and power supply and voltage supervisor circuit 740. DSP 710 serves as the central control for the receiver 700 circuitry and controls all of the inputs and outputs of the receiver. The IR data packet is received by DSP 710 in single serial stream 712 from IR receiver 714. The start of IR data stream 712 creates the frame synchronization for the incoming data packet. Clock recovery circuit 716 develops the IR data clock used to sample the IR data. The DSP serial port completes clocking for the 16-bit DAC. The master clock for the 16-bit D/A converter is developed from an additional serial port.

External switches and indicators 719 may include switches to allow the listener to access functions such as select the desired channel and adjust the audio volume. LED indicators may be provided to be driven by DSP 710 to indicate whether power is supplied to the receiver and the selected channel. Control circuit 718 interfaces external switches and indicators 719 with DSP 710, providing input from the switches to the DSP and controlling the indicators as dictated by the DSP.

The base clocking for DSP 710 may be developed from clock recovery circuit 716. The input clock to DSP 710 is multiplied by a PLL internal to the DSP. The DSP clock speed may be 8× MHz, and may be reduced to minimize overall power consumption by receiver 700. DSP 710 can also disable the switching power supply on secondary receiver 704 via a transistor and a flip-flop. If the software does not detect a valid signal in a set amount of time, the DSP can disable the switching power supply and remove power from the receiver, as detailed elsewhere herein.

Figure 15:
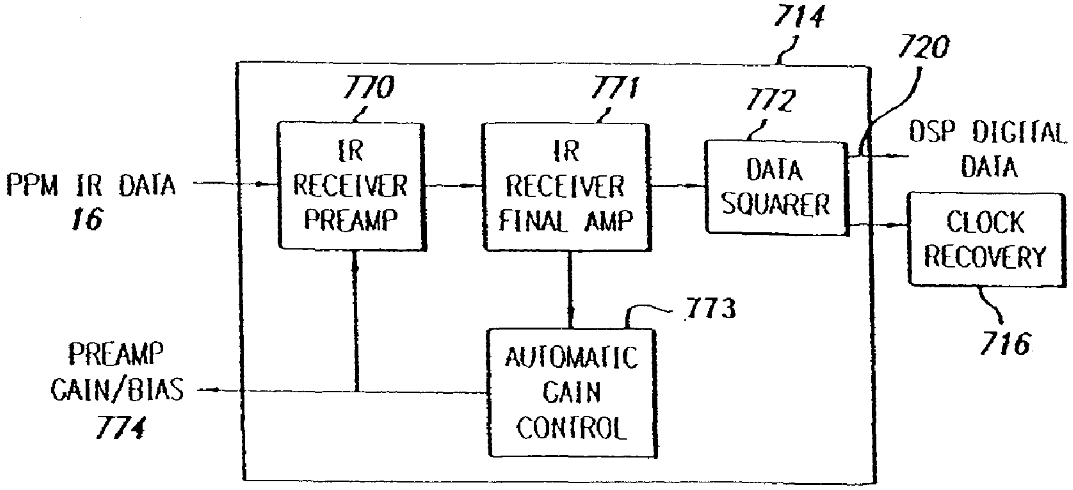
FIG. 15 is a functional block diagram of IR receiver 714 of receiver apparatus 700.

Referring now to FIG. 15, IR Receiver/AGC 714 is used to transform and amplify the infrared data contained in received signal 16. IR Receiver/AGC 714 also controls the amplification and develops digital data stream 712 for DSP 710 and data clock recovery circuit 716. The usable distance for the IR receiver is dependent on variables such as transmitter 500 power and ambient lighting conditions. In one embodiment, the overall gain of IR Receiver/AGC 714 may be approximately 70 dB.

With continued reference to FIG. 15, IR receiver/AGC circuit 714 contains preamplifier 770, final amplifier 771, data squaring stage (or data slicer) 772, and AGC (Automatic Gain Control) circuit 773. IR preamplifier 770 transforms optical signal 16 into an electrical signal and provides the first stage of amplification. The IR preamplifier is composed of three separate amplifiers. The first amplifier is composed of four IR photo detector diodes and a transimpedance amplifier. In one embodiment, combined wide viewing angle photo diodes may produce better than 120 degrees of horizontal axis reception and 180 degrees of vertical axis reception. A daylight filter may be incorporated into the photo detector diode that, together with inductive transimpedance amplifier feed back, minimizes the DC bias effect of ambient lighting. When IR signal 16 is transmitted, a current pulse proportional to the strength of the IR signal is generated in the photo detector diodes. The strength of the received IR signal is dependent on the distance from the transmitted IR source.

The current pulse from the photo diodes is applied directly to the transimpedance amplifier. The transimpedance amplifier senses the rising and falling edges of the current pulse from the photo detector diodes and converts each pulse into a voltage "cycle." The second amplifier is a basic voltage amplifier. The output of the second stage is controlled by AGC circuit 773. The third amplifier is also a basic voltage amplifier. The output of the third stage of preamplifier 770 is fed the input of final amplifier stage 771 and AGC 773.

Final amplifier stage 771 is used to further increase the gain of received IR signal 16 and also serves as a combiner for Headphone—Left and Headphone—Right preamplifiers 750, 770. Final amplifier 771 is composed of two basic voltage amplifiers. Each of the two stages of amplification increases the gain of the received IR signal. The input signal to the final amplifier is also controlled by the second stage of AGC 773, as described below. The output of the final amplifier stage is fed to AGC 773 and data squaring stage 772.

AGC 773 controls the amplified IR signal level. The AGC circuitry may be composed of one amplifier and three separate control transistors. The three separate control transistors comprise two levels of AGC control. The first level of AGC control uses two AGC control transistors (one for each stage) and is performed after the first voltage amplifier in both the Headphone—Left and Headphone—Right preamplifier stages 750, 770. The second level of AGC control occurs at the junction of both of preamplifier 750, 770 output stages and the input to final amplifier stage 771. To develop the AGC DC bias voltage, the positive peaks of the IR signal from the final amplifier stage output are rectified and filtered. The DC signal is amplified by an operational amplifier. The value of the amplified DC voltage is dependent on the received signal strength (i.e. proportional to the distance from IR emitters 652 of transmission device 500). The AGC transistor resistance is controlled by the DC bias and is dependent on the received signal strength. When the signal strength increases, the bias on the AGC transistors increases and the signal is further attenuated. AGC 773 thus produces a stable analog signal for data squaring stage 772.

Data squaring stage 772 produces a digitized bi-level-square wave (i.e. composed of ones and zeros) from the analog IR signal. The input from the data squaring stage is received from the output of final amplifier stage 771. The data squaring stage compares the final amplifier 771 output voltage "cycle" to a positive and negative threshold level. When the positive peak of the final amplifier output exceeds the positive threshold level, a high pulse (one bit) is developed. When the negative peak exceeds the negative threshold level, a low pulse (zero bit) is developed. Hysteresis is accounted for to prevent noise from erratically changing the output levels. The output of data squaring stage 772 is sent to clock recovery circuit 716 and as IR data input 720 to DSP 710.

Data clock recovery circuit 716 is used to reproduce the data clock used by transmitter 500. In one embodiment of receiver 700, the data clock recovery circuit contains an edge detector and a PLL (Phase Lock Loop). The data clock recovery circuit 716 utilizes the PLL to generate and synchronize the data clock with the incoming IR data 720. The edge detector is used to produce a pulse with each rising or falling bit edge so as to create a double pulse for additional data samples for the PLL. A short pulse is output from the edge detector when a rising or falling pulse edge is sensed. The output from the edge detector is fed to the PLL.

The PLL is used to generate a synchronized clock, which is used by DSP 710 to sample the IR data signal 712. A frequency and phase charge pump comparator circuit in the PLL compares the edge detector signal to a VCO (Voltage Controlled Oscillator) clock output from the PLL. The output of the comparator is sent to a low pass filter. The low pass filter also incorporates pulse storage. The pulse storage is required since the data is PPM (Pulse Position Modulated) and does not provide a constant input to the PLL comparator. The low pass filter produces a DC voltage used by the VCO of the PLL. The VCO produces an output frequency proportional to the DC voltage generated by the low pass filter. When the voltage from the loop filter rises the VCO frequency also rises, and visa versa. When the clock output of the VCO is synchronized with edge detector output, the low pass filter voltage and VCO frequency stabilize. The VCO frequency remains locked in sync with the edge detector until a phase or frequency difference develops between the VCO frequency and the edge detector signal. The output of the VCO is used as the data sample clock for serial port 711 of DSP 710 and it is also used as the base clock frequency of the DSP. Receiver DSP 710 uses the recovered data clock to synchronize with transmitter DSP 600 so that the data encoded and transmitted by transmitter 500 is received and decoded by receiver 500 at the same rate. The PLL also contains a lock detect, which can be used to signal DSP 710 when the PLL is locked (synchronized with the incoming data). Thus, the incoming data clock is recovered continuously by receiver 500 as the incoming data packets are processed, not just when the header of each data packet is processed.

Figure 16:
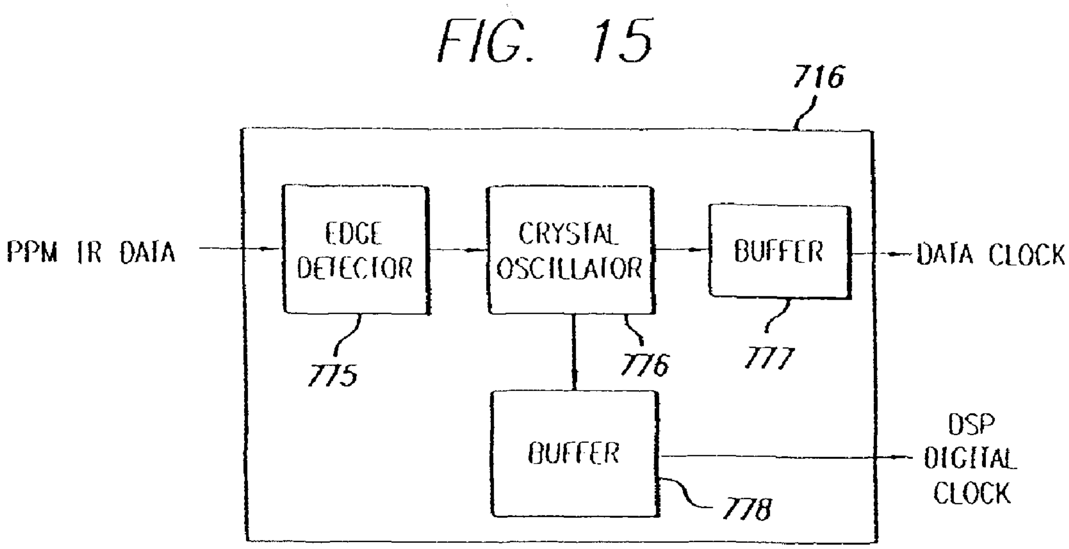
FIG. 16 is a functional block diagram of data clock recovery circuit 716 of receiver apparatus 700.

With now reference to FIG. 16, an alternative embodiment of receiver 700 includes data clock recovery circuit 716 that does not utilize a PLL but rather employs edge detector 775, crystal oscillator 776 tuned to the frequency of the audio transmission device 500 master clock, and buffers 777, 778 to synchronize the data clock with incoming IR data 712. Edge detector 775 is used to produce a pulse with each rising bit edge. A combination of four NOR gates are used to create a short pulse that is output by the edge detector when a rising edge is sensed. This provides a synchronizing edge for crystal oscillator 776. The first NOR gate of the edge detector provides a true inversion to the data stream. The output from the first NOR gate is sent to a serial port of DSP 710. The second NOR gate provides a buffer/delay. The output from the second NOR gate is fed to a RC time constant (delay). The third NOR gate triggers from the RC time constant (delay). The fourth NOR gate collects the outputs of the first and third gates. This provides a short sync pulse for crystal oscillator 776.

Crystal oscillator 776 and buffer stages 777, 778 provide a bi-level clock for sampling the IR data 712. The crystal oscillator utilizes a crystal frequency matched to the outgoing transmission device 500 data clock frequency. A parallel crystal with an inverter is used to provide a free running oscillator. The pulse developed from the edge detector provides synchronization with received data stream 712. Two inverter/buffers 777, 778 are used to provide isolation for crystal oscillator 776. The buffered output is sent to the DSP serial port data clock input and voltage conversion buffers. The voltage conversion buffers decrease the clock peak level to 1.8 volts for the DSP core clock input.

Figure 17:
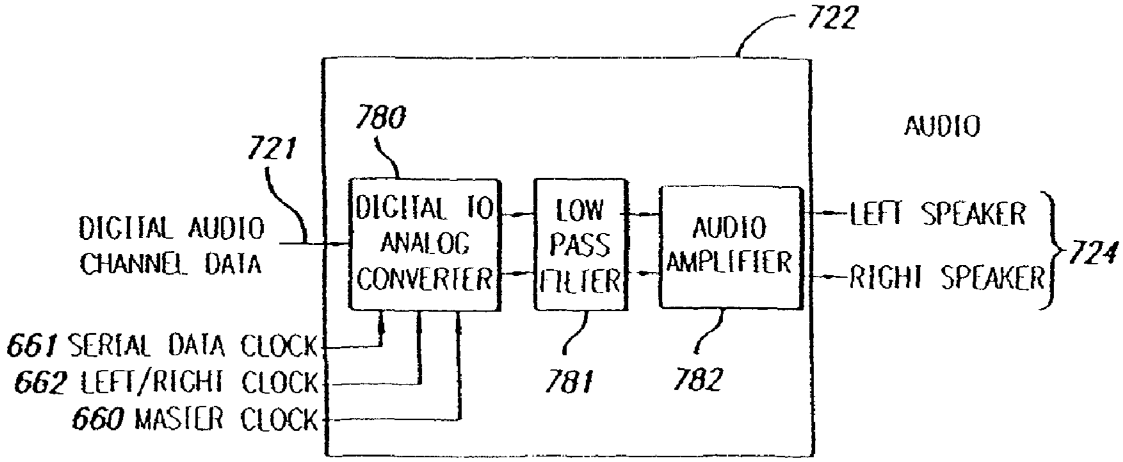
FIG. 17 is a functional block diagram of DAC and audio amplifier module 722 of receiver apparatus 700.

With reference now to FIG. 17, DAC and audio amplifier circuit 722 develops analog signal 724 from digitized data stream 721 output by DSP 710, and further amplifies and buffers the output to headphone speakers 81, 83. DAC and audio amplifier circuit 722 includes DAC 780, which may be a 16-bit DAC, for receiving serial digital audio data stream 721 from DSP serial port transmitter 713 (from the channel selected by DSP 710 in accordance with listener selection via switches 719) to produce separate left and right analog signals 724 from digital serial data stream 721. The digital data stream 721 is converted essentially in a reverse order from the analog-to-digital conversion process in audio modules 622, 623, 624, 625. The output of DAC 780 is sent through low pass filter 781 (to remove any high frequencies developed by the DAC) to audio amplifier 782. Audio amplifier 782 amplifies the audio signal and provides a buffer between the headphones 80 and DAC 780. The output from audio amplifier 782 is coupled into headphone speakers 81, 83.

User selectable switches 718, shown for example in FIG. 14, allow a listener to adjust the audio volume in headphone speakers 81, 83 and change the audio channel. LEDs (Light Emitting Diodes) may be used to indicate the selected channel. Two manually operated selector switches may be used to adjust the volume. One press of an up volume button sends a low pulse to DSP 710 upon which the DSP increases the digital audio data volume by one level having a predetermined value. One press of a down volume button sends a low pulse to the DSP and the DSP decreases the digital audio data volume by one level. Other switch configurations may also be used. A preselected number, such as eight, of total volume levels may be provided by the DSP. All buttons may use an RC (resistor/capacitor) time constant for switch debouncing.

A manually operated selector switch may be used by the listener to select the desired audio channel. One press of the channel selector button sends a low pulse to DSP 710 and the DSP increases the channel data referred to the audio output (via DSP serial port transmitter 713). A predetermined number (e.g. four or eight) different channels are selectable. When the highest channel is reached, the DSP rolls over to the lowest channel (e.g. channel four rolls into channel one). Alternatively, if a channel is not available, the DSP may be programmed to automatically skip over the unavailable channel to the next available channel such that the listener never encounters any ‘dead’ channels but rather always selects among active channels, i.e. channels presently streaming audio. A plurality of LEDs (e.g. a number equal to the number of available channels, such as four) may be used to indicate the selected channel. The illumination of one of the LEDs may also indicate that power is supplied to the circuitry and that DSP 710 is functioning. Alternatively, an LCD or other type of display may indicate the channel selected, volume level, and any other information. Such information may be encoded in the header of each data packet, and may include additional data regarding the selected audio stream (e.g. artist, song name, album name, encoding rate, etc.) as well as any other type of information such as content being streamed on the other available channels, identification of the available (versus unavailable or ‘dead’ channels), environmental variables (speed, temperature, time, date), and messages (e.g. advertising messages). The information displayed may include text and graphics, and may be static or animated.

Referring once again to FIG. 14, boot memory 730 stores the program memory for DSP 710 during shut down. An 8-bit serial EEPROM connected to serial port 715 of DSP 710 may be used to store the DSP program. Upon power-up the DSP may be configured to search for external memory to retrieve and load its operating software. Alternatively, the program may be provided in DSP read-only-memory (ROM).

Figure 18:
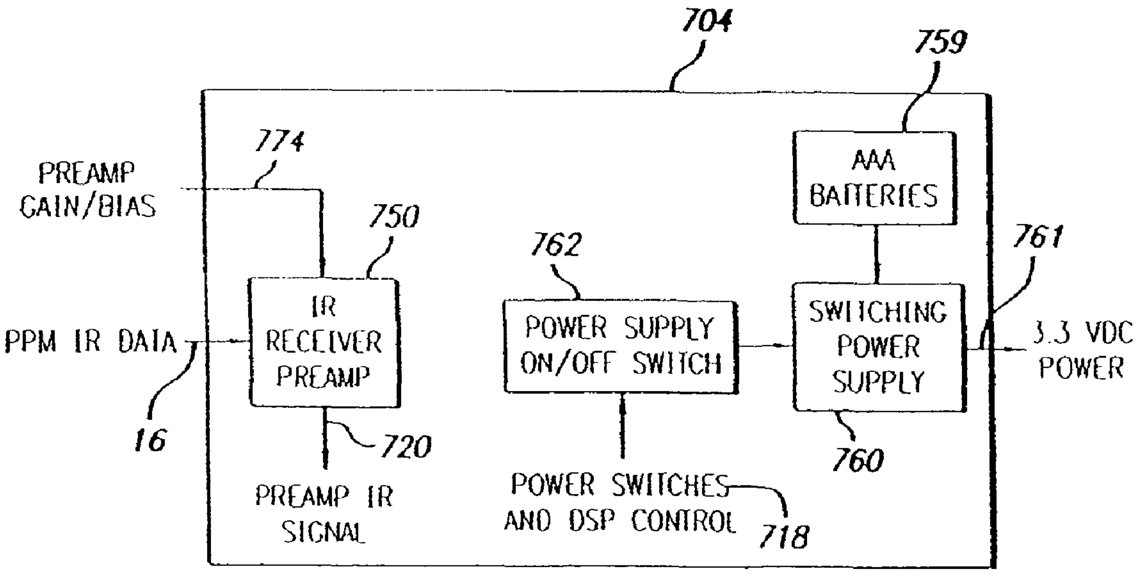
FIG. 18 is a functional block diagram of secondary receiver 704 of receiver apparatus 700.

With continued reference to FIG. 14 and also referring to FIG. 18, power supply 740 on the primary receiver 702 circuit board receives DC power 761 from switching power supply 760 in secondary receiver 704. Power supply 640 receives DC power from supply 759 (e.g. AAA batteries or any other type or size of batteries, or alternatively DC via a power cord from a vehicle or building power system, or any other practicable power supply) and includes a +1.8V (or other voltage, as required by the DSP circuitry) supply and associated voltage supervisor. The regulated +1.8V DC is used to supply the DSP core of DSP 710 and is developed from a regulated +3.3 VDC supply voltage. A voltage supervisor is used to monitor the +3.3 VDC. If the level drops below 10% of the +3.3V DC supply, the voltage supervisor may hold the DSP in reset. If the level falls below 10% of the +3.3 VDC supply, the voltage supervisor may hold DSP 710 in reset until a time period such as 200 ms has passed after the voltage has increased above +3.0 VDC.

With continued reference to FIG. 18, secondary receiver 704 supplies power 761 to receiver system 700 and works as a supplementary preamplifier for IR signal 701 when primary receiver IR receiver 714 is not within a direct line of sight of transmitted IR signal 16. Secondary receiver 704 includes IR receiver preamplifier 750, switching power supply 760, and on/off switch 762. IR receiver preamplifier 750 amplifies IR analog signal 16 when line-of-sight is not available to primary receiver IR receiver 714. The two stages of the secondary receiver IR receiver preamplifier are the same as in primary receiver 702, and the output of the second stage is provided to the input of AGC 773 in IR receiver and AGC circuit 714 of primary receiver 702.

Switching power supply 760 converts battery 759 voltage to the level used by the receiver 700 circuitry. The majority of secondary receiver and primary receiver circuitry operates on 3.3 VDC at less than 200 mA. The switching supply generates 3.3 VDC from two AAA batteries 759. Switching power supply 760 is able to source power from batteries 759 down to 0.9 volts utilizing a charge pump (inductor-less), or alternatively a boost-type converter. A low pass filter may be used to remove the high frequency components of switching power supply 760.

On/off switch 762 enables and disables switching power supply 760. The on/off switch circuit 762 is powered directly by batteries 759. Inputs 718 to on/off switch circuit 762 include a manually operated switch and DSP 710. A manually operated SPST (Single Pole Single Throw) switch is connected to the clock input of a flip-flop, wherein each press of the SPST switch toggles the flip-flop. A RC (resistor/capacitor) time constant is used to reduce the ringing and transients from the SPST switch. A high output from the flip-flop enables switching power supply 760. A low output from the flip-flop disables switching power supply 760 and effectively removes power from the receiver 700 circuit. DSP 710 can also control the action of the flip-flop. If the software does not detect a valid signal in a set amount of time, DSP 710 may drive a transistor to toggle the flip-flop in a manner similar to the manually operated SPST switch.

With reference once again to FIG. 14, in operation DSP 710 activates an internal DMA buffer to move the PPM4-encoded data received on the serial port (McBSP) 711 to one of two received data buffers. Once all 25 samples of a data packet have been collected, a flag is set to trigger data processing. When the receive buffer "filled" flag is set, data processing begins. This includes PPM4-decoding the selected channel of data, combining the high and low bytes into a 16-bit word, attenuating the volume based on listener selection, and placing the decoded left and right digitized values for all 25 samples into an output buffer DacBuffer. A flag is set when the output buffer is filled, and a second DMA continually loops through the output buffer to move the current data to serial port (McBSP) transmitter 713 for transmission to DAC circuit 722.

Serial port receiver 711 is used for capturing the IR data. The receiver clock (CLKR) and frame synchronization (FSR) are from external sources. The receiver is configured as single-phase, 1-word, 8-bit frame, 0-bit delay, and data MSB first. Received frame-sync pulses after the first received pulse are ignored. Received data is sampled on a falling edge of the receiver clock.

Serial port transmitter 713 is used to present data 721 to DAC circuit 722 for audio output to headphone speakers 81, 83. The transmitter clock (CLKX) and frame synchronization (FSX) are generated internally on a continuous basis, as previously described. The transmitter is configured as single-phase, 4-word, 16-bit frame, 0-bit delay, and data MSB first. Transmit data is sampled on a rising edge of the transmitter clock.

The sample-rate generator of serial port 711 is used with DAC circuit 722 and serial port transmitter 713. The sample rate generator uses divide-by-9 of the DSP 710 clock to achieve a frequency of 8.192 MHz. The transmit frame-sync signal is driven by the sample rate generator with a frame period of 64 clock cycles, and a frame width of 32. The sample-rate generator of serial port 711 is the master clock. The sample rate generator uses divide-by-4 of the DSP 710 clock. The transmit frame-sync signal is driven by the sample rate generator with a frame period of 16 clock cycles.

The DMA buffers of receiver 700 are configured generally similarly to those of transmitter 500. The DMA priority and control register also contains the two-bit INT0SEL register used to determine the multiplexed interrupt selection, which should be set to 10b to enable interrupts for DMA 0 and 1. DMA 0 is used to transfer IR data 712 received using the receiver of serial port 711 to one of two buffers. The source is a serial port 711 receive register DRR1_0. The destination switches between one of two received data buffers, RxBuffer1 and RxBuffer2. The counter is set to the size of each buffer, which may be 408 words. The sync event is REVT0 in double word mode for 32-bit transfers. The transfer mode control is set for multi-frame mode, interrupt at completion of block transfer, and post-increment the destination. DMA 2 is used to transfer the single channel of digital audio to DAC circuit 722. The source is the DSP output buffer DacBuffer. The destination is a serial port 713 transmitter register DXR1_0. The counter is set to the size of the DacBuffer, which may be 4 words. The sync event is XEVT0. The transfer mode control is set for autobuffer mode, interrupts generated at half and full buffer, and post-increment the source.

The serial port 711 receiver ISR is used to check whether data stream 712 in synchronized. A received data state machine begins in dwell mode where the received data is examined to determine when synchronization is achieved. Normal operation begins only after synchronization. The serial port 711 receiver ISR first checks for preamble 91 PRE in data stream header block 90 as shown in FIG. 12. When this synchronization is detected, the receiver of serial port 711 is set to a dual-phase frame: the first phase is 128 32-bit words per frame with no frame ignore, the second phase is 73 32-bit words per frame with no frame ignore. This combinations produces the equivalent of 402 16-bit words. The state machine proceeds to check that subsequently received words form a predetermined code. When this synchronization is detected, DMA 0 is initialized with its counter length set to half the size of the receive buffer, RxBuffer, which is 408/2=204 words. The destination is then set to the current receive buffer, RxBuffer1 or RxBuffer2. Next DMA 0 is enabled and the serial port 711 receiver ISR is turned off. The state machine is placed in dwell mode in advance of the next loss of synchronization. If the data stream goes out of sync, the serial port 711 receiver is set to a single-phase, 4-word, 8-bit frame with no frame ignore, and the serial port 711 receiver ISR is turned on.

If the predetermined code is not detected, a reception error may be presumed to have occurred and a counter within DSP 710 may be initialized to count the number of packets received wherein the encoded value is not detected. After a preselected number of such occurrences are counted the DSP may mute the audio output to the headphones. Muting based on detection of a preselected number of such occurrences eliminates buzzing and popping sounds, and intermittent sound cut-off that can occur when repeated reception errors are encountered. The DSP may be programmed to mute the audio output after the first error is encountered, or after a larger number of errors (e.g. 10, 50, 100, etc.) have been counted. Upon muting the audio output to the headphones, the DSP waits for the next packet where the code is detected and then either provides the audio output the headphones once again or waits until a predetermined number of data packets with no errors have been received, at which time it may be presumed that the reasons that led to the previous reception errors are no longer present and the system is once again capable of clear reception. If a packet with no errors is not received for a certain time (e.g. 60 seconds) the DSP may initiate the auto-off feature and power off receiver 700, at which time the listener would have to activate manual switch 762 to turn the system back on again. Additionally, the auto-mute or auto-off features may be engaged if a predetermined amount of time passes and no headers are processed at all, due to the audio device 34 being turned off or to noise (e.g. bright light interfering with photoreception).

When DMA 0 completes its transfer, the synchronization procedure is restarted. DMA 0 is turned off, the serial port 711 receiver is turned on, and the current buffer index is toggled to indicate RxBuffer1 or RxBuffer2. A flag is next set indicating that the DMA transfer is complete. A main loop in DSP 710 waits for a flag to be set (in DMA 0 ISR) indicating that a packet containing the 4 channels of audio has been received and transferred to one of two receive buffers. When this flag is set, output processing by DSP 710 commences. Output processing consists of determining the current buffer based on the buffer index, then using the selected channel data to retrieve and decode the PPM4-encoded left and right channel data. The selected volume level is applied to attenuate the digital signal, and then the final digital signal for the left and right earphones is placed in a current outgoing data block for transmission to DAC circuit for conversion and amplification as described previously with reference to FIG. 14.

Numerous modifications and additions may be made to the embodiments disclosed herein without departing from the spirit or scope of the present inventions including hardware and software modifications, additional features and functions, and uses other than, or in addition to, audio streaming.

Figure 19:
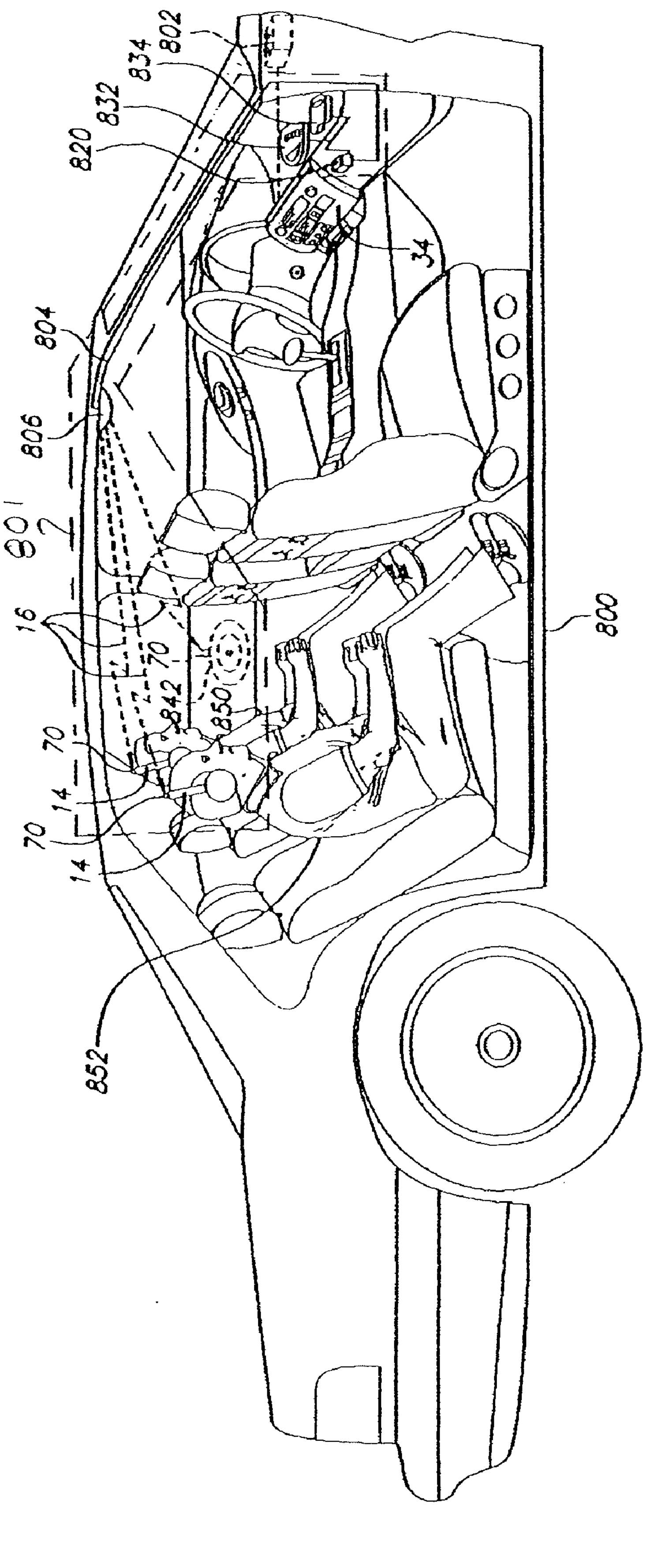
FIG. 19 is a diagram of a vehicle 800 equipped with communication system 801.

Referring now to FIG. 19, vehicle 800 such as an automobile, bus, train car, naval vessel, airplane or other suitable vehicle may include factory-installed, or aftermarket installed audio device 34, which may be a typical in-dash head unit comprising a radio tuner, a cd player or a cassette tape player, and an amplifier. Audio device 34 is shown powered by power system 802 (e.g. battery, alternator, etc.) of vehicle 800.

Communication system 801 may be added to vehicle 800 and includes plug-in unit 820 that contains transmitter subsystem 12 and IR transmitter driver 22, and is connected to audio device 34 to receive at least one channel of stereophonic audio data therefrom. Other sources of data, e.g. a video device such as DVD player 832 and an audio device such as MP3 player 834, may be connected to plug-in unit 820. The plug-in unit may accept digital and analog data, as previously described, and is preferably powered by audio device 34. Communication system 820 further includes transmitter 806 containing IR light emitting diode (LED) 20, and wiring harness 804 to connect plug-in unit 820 with transmitter 806. Alternatively the entire IR transmitter section 18, including IR transmitter or LED 20 and IR transmitter driver 22, may be contained within transmitter 806.

As previously described, transmitter subsystem 12 receives multiple channels of audio data and generates a single digitized audio signal. The digitized audio signal is provided to IR transmitter driver 22 which generates an appropriate electric current to operate LED 20 to emit IR signals 16. If IR transmitter driver 22 is contained within plug-in unit 820, then this electric current is carried by wiring harness 804 to LED 20 in transmitter 806. Alternatively, if IR transmitter driver 22 is contained within transmitter 806, then the digitized audio signal generated by transmitter subsystem 12 is carried by wiring harness 804 to the IR transmitter driver.

This segmented design of communication system 801, including three discrete components (plug-in unit 820, wiring harness 804, and transmitter 806) offers ease of installation of system 801 in vehicle 800 as a factory option or as an aftermarket addition after the vehicle has left the factory. Plug-in unit 820 may be installed in the dashboard of the vehicle and may utilize a single connection to the in-dash head unit or audio device 34, and optionally a connection to each additional audio source. Alternatively, audio device 34 may be capable of providing multiple concurrent channels of audio to plug-in unit 820, in which configuration a single connection to audio device 34 is required.

Transmitter 806 must be installed at a location that will provide a sufficiently broad direct line-of-sight to the rear of the vehicle. Transmitter 806 may be installed within a dome light enclosure of vehicle 800. Such installation may be further facilitated by incorporating IR transmitter driver 22 within plug-in unit 820, thereby rendering transmitter 806 relatively small because it contains nothing more than LED 20. Wiring harness 804 is also relatively small because it only needs to contain a small number of wires to carry a digitized signal to either be amplified by IR transmitter driver 22 or to directly operate LED 20. In either case, the electric current carried by wiring harness 804 is very low voltage and wattage, and wiring harness is preferably formed with a small cross-section that further simplifies installation in vehicle 800 because it can easily follow tortuous paths and requires limited space.

With continued reference to FIG. 19, system 801 further includes devices equipped to receive signals 16, such as headset unit 14 and loudspeaker 842. The headset units and/or loudspeaker may both be equipped with an IR receiver 70 to receive IR signals 16 from transmitter 806. The headset units are described in detail elsewhere herein. Loudspeaker 842 is equipped with similar circuitry including IR received signal processor 72, decoder 74 with clock, de-multiplexer and controller, DSP 76 for digital to analog conversion, as well as one or more amplifiers to amplify the selected channel.

In an alternative embodiment, loudspeaker 842 may not include a channel switching selector 78 but rather may be preprogrammed to always play a preselected channel, e.g., the channel selected at the head unit. In addition, due to higher power requirements, loudspeaker 842 is preferably powered via a cable by the vehicle power system 802 (not shown in FIG. 19). Alternatively, loudspeaker 842 may be preprogrammed to automatically cut-in and play a priority channel for communication between the driver and the passengers or an emergency channel such as a baby monitor or cell phone channel as previously described.

Figure 20:
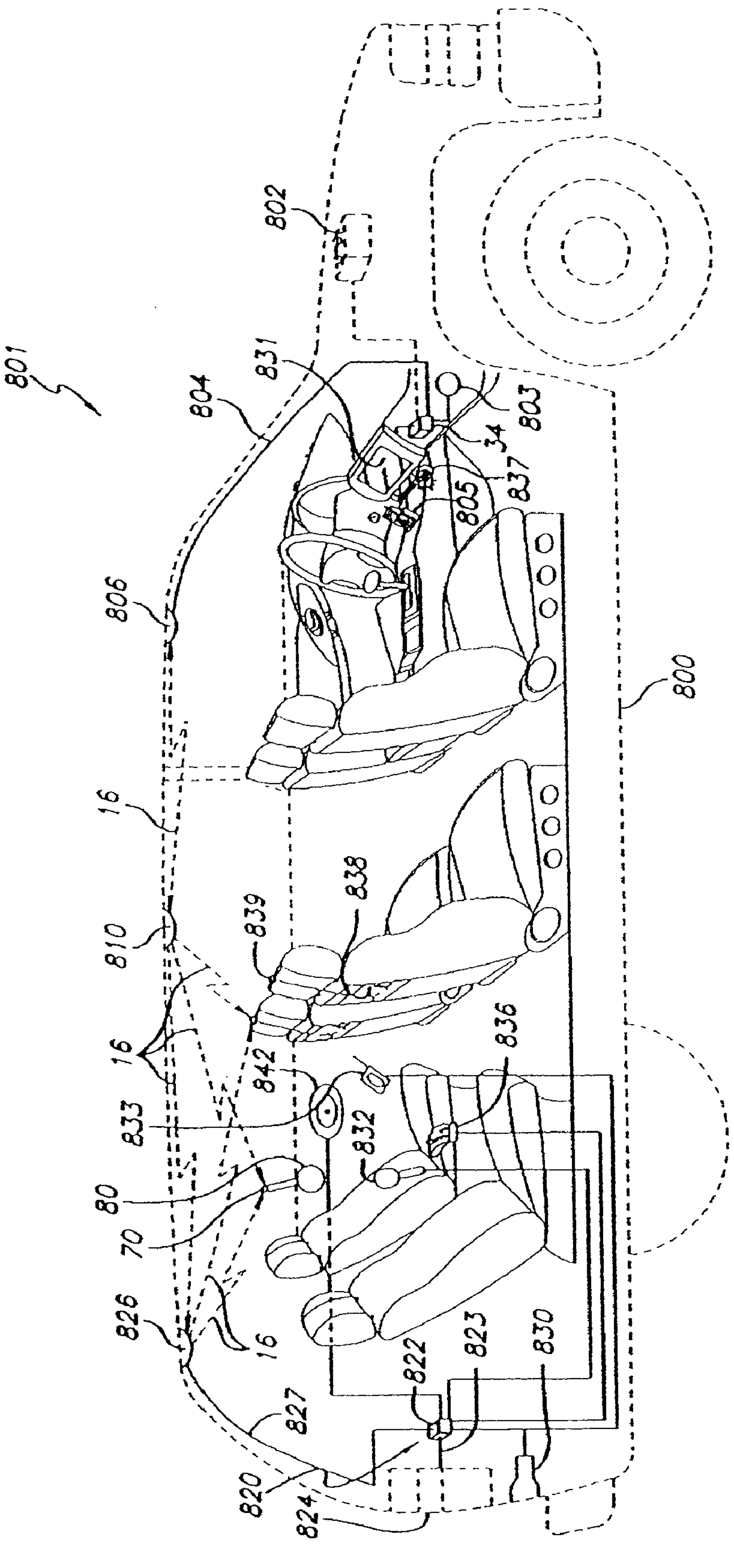
FIG. 20 is a diagram of another vehicle 800 equipped with communication system 801 having additional features over that shown in FIG. 19.

Referring now to FIG. 20, vehicle 800 may be provided with communication system 801 including audio device 34, shown powered by power system 802 (e.g. battery, alternator, etc.) of vehicle 800. Audio device 34 may be hardwired via wire(s) 804 to transmitter/receiver 806 including an IR transmitter (e.g. a light emitting diode (LED)) and an IR receiver (photoreceptor). As previously described, audio device 34 can provide a plurality of channels of audio data. In other embodiments, audio device 34 can provide other types of data, including video data, cellular telephone voice data, and text data. Thus, a video device such as DVD player 803 may be connected to audio device 34, which in turn can encode the video signal from the DVD player as discussed previously and provide it to IR transmitter/receiver 806 for transmission toward the rear of vehicle 800 via IR signals 16. Vehicle 800 may also include cellular telephone or other wireless communication device 805 that may be connected to audio device 34, which again can encode a voice stream from the telephone for IR transmission. As described below, equipment may be provided for two-way communication by passengers to converse on the telephone via audio device 34 and other IR devices.

System 801 may further include IR repeater 810 that, similar to transmitter/receiver 806, includes an IR transmitter and an IR receiver. Repeater 810 receives IR signals 16 and re-transmits them, increasing the effective transmission area of system 801. Repeater 810 may be designed to relay signals 16 coming from the front of vehicle 800, from the rear, or from any other or all directions. Thus, depending upon the application, repeater 810 may incorporate multiple receivers facing multiple directions of reception and multiple transmitters facing multiple directions of transmission. Repeater 810 requires a power source (not shown) that may include a battery, a connection to the vehicle power supply, a solar panel installed on the roof of vehicle 800, or any other practicable or convenient power supply.

System 801 may optionally include communication subsystem 820 including adapter module 822 powered via wire(s) 823 connected to the power supply of vehicle 800, such as through brake light 824. Transmitter/receiver 826 is connected via wire(s) 827 to module 822 to receive IR signals 16 and relay to the module, and to receive signals from module 222 to transmit via IR toward other areas of vehicle 800. Module 822 includes circuitry (including a DSP) similar to audio device 34 to accept data input and encode the data as described previously for IR transmission by transmitter/receiver 826. The input data may be digital or analog, and thus module 822 may include one or more ADCs to accept analog data and digitize it for encoding as disclosed herein. Subsystem 820 may be preinstalled by the manufacturer of vehicle 800, thus allowing a subsequent purchaser of the vehicle to install custom IR devices as described below on an as-needed or as-required basis without the need of laborious, complicated additional wiring installation within the vehicle.

Module 822 may receive a wide variety of data, including analog or digital video data from video camera 830, for relay to audio device 34 via transmitter/receivers 826, 806, and optionally 810. Audio device may include or be connected to video display 831 for displaying the video data received from video camera 830. Video camera 830 may be mounted at the rear of the vehicle to provide a real-time display of automobiles behind vehicle 800 and acting essentially as a rear-view mirror and/or a proximity sensor to alert the driver if another vehicle or other obstacle is too close to vehicle 800. Module 822 may also accept audio input from an audio device such as microphone 832. Microphone 832 may be employed as an audio monitor, e.g. a baby monitor as described previously, or a medical monitor for an ill person traveling in the rear of vehicle 800. Microphone 835 may also be used by a person wearing headphones 80 to access a cellular telephone device (or CB radio, or any other type of wireless communication device) connected to audio device 34, as previously discussed, to receive and conduct a conversation through the cellular telephone or other communication device. Thus, microphone 832 may be physically separate from, or alternatively incorporated into, headphones 80. Headphones 80, or microphone 835, may incorporate certain controls to access features of the cellular telephone or other communication device, such as hang-up, dial, volume control, and communication channel selection.

Module 822 may accept other data input, such as patient monitoring data (e.g. heartbeat, temperature, etc.) from monitor 833 that may be physically applied on a person traveling in vehicle 800 who may be in need of constant monitoring. Monitor 833 may be any other type of monitor, and thus may be a temperature monitor for a container to be used to report the temperature of the container to the driver of vehicle 800, such as (for example) a food container being delivered by a food delivery service.

System 801 may further include video display device 838 mounted, for example, in the back of a passenger seat for viewing by a passenger seated in a rearward seat (passengers are not shown in FIG. 20 for clarity). Display 838 includes IR receiver 839 for receiving IR signals 16 containing, for instance, video data from DVD player 803, or from video camera 830.

Optionally, game control device 836 may also be connected to module 822 for communicating with video gaming console 837 connected to audio device 34. In this embodiment, passengers may wear headphones 80 to listen to the soundtrack of a game software executed by video gaming console 837 to generate audio and video signals for transmission by audio device 34. The video signals may be displayed to the passengers on display device 838, and the passengers may interact with the game software being executed on the gaming console via inputs through game control device (e.g. a joystick, touch pad, mouse, etc.) 836.

Module 822 may further output audio data to audio speaker 842, thereby eliminating the need to extend wires from the front to the rear of vehicle 800 for the speaker. Speaker 842 may be powered by the vehicle power supply, in which case it may include an amplifier to amplify the audio signal received from module 822. Alternatively, module 822 may include all circuitry (including a DAC) necessary for processing received signals 16 into an analog audio signal and amplifying the analog signal prior to providing it to speaker 842. The channel played through speaker 842 may be selected through audio device 34 (i.e. by the driver of vehicle 800) or any other input device including game control device 836 (i.e. by a passenger in the vehicle), and the channel thus selected may be indicated in the header of each packet transmitted from the audio device for decoding by a DSP within module 822.

In other embodiments of the encoding schemes previously described (such as the scheme described in connection with FIG. 12), the data may be arranged in the transmit buffer(s) in various other configurations to reduce processing power consumption by the receiver. As one example, all data representing one channel may be stored in the buffer (and subsequently transmitted) sequentially, followed by the next channel and so forth. If a channel or channels are not available, those channels may be identified in the header of each packet. In this manner, the receiver DSP may power down during the time the inactive channel data is being received.

When one or more channels are inactive, the transmitter may increase the bandwidth allocated to each channel, e.g. by sampling the incoming audio data at a higher rate to provide a higher-quality digital stream. Alternatively, the transmitter may take advantage of excess capacity by increasing error detection and/or correction features, such as including redundant samples or advanced error correction information such as Reed-Salomon values.

To minimize reception errors, the number of audio samples included in each packet may also be adjusted depending on the number and type of errors experienced by the receiver. This feature would likely require some feedback from the receiver on the errors experienced, based upon which the transmitter DSP may be programmed to include fewer audio samples per packet.

Other error detection schemes may also be employed. As one example, a code may be randomly changed from packet to packet, and inserted not only in the header but also at a location or locations within the data block. Alternatively, the same encoded value may be used. The location(s) of the value(s) may also be randomly changed from packet to packet to remove the effects of fixed frequency errors. The location(s) may be specified in the header of each packet, and the DSP programmed to read the value then check for the same value at the specified location(s) within the data block. If the value(s) at these location(s) do not match the value specified in the header, the DSP may discard the packet as containing errors and optionally mute the output as described previously.

To conserve bandwidth and enhance processing efficiency, the encoded value(s) may contain additional information, i.e. instead of a random value the encoded value may be representative of, for example, the active and inactive channels. The encoded value would preferably be placed at least in one location of the data block assigned to each active channel to ensure that the value is in the channel selected by the listener for processing by the DSP. In another embodiment, multiple encoded values may be used, each representative of a different system variable or other information (e.g. one encoded value indicative of active channels, another containing a check-sum value, another containing a Reed-Salomon value for forward error-correction, etc.).

In a bi-directional system such as system 801, headphones 80 may include an IR transmitter to enable the receiver DSP to transmit reception error values to audio device 34 related to the received data. Based upon these values, the transmitter DSP may undertake certain error correction actions, including retransmission of bad data packets, adjustment of data packet size (e.g. transmit packets containing less data when the error rate is above a predetermined threshold, or adjust the amount of data per packet dynamically as a function of the reception error rate), and increase of transmission power generated by IR transmitter 18.

Figure 21:
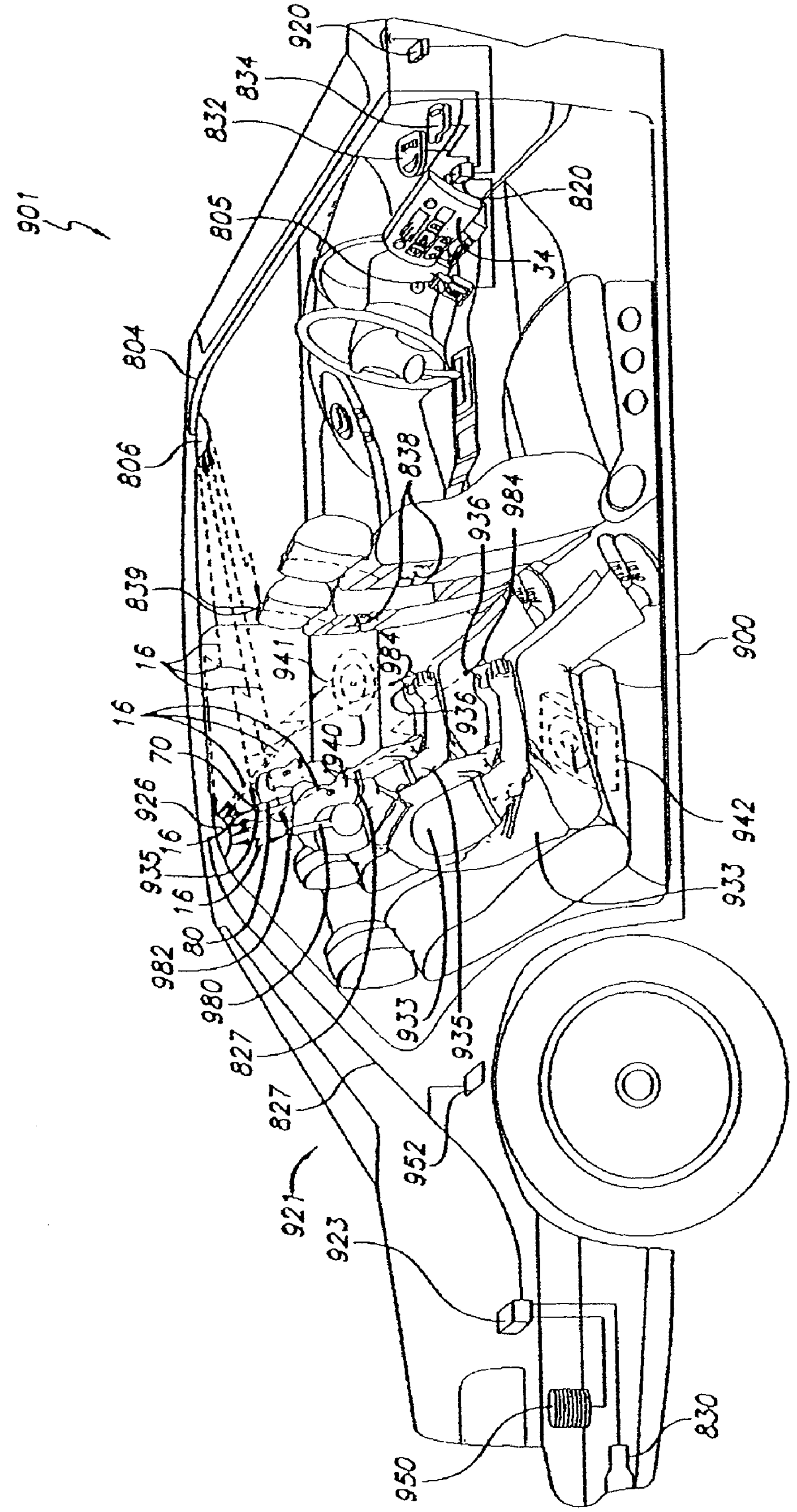
FIG. 21 is a diagram of vehicle 900 equipped with communication system 901.

Referring now to FIG. 21, in an alternative embodiment vehicle 900 includes communication system 901. As discussed in connection with other embodiments, communication system 901 may include audio device 34 hardwired through wire(s) 804 to photo transmitter/receiver 806. Communication system 901 may also include IR transmitter section 18 to receive encoded data from audio device 34 and to control and power photo transmitter/receiver 806 to emit a digital bit stream of optical pulses. IR transmitter section 18 may be provided separately from audio device 34 as shown in FIG. 18, for ease of installation, repair, maintenance, and upgrade, or may alternatively be included within audio device 34.

Audio device 34 may provide a plurality of channels of audio and other data, and is shown as receiving audio and video data from DVD player 803, audio and/or video data from auxiliary audio device 922 (e.g. MP3 player, digital satellite radio tuner, video game player, etc.) and cellular telephone 805, geographical location data from GPS unit 920, and various vehicle data (e.g. telemetry information) from a vehicle central processing unit (CPU) 924 that monitors and controls various functions of vehicle 900. As previously described, communication system 901 may provide for two-way communications, and audio device 34 may thus also accept data received by transmitter/receiver 806 from other IR devices in vehicle 900 and channel the data to such devices as vehicle CPU 924 and cellular telephone 805. CPU 924 may receive information such as proximity information from video camera/proximity sensor 830 to display an appropriate video picture or a warning to the driver of vehicle 900.

With continued reference to FIG. 21, communication system 901 may further include communication subsystem 921 including IR receiver/transmitter 926 hardwired via wire(s) 827 to communication module 923 that, as described elsewhere with connection to module 822 (FIG. 17), may be hardwired to video camera/proximity sensor 830 to receive data from the video camera and transmit it to vehicle CPU 924 through IR receiver/transmitters 926, 806 and audio device 34. Module 923 may also receive audio data from audio device 34 and provide the audio data to subwoofer 942 that may be installed in the trunk or, as shown, underneath the rear seat of vehicle 900. Additionally, module 923 may also be hardwired to trunk-mounted CD changer 950 and accept audio data from the CD changer to transmit to audio device 34 for playback within vehicle 900, as well as receive control commands input by the vehicle driver through audio device 34 to control the CD changer, such as CD and track selection, shuffle, repeat, etc.

Module 923 may include one or more DACs to decode audio data received from audio device 34 as described elsewhere and convert the decoded data to analog form for subwoofer 942. Alternatively, subwoofer 942 may include a DAC and thus be able to accept decoded digital audio data directly from module 923. Module 923 may also include one or more ADCs to accept analog data from video camera 830 and CD changer 950, convert it to digital form, encode it as described elsewhere herein, and transmit it to audio device 34. Vehicle CPU 924 may be connected to communication system 901 to relay telemetry and information related to the vehicle to the CPU. For example, tire pressure monitor 952 may be disposed in the rear area of vehicle 900 and may be hardwired to module 923 to transmit information related to the rear tire(s) pressure to vehicle CPU 924. In this manner, the usefulness of communication system 901 may be extended beyond entertainment functions to vehicle operational functions. In a further embodiment, IR receiver/transmitter 926 may incorporate a repeater to receive IR signals from any IR transmitters in vehicle 900, amplify the received IR signals, and re-transmit the received signals for reception by other IR receivers in the vehicle.

Wireless speaker 940 may be mounted in a door of vehicle 900 or at any other practicable location, and includes IR receiver/transmitter 941. Preferably speaker 940 includes a DSP to decode encoded digital audio data received from IR receiver/transmitters 806, 926 and a DAC to convert the decoded audio data to analog form for playback within vehicle 900. Both speaker 940 and subwoofer 942 require a power source, which may be provided by the vehicle 900 power supply such as from the power supply to the rear lights of the vehicle.

Still referring to FIG. 21, two-way headphones 980 include IR receiver/transmitter 982 and microphone 984. IR receiver/transmitter 982 communicates via an optical bit stream of data with audio device 34 through IR receiver/transmitter 806 or, optionally, through IR receiver/transmitter 926 that includes a repeater as described previously. Two-way headphones 980 may be used to access cellular telephone 805 through audio device 34 to place a call and conduct a two-way conversation. Two-way headphones 980 may include a numeric pad for dialing, or alternatively audio device 34 may include voice recognition capabilities to allow user 933 (using headphones 980) to simply select a predetermined channel for placing telephone calls and then activate and operate cellular telephone 805 by speaking commands into microphone 984. Two-way headphones 980 may further include an ADC connected to microphone 984 to digitize the voice of user 933 for encoding and IR transmission as described elsewhere herein. Two-way headphones 980 preferably also provide the other functions provided by headphones 80 as previously described, including controlling audio volume and selecting one of a plurality of communication channels.

With continued reference to FIG. 21, remote controller 936 includes IR receiver/transmitter 984 for two-way communication with audio device 34 via IR receiver/transmitter 806 and, optionally, a repeater included in IR receiver/transmitter 926. Remote controller 936 may provide any one or more of a plurality of controls, including but not limited to key pads, joysticks, push buttons, toggles switches, and voice command controls, and may further provide sensory feedback such as audio or tactile/vibrations. Remote controller 936 may be used for a variety of purposes, including accessing and controlling cellular telephone 805 as previously described. Remote controller 936 may also be used to access and control video game player 922 to play a video game displayed on video display(s) 838, with the game audio track played through headphones 80, 980. Remote controller 936 may further be used to control video display 838 and adjust display functions and controls, to control DVD player 803 to display a movie on video display 838 and control its functions (e.g. pause, stop, fast forward), to control trunk-mounted CD changer 950, to request telemetry data from vehicle CPU 924 to display on video display 838, or to control other vehicle 900 functions such as locking/unlocking doors and opening/closing windows. Two or more remote controllers 936 may be provided in vehicle 900 to allow two or more users 933, 935 to play a video game, displayed individually on multiple, respective video displays 838. Each remote controller 936 may access audio device 34 and video game player 922 through a separate communication channel and thus enable the game player to provide different, individual video and audio streams to each respective user 933, 935 through the respective video displays 838 and headphones 980, 80. Headphones 80, 980 may further be programmed to receive an IR signal from remote controller 936 to select another channel, or to automatically select the appropriate channel based upon the function selected by the user (e.g. play a video game, watch a DVD).

DSP 76 of headphones 80 may be programmed to identify different audio devices 34, such as may be found in a vehicle and in a home. Each audio device 34 may thus include further information in the header of each data packet to provide a unique identifier. DSP 76 may further include programmable memory to store various user-selectable options related to each audio device 34 from which the user of headphones 80 may wish to receive audio and other data. Thus, by way of example, DSP 76 may be programmed to receive and decode a predetermined number of stereo and/or mono audio channels when receiving data from a vehicle-mounted audio device 34, and to receive and decode six channels of mono audio data to provide a true 5.1 audio experience when receiving data from an audio device 34 connected to a home theatre system.

In another embodiment, headphones 80 may be provided with user customizable features, such as tone controls (e.g. bass, treble) that may be adjusted to different values for each available channel, and which are automatically detected and applied when the respective channel is selected by the user. Additionally, custom features may also be set for individual audio devices 34, such an in-vehicle audio device and an in-home audio device as described above. Headphones 80 may therefore be provided with additional controls such as bass and treble controls, and other signal processing options (e.g. panorama, concert hall, etc.). Custom settings may be retained as a headphone profile in a memory included within headphones 80, which may be any type of erasable memory. Alternatively, for two-way headphones 980, custom feature values adjusted by the user may be transmitted to audio device 34 for storing in a memory within the audio device, and these custom values may then be embedded in the data stream representing each channel (e.g. in the header of data packets) to be recovered by headset 980 and applied to the signal of the selected channel.

Alternatively, custom features may be adjusted via audio device 34 so that even one-way headphones 80 may enjoy customized settings. In embodiments wherein customized features are stored in memory by audio device 34, each individual set of headphones 80 and/or 980 may be provided with a means of individual identification, which may be entered by a user via the controls provided on the headphones (e.g. define the headphones as number one, two, three, etc.). The individual identification will allow the audio device to embed the custom settings for every set of headphones in the data stream representing each channel to be recovered by each set of headphones, following which each set of headphones will identify and select its own appropriate set of custom settings to apply to the signal of the channel selected by the user of the particular set of headphones.

In addition to custom headset profiles, users may be allowed to specify individual user profiles that specify the particular setting preferences of each individual user of headphones within vehicle 900. Such individual profiles may be stored in audio device 34 and transmitted within the data stream as described above. In this embodiment, each user may be required to input a unique identifier through the controls of the selected headphones 80 to identify herself to the headphones, which may be programmed to then extract the individual user profile of the user wearing the headphones and applying the custom settings in the profile to the signal of the user selected channel. Such profiles may be embedded in each data packet, or may be transmitted only once when audio device 34 is first powered on, or alternatively may be transmitted at regular intervals. Alternatively, all user profiles may be stored in a memory by each set of headphones 80 within a vehicle 900, and the profiles may updated intermittently or every time upon power on of audio device 34.

Figure 22:
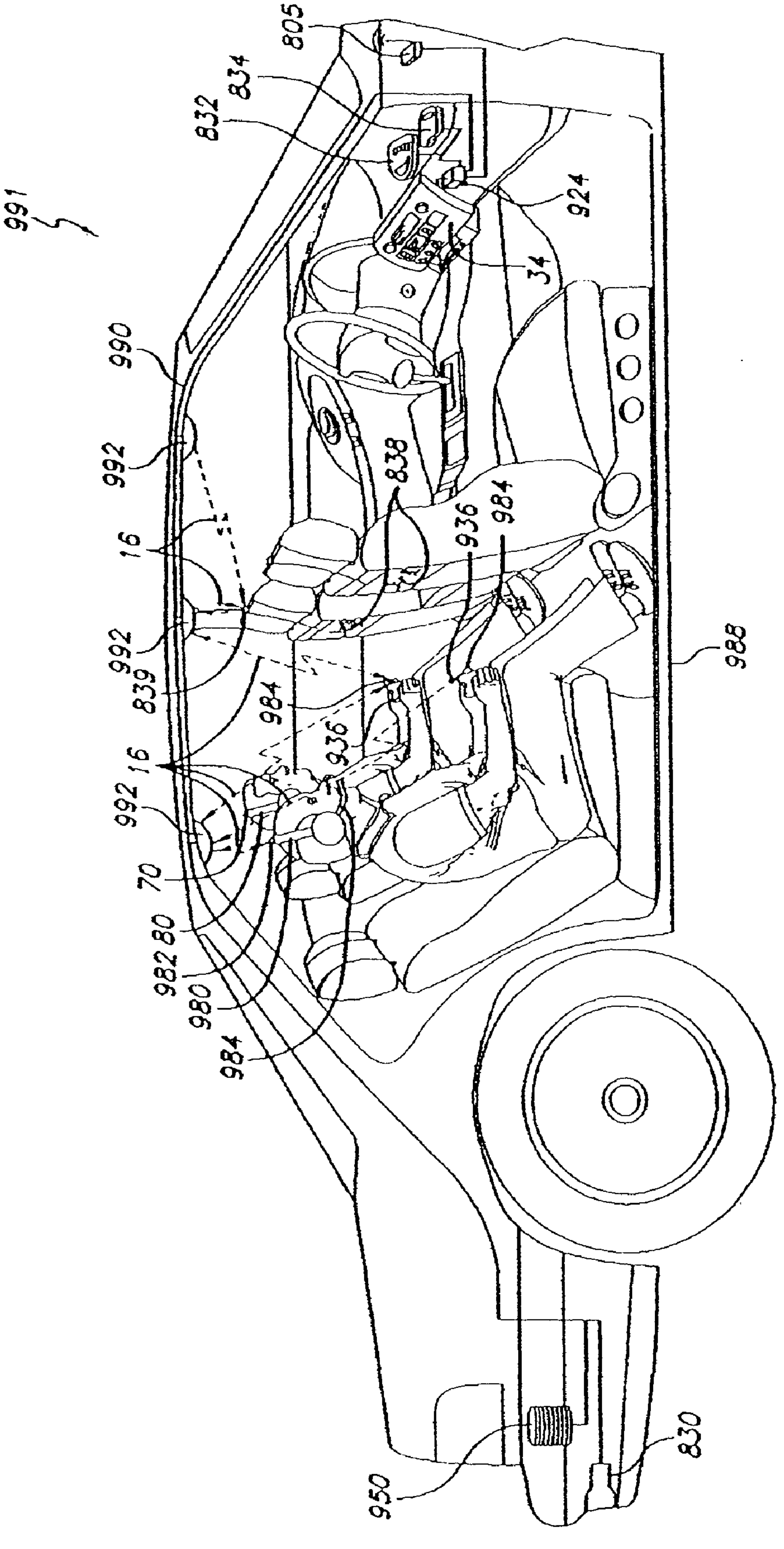
FIG. 22 is a diagram of a vehicle 988 equipped with a wireless communication system 991.

With reference now to FIG. 22, communication system is provided in vehicle 988, wherein the vehicle includes data bus 990. Data bus 990 is connected to vehicle CPU 924 and extends throughout vehicle 988 to connect various devices (e.g. video camera 830, CD changer 950) within the vehicle to the CPU. Data bus 990 may extend through the headliner of vehicle 988, as shown, or may take alternative paths through the vehicle to connected the desired devices. Data bus may be a fiber optic bus or may be an electronic wired bus, and may operate at various transmission speeds and bandwidths. In one embodiment, data bus 990 may operate according to the Bluetooth wireless communications standard, or to the Media Oriented Systems Transport (MOST) communications standard for fiber optic networks.

Communication system 991 includes IR modules 992 mounted at one or more locations within vehicle 988 and connected to data bus 990. Each IR module 992 may contain an IR receiver (photoreceptor) and may additionally contain an IR transmitter (e.g. one or more LEDs). As previously described, a repeater may also be incorporated into each IR module 992 to re-transmit received IR signals. Additionally, each IR module 992 includes circuitry (e.g. network interface card) for interfacing with data bus 990 to read data being transmitted over the bus and convert the data to IR signals for transmission by the LED(s), and also to convert received IR signals to a data format accepted by the bus and transmit such data over the bus to audio device 34 or to any other devices connected to the bus. The interface circuitry may further include a buffer or cache to buffer data if the IR receiver and/or transmitter operate at a different speed from data bus 990.

In this embodiment, audio device 34 is not required to be the central control unit of communication system 991, which instead can be a distributed system wherein the IR modules 992 enable any IR device inside vehicle 988 to interface with any other IR device operating with a compatible coding scheme or with any other device that is connected to data bus 990. By properly addressing and identifying the data transmitted over data bus 990 (e.g. via information placed in the header of each data block or data packet), each device connected to the data bus can identify the channel of data it is required to decode and use, and may optionally be assigned a unique address to which the data it is intended to receive can be uniquely addressed. This hybrid network is easily expandable as no additional wiring is needed to connect additional devices to the network; instead, each new device can be equipped with an IR transmitter/receiver that allows the device to connect to the network through one of the wireless interfaces.

Figure 23:
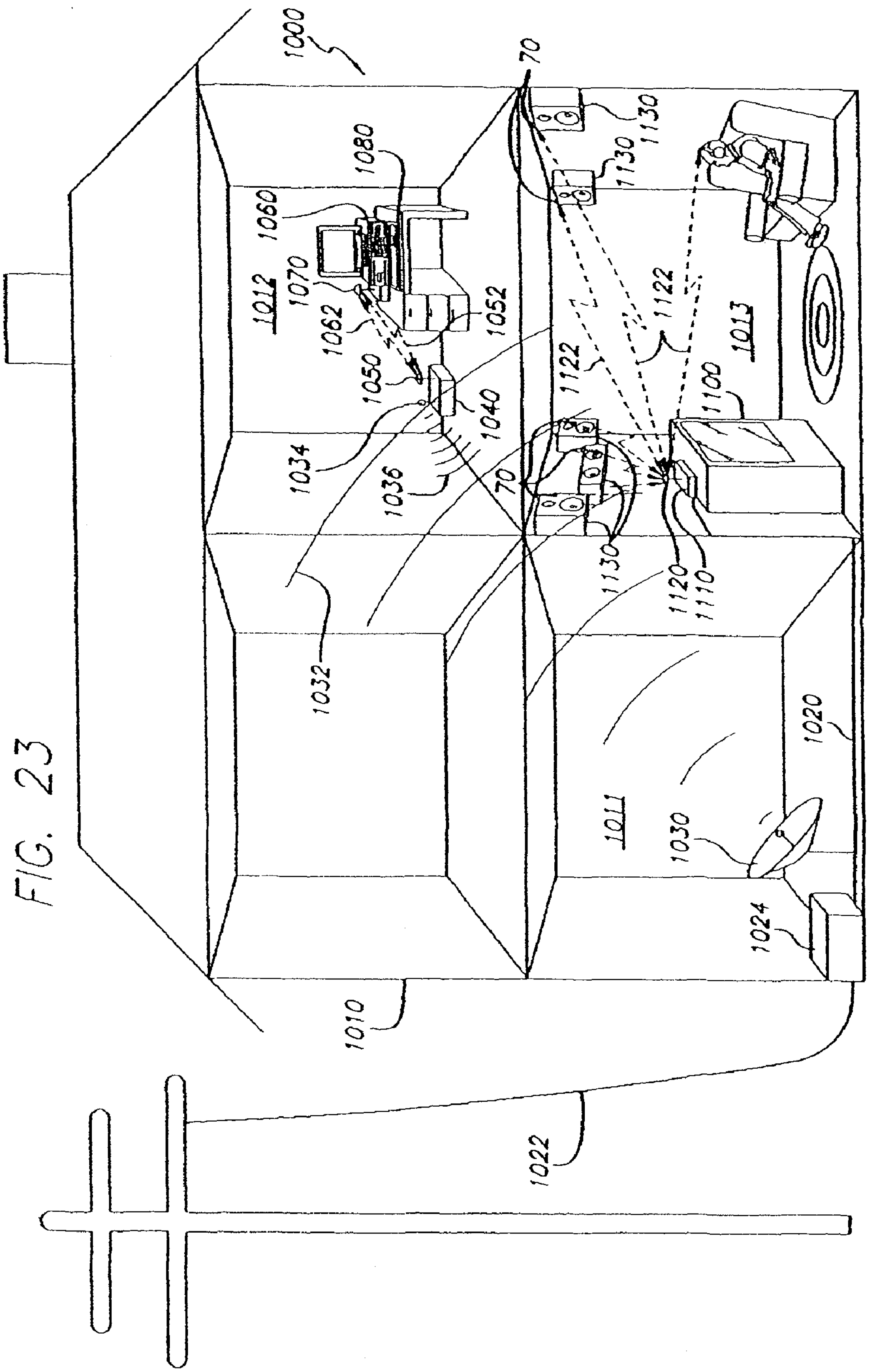
FIG. 23 is a diagram of a building 1010 equipped with a wireless communication system 1000.

With reference now to FIG. 23, in yet another embodiment, communication system 1000 is provided in building 1010 wherein the building includes communication network 1020. Network 1020 may be a Local Area Network (LAN) that may be wired or may be wireless, such as an 802.11 (WiFi) compliant wireless (RF) network. Alternatively, network 1020 may simply be a wired data pipeline connected, for example, to local cable television company network 1022. As known in the art, network 1020 may thus interface with cable network 1022 to receive media content such as television and music channels, and further to provide a connection to the Internet via cable modem 1024.

Network 1020 includes wireless (radio) RF transceiver 1030 hardwired to the network and installed in room 1011 of building 1010 to broadcast the data flowing on the network throughout the building via RF signals 1032. To minimize RF interference throughout building 1010 from multiple RF transmitters, room 1012 in the building may be equipped with interface encoder/decoder 1040 connected to RF antenna 1034 to receive RF signals 1032 from RF transmitter 1030 carrying data from network 1020. Encoder/decoder 1040 may then encode the received network signals as described elsewhere herein, e.g. in connection with the discussion of FIG. 10, and drive an IR LED of IR transmitter/receiver 1050 to emit IR signal 1052 carrying the network data. Devices in the room such as a PC 1060 may be equipped with IR transmitter/receiver 1070 to receive IR signal 1052 and encoder/decoder 1080 extract the data from the IR signal, as well as to encode data from the PC and transmit it as IR signal 1062 to be received by interface encoder/decoder 1040 through transmitter/receiver 1050. Interface encoder/decoder 1040 may then decode or de-multiplex data carried by IR signal 1062 from PC 1060 and pass it on to RF antenna 1034, which in turn transmits the data as RF signals 1036 to be received by transceiver 1030 and communicated to network 1020.

With continued reference to FIG. 23, room 1013 of building 1010 may be equipped with home theatre system 1100 connected to network 1020 to receive television and audio programming. The home theatre system may also be connected to decoder 1110 to receive one or more channels of audio from a pre-amp of the home theatre system and drive IR transmitter 1120 to transmit the channels of audio as IR signals 1122, as described elsewhere herein. Devices in room 1012 such as wireless headphones 14 and remote speakers 1130 may each be equipped with IR receivers 70 and decoder circuitry for decoding IR signals 1122, as previously described. IR signals 1122 may carry audio information such as 5 channels of monaural audio for each speaker 1130 forming a so-called 5.1 audio system. IR signals may also carry multiple channels of audio such that listener 1150 wearing headphones 14 may choose to listen to a different audio channel than the channel being played by loudspeakers 1130. It must be understood that many other types of devices may be connected wirelessly to network 1020 including, but not limited to, telephones, facsimile machines, televisions, radios, video game consoles, personal digital assistants, various household appliances equipped for remote control, and home security systems.

Hybrid system 1000 thus utilizes the ability of RF signals to propagate through walls, but minimizes the RF interference that may arise in such situations. System 1000 is also highly flexible and allows connecting multiple additional devices, such as PC 1060, to a wired network such as network 1020 without actually installing any additional cable or wiring in the building. Instead, a single interface encoder/decoder 1040 needs to be installed in each room of the building and devices in any of the rooms so equipped can then be connected to network 1020 through either a one-way decoder such as decoder 1110 or a two-way encoder/decoder such as encoder/decoder 1080. In this manner, older buildings can be easily and cost-effectively retrofitted to building modern offices with the requisite network/communication capabilities.

Figure 24:
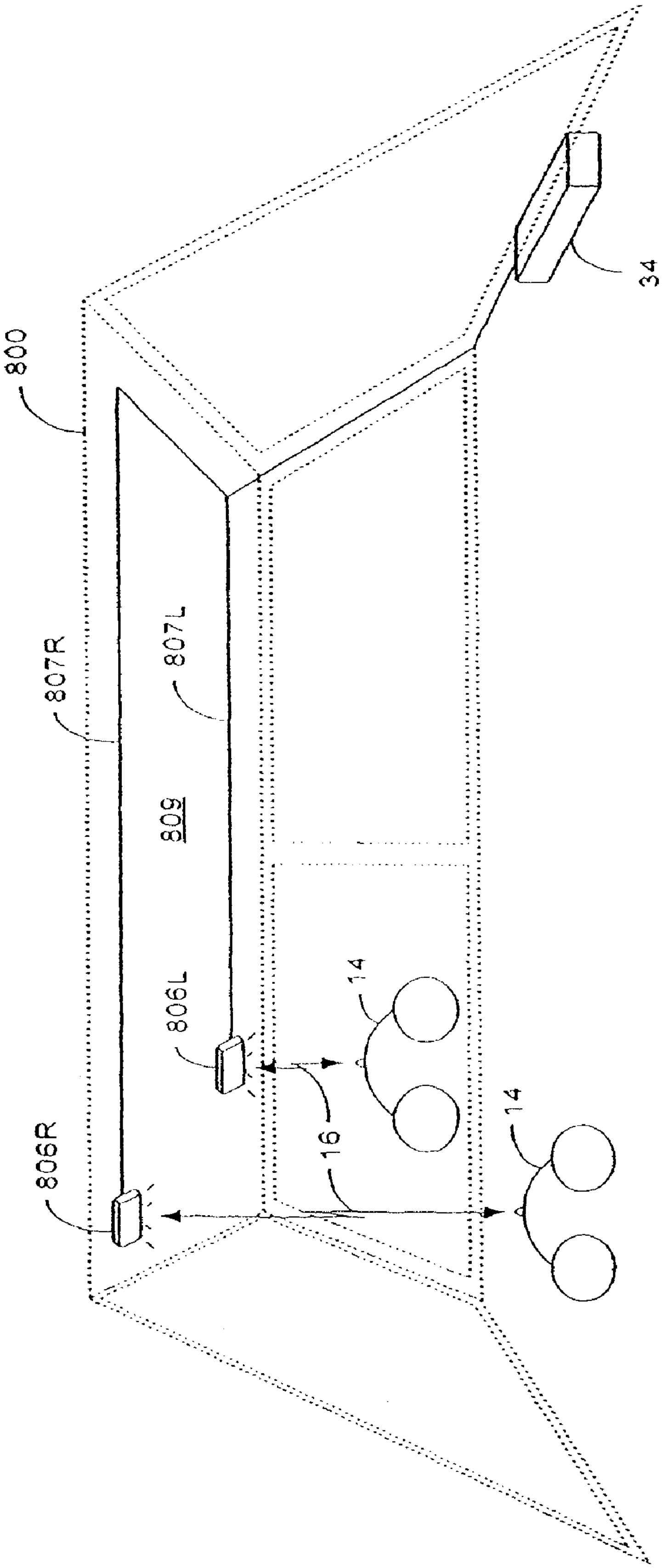
FIG. 24 is a schematic diagram of an alternate configuration in which separate wireless receiver/transmitters separately communicate with separate headset receivers which may include transmitters.

With reference now to FIG. 24, n vehicle 800 may be equipped with a communication system as previously described, including audio device 34 hardwired to IR receiver/transmitters 806. In this embodiment the communication system includes two IR receiver/transmitters 806L and 806R, each individually hardwired to audio device 34 via wires 807L and 807R, respectively, to receive digital signals therefrom as previously described elsewhere herein. The IR receiver/transmitters 806L and 806R are mounted substantially above the left and right rear seat, respectively, of vehicle 800 to emit relatively narrowly focused IR signals 16L, 16R respectively for individual receipt by headset receiver units 14 worn by passengers seated in the left and right rear seats of vehicle 800, respectively (labeled in FIG. 24 as 14L, 14R for convenience of discussion). In this manner, each headset 14L, 14R may receive an individual signal 16L, 16R respectively. Signals 16L, 16R may be identical to one other, or may be different from one another. Thus, the present embodiment allows further differentiation amongst a plurality of headsets and other wireless devices equipped as described previously to receive and/or transmit wireless signals such as signals 16L, 16R.

Signals 16L, 16R may be unidirectional or, as shown, may be bidirectional when the wireless devices are equipped with wireless receivers as well as transmitters. In this embodiment, simpler, more cost-effective wireless devices may be provided that will allow each headset (or other wireless device) user to communicate individually with the audio device 34. In this manner, audio device 34 may be configured to provide multiple, individual wireless (e.g. IR) signals, each carrying a plurality (e.g. four) of multiplexed channels of data such as audio and/or video data, and therefore provide even more choices to wireless device users. The individual wireless signal (e.g. IR signals 16L, 16R, etc.) that is transmitted by each receiver/transmitter (e.g. IR receiver/transmitters 806L, 806R, etc.) may be selected via the audio device 34, and/or alternatively by the user of each two-way wireless device capable of transmitting a wireless device to its respective IR receiver/transmitter.

To achieve the desired narrow focus of the wireless signals, in an embodiment where the wireless signals are IR signals 16, IR LEDs may be provided in the IR receiver/transmitters that are aimed directly below and towards the rear seats of vehicle 800. As further described below, it may be advantageous to use LEDs having relatively small physical dimensions, such as SMD (Surface Mount Device) LEDs that can be as small as 800 ÿm wide and 1,000 ÿm tall. It will be appreciated that such embodiments simplify overall design and also minimize cross interference between different signals due to the narrow focus of the LEDs.

Alternately, serially encoded digital bitstream 16 may be further multiplexed, for example at higher speeds, so that a significantly greater number of selectable channels may be made available for each user, for example for use on an airplane.

Although the above embodiments have been described with reference to a system transmitting digital signals, it must be understood that the embodiments described herein are equally applicable to an analog system that transmits analog signals. Thus, the embodiments described herein may be used to offer users of analog wireless devices such as headsets access to multiple channels by selecting the signal to be transmitted by their respective wireless receiver/transmitter. Thus, this embodiment may obviate the need for multiplexing multiple channels of data into a single signal altogether (for both analog and digital systems), as a user of a wireless device such as a headset may select an individual channel of data (such as stereo audio), separate and different from a channel of data received by another user in the same vehicle, to be transmitted by the respective wireless receiver/transmitter located above the user.

The embodiments described herein may also be used to provide a mix of analog and digital signals. In this manner, a vehicle may be equipped or retrofitted with one or more analog wireless receiver/transmitters to transmit data channels from an audio device such as audio device 34 for receipt by analog wireless devices, and may also be provided with one or more digital wireless receiver/transmitters to transmit digitized data channels form the same or an additional audio (or video, or other) device for receipt by digital wireless devices. A vehicle so equipped may allow user a wider variety of options for wireless devices to use therein.

Figure 25:
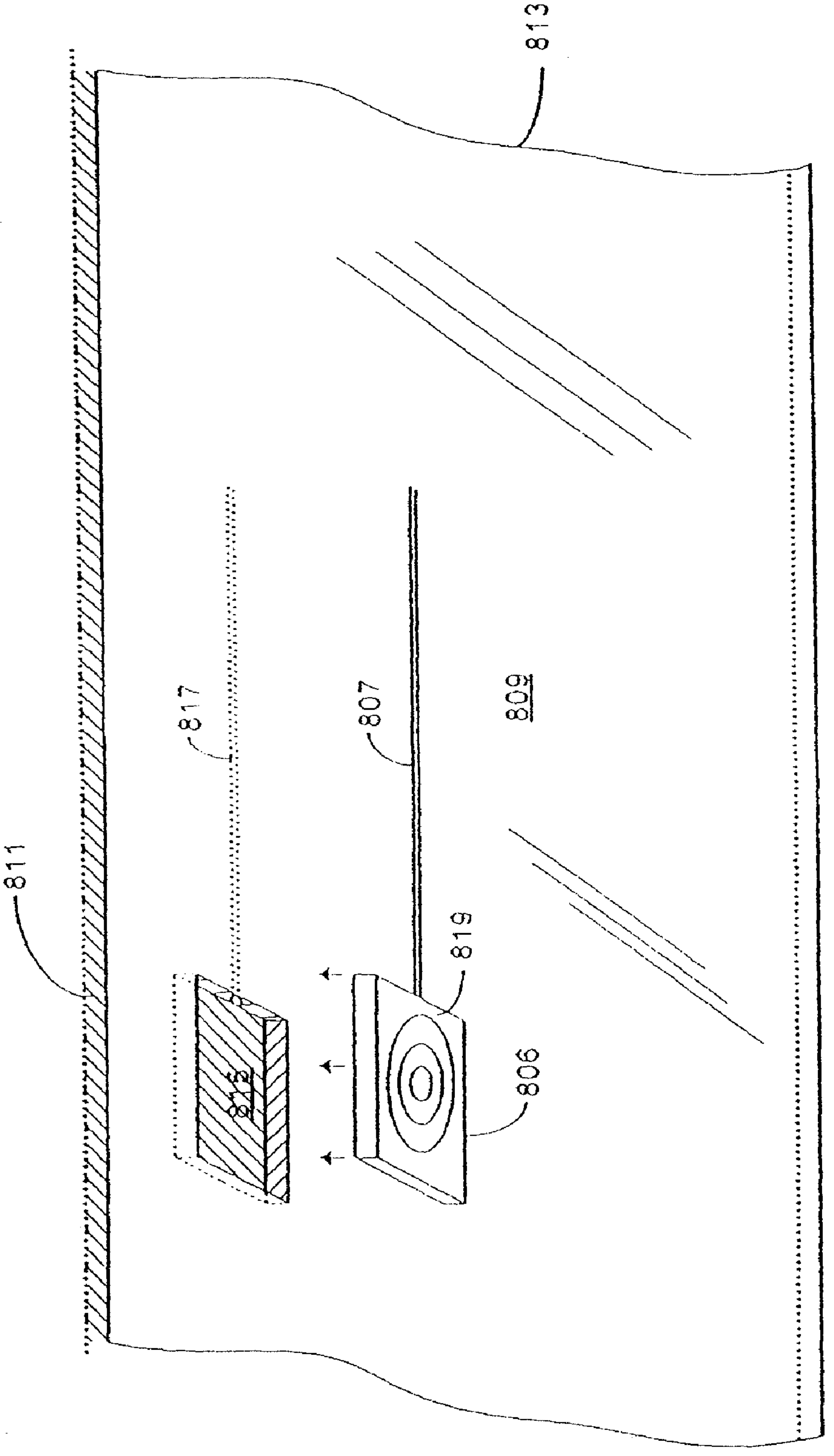
FIG. 25 is a schematic diagram of a further embodiment in which one or more wireless receiver/transmitters may be positioned behind a vehicle headliner transparent to the radiation used in the wireless system.

In one embodiment as described herein and illustrated in FIG. 25, IR receiver/transmitter 806 (only one shown for clarity) is mounted within, that is behind the visible surface of, the headliner 809 of vehicle 800. As is known, the headliners of vehicles extend below, and are attached to, the roof of the vehicle. The headliners are typically formed of a pliable material 811 such as polystyrene foam or other foam and covered with a sheet of an esthetically pleasing material 813 such as cloth or fabric or PVC. In one possible embodiment, a hollow space 815 may be formed within headliner 809 to snugly receive an IR receiver/transmitter 806 therein. An elongated space 817 may also be formed within the headliner and extending from hollow space 815 to accept wire 807 therein and conduct the wire towards the front of the vehicle, where audio device 34 will typically be located. Headline cover 813 may be advantageously formed of a material that is transparent to the wireless signals emitted by the receiver/transmitter (e.g. the IR signals emitted by IR receiver/transmitter 806). Alternatively, an opening may be formed in cover 813 to allow the wireless signals to pass there through, and optionally a second transparent cover 819 may be installed within the opening and over the wireless receiver/transmitter for protective and/or esthetic reasons.

Figure 26:
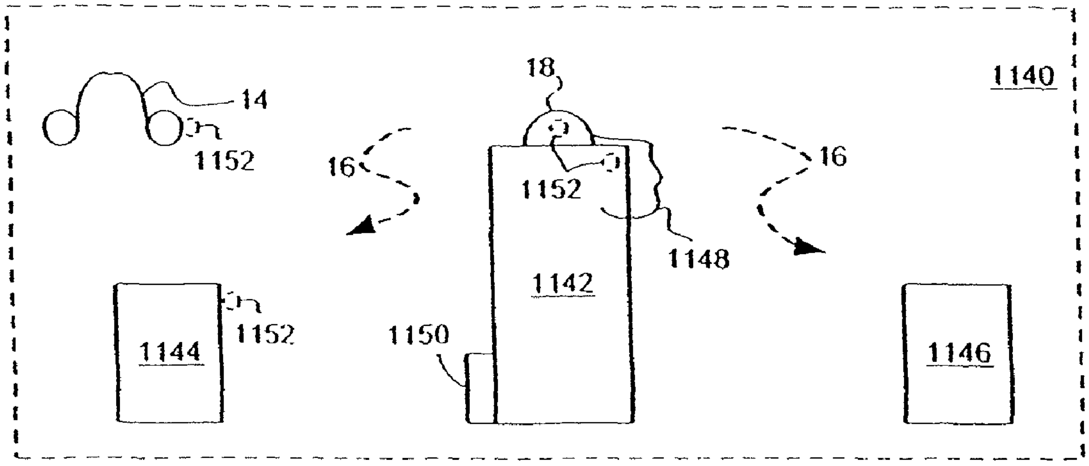
FIG. 26 is a diagram of a wireless computer speaker or headphone system.

Referring now to FIG. 26, communication system 1140 may include computer 1142, or other desktop or portable unit, on which is mounted transmitter 18, connected thereto by cable 1148 which may plug into a serial or USB or other conventional port. Transmitter 18 transmits serially encoded digital bitstream 16 to headphones 14 or computer speakers such as speakers 1144 and 1146, each of which may have appropriate decoders and optionally, a switching selector, as shown for example in FIG. 1.

Communication system 1140 provides computer generated audio output from computer 1142 to a listener who may selectably use speakers 1144 and 1146 or headphones 14. Transmitter 18 receives one or more channels of digitally formatted audio via cable 1148 from computer 1142 or, for compatibility with some computer systems, transmitter 18 may receive one or more channels of audio formatted audio via cable 1148 and convert the audio to digital signals with a DAC or similar device as described above herein. Transmitter 18 generates serially encoded digital bitstream 16 for simultaneous reception by speakers 1144, 1146 and headset 14.

Volume adjustment and control knob 1152 represents manual adjustments that may be made via computer by data entry represented by knob 1152 or via a physical knob 1152 as shown, and/or by knob 1152 positioned on headphones 14 or one or more of the computer speakers 1144, 1146. One of the control inputs to be made via knob 1152 may be the selection of which sound producing device, computer speakers 1144, 1146 or headphones 14, should be active at any time. It is typically desirable to mute computer speakers 1144, 1146 while receiving audio via headphones 14 in order to minimize ambient noise in the vicinity of computer 1142. Similarly, because headphones are typically battery powered, it is desirable to mute and or turn off power to headphones 14 when not in use. In addition, because computer speakers 1144, 1146 are not connected by cable to computer 1142, it may be convenient to provide them with battery power in order to avoid the necessity of provided electric power to them via a transformer connected to a standard AC power outlet.

It may be most convenient to select headphones or speakers via data entry or knob 1152 on computer 1142. The selection may be implemented by techniques described above such as the use of codes positioned within serially encoded digital bitstream 16. Referring now also to FIG. 12, upon selection of speakers 1144, 1146, a code word such as “SPKRS” may be inserted at a known location within header 87 to indicate that selection. The receiver unit within headphones 14 may be programmed to mute sound reproduction unless a code word such as “HDFNS” is found at the known location while speakers 1144, 1146 maybe programmed to mute if the SPKRS is not found at that location.

In a preferred embodiment, two copies of the code word may be position within serially encoded digital bitstream 16 for comparison. As disclosed above, by detecting and comparing codes at two locations, error events can be detected and monitored. After a particular quantity of error events have been detected and monitored within a limited time frame, the muting function may operate until, and if, no error events are detected and monitored for a set time period.

The auto-off function disclosed above may also be used to cause headphones 14 and/or speakers 1144, 1146 to disconnect their battery power when no sounds have been reproduced for a particular time period. The auto-off function may be combined with the error event function so that a particular number of monitored error events in a certain period or a length of the muting period may cause the sound reproducing unit to disconnect itself from battery power. A similar operation can also be used to provide a disconnect from electrical power from an AC wall outlet applied, for example, to speakers 1144, 1146.

Referring now again to FIG. 26, signal input connector 1150 may serve to apply priority signals to computer 1142, such as indications of a landline, cell phone or doorbell ringing or a driveway or yard sensor output, that may be applied to serially coded digital bitstream 16 for reproduction on headphones 14 and/or computer speakers 1144, 1146. This feature is similar to the priority channel discussed above with respect to FIG. 19. The data applied to serially coded digital bitstream 16 may simply be a tone or beep indicating one of the signals applied to signal input connector 1150. The data may also represent preprogrammed messages, such as “The phone is ringing” or may represent audio received for example from a baby room monitor. The reproduced data may be superimposed on the current audio be reproduced by headphones 14 or speakers 1144, 1146 or may be on a separate priority automatically selected when such data is received.

Knob 1152 may also be used for volume control performed at a central location. For example, when the selected code in serially encoded digital bitstream 16 is changed from SPKRS to HDFNS, the volume of the audio reproduced by headphones 14 may not be appropriate even though it was the volume of the audio reproduced by speakers 1144, 1146. One or more knobs 1152 may also, or alternately, be positioned on computer 1152, transmitter 18 and of one or both of speakers 1144, 1146.

Figure 27:
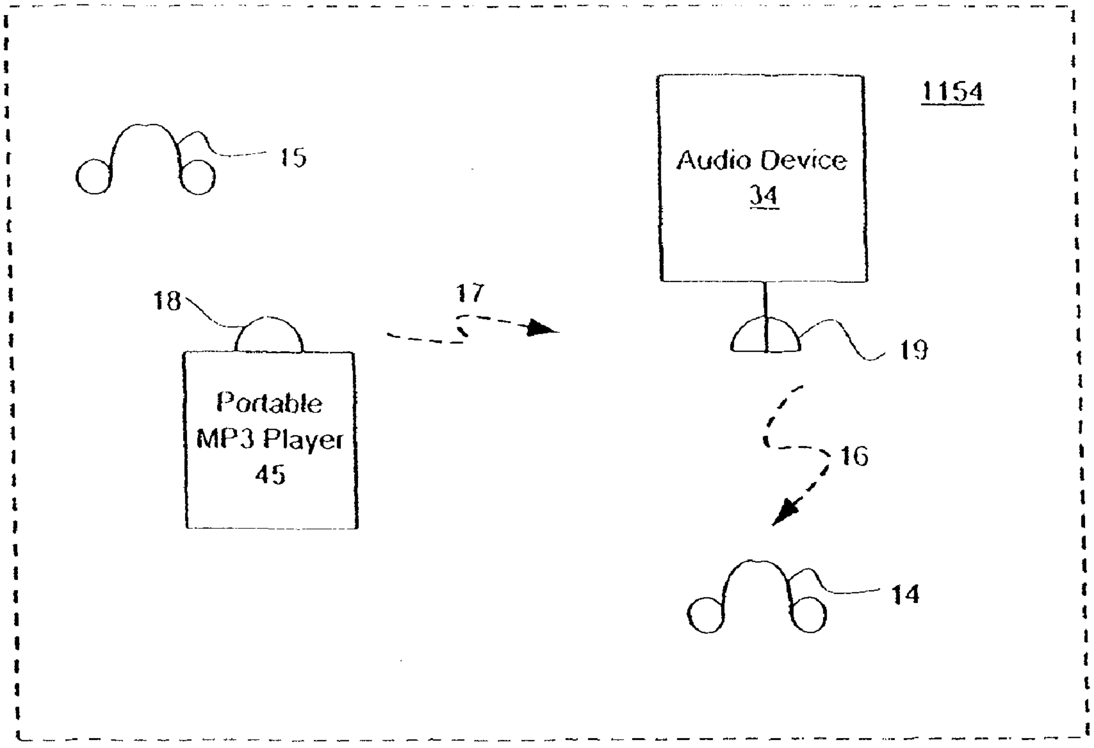
FIG. 27 is a diagram of a wireless audio distribution system including a portable audio source.

Referring now to FIG. 27 and any of the communication system embodiments disclosed herein such as FIG. 1, one or more of the sources of audio data such as MP3 player 44, or a digital camera or other data source, may be a portable device such a portable MP3 player 45 connectable wireless by a bitstream, similar to bitstream 16, to a suitable receiver such as audio device 34 connected to master controller 26 for transmission via bitstream 16 to headphones 14.

In particular, communication system 1154 may be a bidirectional data system in which digital bitstream 17 from portable MP3 player 45 is received by combined transmitter/receiver 19 which also transmits bitstream 16 to headphones 14. Bitstream 17 may then be applied to audio device 34 and used to provide one or more audio channels in bitstream 16 selectable for reception by headphones 14 or suitable speakers. In this embodiment, remote MP3 player 45 may be used within the environment of communication system 1154 to provide one of the audio channels on headset 14.

Alternatively, transmitter 18 on portable MP3 player 45 may be configured to provide bitstream 17 in a form received and decoded directly by headset 14. In this embodiment, portable MP3 player 45 may be used to provide audio in the environment of system 1154 without operation of audio device 34 or transmitter/receiver 19, for example, in a vehicle when the motor has been turned off. In this embodiment, portable MP3 player 45 can be used with any of the headsets 14 from communication system 1140 without the rest of the system.

In a further alternative, both configurations can be combined so that portable MP3 player 45 can be selectively used to directly provide audio to headphones 14, or provide audio via a channel included within bitstream 16. In this configuration, a further alternative may be provided in which bitstream 17 is decodable and reproducible only via headset 15 which need not be responsive bitstream 16. This configuration may be desirable to provide the opportunity for the use of headset 15 for private listening whether within system 1154 or elsewhere. In one variation, this configuration may not provide a bitstream 17 suitable for direct reception by headphones 14, reducing the likelihood that headphones 14 may be removed from the environment of system 1154 for use elsewhere.

In a further embodiment, bitstream 17 may be recorded in a memory or hard disk associated with audio device 34 for later play.

Figure 28:
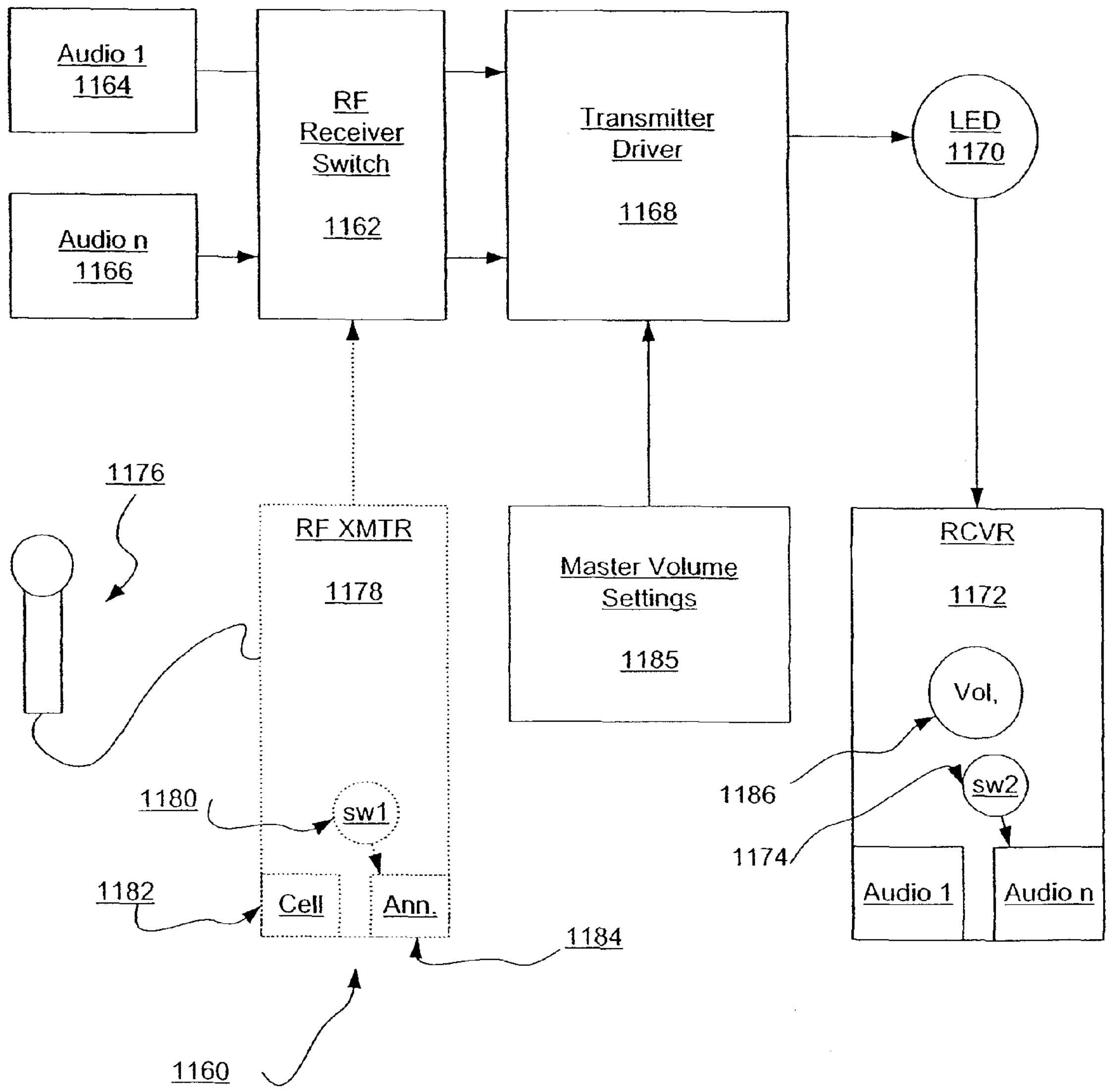
FIG. 28 is a block diagram of an alternate configuration in which an RF receiver is inserted between audio sources to cause audio received from an RF source to be played on the wireless headphones and a master volume setting may be used to override local volume settings in selected receivers.

Referring now to FIG. 28, a high level block diagram of system 1160 illustrates the use of RF receiver autoswitch 1162 between the inputs for multiple sources of audio input, such as audio 1 input 1164 and audio n input 1166, and transmitter driver 1168 which drives LED light source 1170. In normal operation, audio from sources 1164 and 1166 (and others if present) is applied by RF autoswitch 1162 to transmitter drive 1168 which drives LED 1170 to transmit light carrying information related to the audio produced by the sources. The light may be modulated by analog audio signals or the light may be encoded with a digital representation of the audio signals. The light produced by LED 1160 is applied to wireless receiver 1172 which may be a pair of headphones. Receiver 1172 includes channel selector switch 1174 which allows the user to selectively listen to one of the audio channels.

System 1160 may also include microphone 1176 which is connected to selective RF transmitter 1178 which includes selection switch 1180 operable in a first position, such as position 1182, to apply audio to and from a cell phone or similar device to transmitter driver 1168.

Selection switch 11180 is also operable in a second position, such as announce or page position 1184, to apply audio via RF transmitter 1178 to RF autoswitch 1162. In normal operation, audio from microphone 1176 is applied to the cell phone or similar device. When desired, the microphone user can operate switch 1180 to position 1184 as shown in FIG. 28 to cause the audio to be applied via RF receiver autoswitch 1162 to transmitter driver 1168 in lieu of audio from audio sources such as sources 1164 and 1166. In this mode of operation, the microphone user can talk directly to the headphone user to make announcements.

For example, system 1160 may be used in a vehicle in which one or more passengers are listening to audio channels they’ve selected from the audio sources available in the vehicle. The vehicle driver can use a microphone, such as a built in microphone for a hands free cell phone, to talk on the cell phone or selectively make announcements to the passengers without requiring them to take off the headphones.

RF transmitter 1178 may be normally in an off condition in which the audio from audio 1 1164 and audio n 1166 are combined in transmitter driver 1168 operating as a signal processor to provide a serial digital bitstream modulation of wireless signals provided by LED 1170, which may be a light transmitter or a transmitter operating at other frequencies. The digital signals transmitted by LED 1170 are in a serial bit stream format and are received by one or more receivers 1172. Local setting selector switch 1174 in normal operation may be used to manually select one or more audio inputs e.g. a monaural audio input or a pair of inputs forming a stereo input.

In an on condition, RF transmitter 1178 may be operated so that, in switch position 1184, the audio from microphone 1176 may be applied to all audio channels 1 through n provided each of a plurality of receivers 1172 via transmitter driver 1168. As a result, an airplane pilot or bus driver or similar master operator may operate switch 1180 into switch position 1182 and make an announcement which is supplied to all audio channels of receiver 1172. Receiver 1172 may be a plurality of headphones or other sound producing devices. Each person listening to one of the selected receivers 1172 will therefore hear the pilot or other announcement without regard to which audio channel is selected by receiver switch 1174.

Alternately, the audio from microphone 1176 may be applied to a preselected subset of the audio channels, even just a single channel, and a control signal included within the signals transmitted by LED 1170 will cause receiver 1172 to select the predetermined audio channel so that an announcement made with microphone 1176 is provided to all listeners.

Further, other sources of audio, such as prerecorded messages, may be applied via radio frequency transmitter 1178 to receiver switch 1162 in lieu of or in addition to microphone 1176 so that such prerecorded announcements may be made to all listeners without regard to the audio channel selection may be the users of each receiver 1172. Alternately, such prerecorded audio messages, or audio from another source may be provided directly to receiver switch 1162 without an RF connections. Some of the receivers 1172 may be used by listeners who do not have to hear the prerecorded announcement. In such cases, the control signal may be used to select the predetermined channel on which the announcement is made only in one subset of receivers 1172 and not in others.

Switch position 1184 for permitting a pilot or driver to make an announcement that takes precedence over the audio provided on the normally selected audio channels may be considered to be a master setting in that it affects the audio on all channels, or at least on a, subset of channels, that can be selected by the operators or users of receivers 1172. Master volume setting 1185 may also be used as a master setting. Receivers 1172 may conveniently include a volume setting specific to each receiver, such as local volume adjustment setting 1186, which is intended for use by and for the benefit of the operator of receiver 1172. In many situations, however, a master volume setting may provide additional benefits.

Master volume settings 1185 may provide control over the minimum, maximum or current volume settings of all or a selected one or subset of receivers 1172, overriding the locally selected volume setting 1186 from a convenient location by causing control codes related to a select one or group of receivers 1172 to be affected with such settings.

For example, when receivers 1172 are used in a family or group situation, master volume settings 1185 may be used to send control signals via transmitter driver 1168 to all, a selected subset or each separate receiver 1172 to override local volume setting 1186 in order to limit the maximum volume available from one or more specific receivers 1172. In this way, a parent may choose to limit the maximum volume a child wearing the headphones can use to listen to music to a safe level to protect the child's hearing. Similarly when receivers 1172 are headphones that may used by different people, master volume settings 1185 may be used to protect a subsequent user from a high local setting selected by a previous user. Master volume settings 1185 may also be used in the manner of announcement switch position 1184 to reduce the volume of the audio provide by one or more receivers 1172 so that announcement audio provided by another system made be heard by the user of the receiver 1172.

Similarly, for example on aircraft and in similar settings, some passengers may select a very low volume setting to permit them to fall asleep while listening to music. It may occasionally be necessary to permit the pilot to override such settings so that important announcements can be heard even if particular receivers 1172 are set at low volume levels. More commonly, passengers in aircraft and in similar settings may use local volume setting 1186 in lieu of an off switch to turn off receiver 1172. Periodically, perhaps before each flight, it may be advantageous to use master volume setting 1185, or an automatic subset of thereof, to reset each local volume setting 1186 in each receiver 1172 to a comfortable minimum setting so that a subsequent user will at least hear a minimum volume of the selected audio when first putting on the headphones or other receiver 1172.

Master volume settings 1185 may also be used to control the usage of selected ones of receivers 1172 for example to correspond to payment or other reasons for permitting selected users to listen to selected audio channels. For example, headphone receivers may be provided to all passengers but selected channels may be blocked by control signals transmitted by driver 1168 to correspond to movie or other channels for which payment to listen is required. A stewardess or other payment collector may then use master volume setting 1185 to unblock movie channel for a particular user upon receipt of payment. Similarly, master volume setting 1185 may be used in a setting such as a movie theater for language translation or in a museum setting for an audio guide to limit the duration of access to selected channels to correspond to proper payment or other permission mechanisms.

Figure 29:
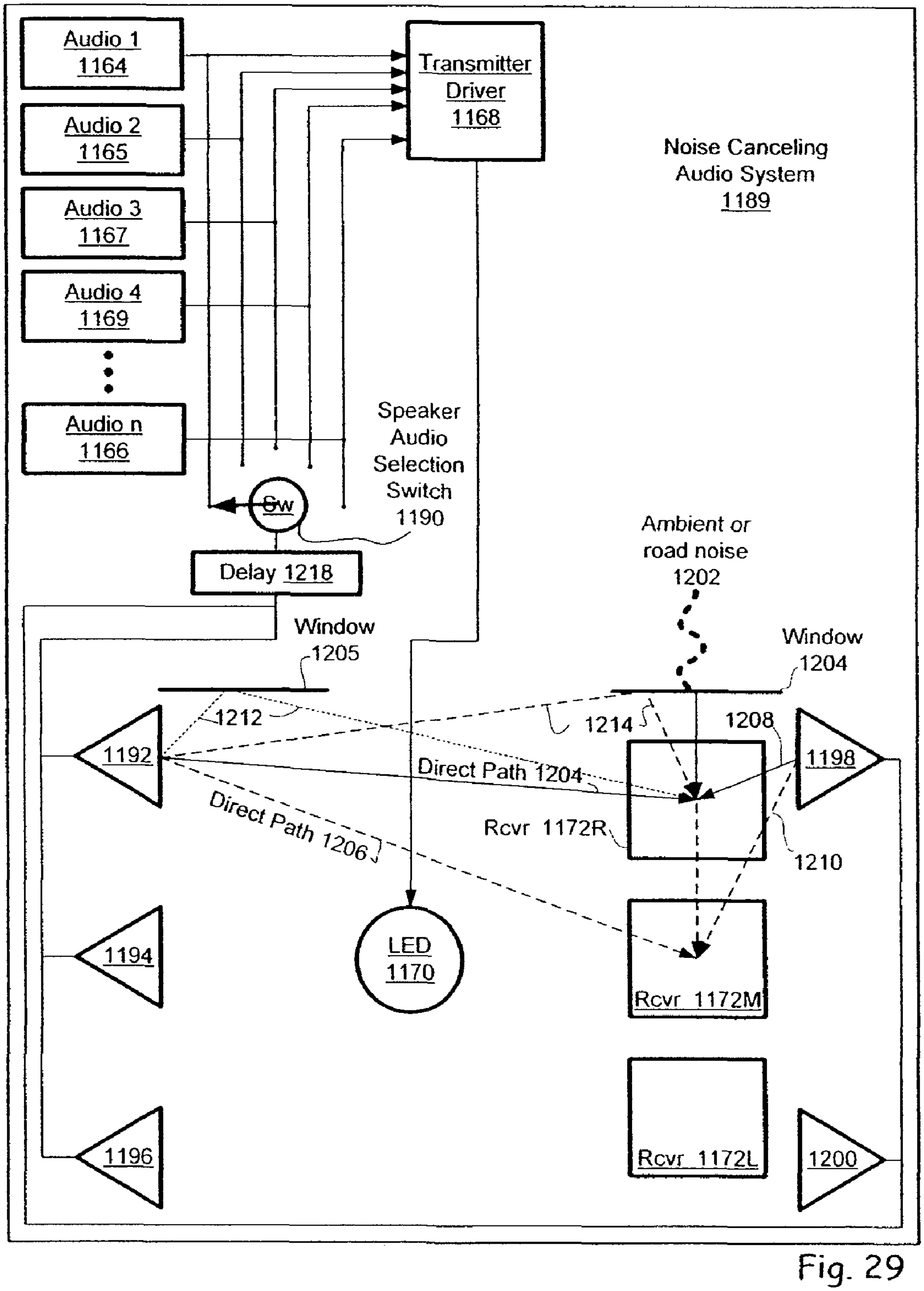
FIG. 29 is a block diagram schematic of a vehicle audio system illustrating path length differences to different receiver locations.

Referring now to FIG. 29, noise cancellation embodiments will be disclosed with regard to noise canceling audio system 1189 in which unwanted audio from speakers using a different selected channel, and/or road or other ambient noise such as engine noise, may be canceled or reduced in properly configured wireless headphone receivers playing a desired audio channel. In a typical use of the present system in a vehicle, such as a car, one of a plurality of channels, such as audio channels 1, 2, 3, 4 through n (shown as audio sources 1164, 1165, 1167, 1169 and 1168) may be available for selection by speaker selection switch 1190, for example associated with the head unit. Speaker audio selector switch 1190 may apply the selected audio to any number of fixed vehicle speakers such as front right, middle and left speakers 1192, 1194 and 1196 as well as rear right and left speakers 1198 and 1200. Speaker switch 1190 would typically be operated by the vehicle driver or a front seat passenger.

Audio channels 1, 2, 3, 4 through n may also be provided to transmitter driver 1168, possibly via intermediate electronic processing as described herein above. In order to illustrate one particular aspect of this embodiment, only 4 audio channels (that is less than the number of channels available via speaker selection switch 1190 for use by the various speakers) will be provided to transmitter driver 1168 and transmitted, for example, by infrared light via LED 1170, for wireless reception by various receivers such as headphones 1172. In a typical car, the person using headphone receiver 1172 may sit on the right, in the middle or on the left side of the car. These positions are illustrated by receiver positions 1172R, 1172M and 1172L.

It is not always practical to utilize headphones which completely block out ambient and other noises, so the person wearing or using headphones receiver 1172 will likely also hear some of the unwanted audio from the various speakers, discussed above, as well as ambient noise such as road and/or engine noise 1202 which may pass through the vehicle body, e.g. through car window 1204. The unwanted speaker audio and ambient noise will arrive along both direct paths from each of the speakers and via reflections, both of which vary depending upon the location of receiver 1172. For example, the speaker audio from right front speaker 1192 will arrive at headphones 1172R along direct path 1204 while the audio from right front speaker 1192 will arrive at headphones 1172M along a slightly longer direct path 1206. Similarly, the audio from right rear speaker 1198 will arrive at receiver 1172R along direct path 1208 and will slightly later arrive along direct path 1210 at receiver position 1172M. Further, road noise 1202 will arrive at receiver 1172R before it arrives at receiver 1172M. The difference in these path lengths means that the sounds will arrive at different receivers, or receiver positions, at slightly different times and therefore require slightly different compensation to reduce or cancel the unwanted audio.

In addition to different direct path lengths, the person wearing each receiver may also hear unwanted audio and/or other ambient noise via reflections from surfaces within the car such as reflections front window 1205, via reflected path 1212, and from reflections from other surfaces such as reflections from rear side window 1204 via reflected path 1214. In many implementations of this system, there may be many more speakers and reflective surfaces than illustrated in the figure. The above described direct and reflected sources of unwanted audio are used to illustrate some of the various differences in time of reception of unwanted audio from different speakers and different surfaces at different locations.

Conventional noise cancellation uses an audio pickup, such as a microphone, to obtain an analog audio input approximating ambient noise picked up by the microphone which is then subtracted from the analog audio signal provided to the headphone receiver. The primary unwanted audio or noise affecting the person wearing headphone receiver 1172 in system 1189 shown in FIG. 29 may be the audio provided by speakers 1192, 1194, 1196, 1198 and 1200 (or however many speakers are present in the vehicle) and/or road noise. Noise canceling audio system 1189 may take advantage of the multiple channels of digital audio available to headphone receiver 1172 by using the digital audio signal driving the speakers (shown as speaker audio 1230 in FIG. 30), or some modified version of it, for use for example in receiver 1172 to help cancel the unwanted speaker noise that reaches the person wearing headphone receiver 1172. Analog ambient noise, such as road or engine noise, may then be canceled from the analog audio applied to headphones 1172.

Using the digital version of the unwanted speaker audio to help cancel the unwanted speaker audio reaching the headphone user provides advantages because the digital signal is a much more accurate copy of the unwanted audio than is available by using a typical analog microphone in a typical noise canceling system. Microphones may be located in the vicinity of each earpiece of the receiver to provide timing and amplitude correction factors based on the digital audio driving the speakers in order to create an unwanted audio or speaker "anti-noise" signal which can then be combined with the desired digital audio signal being reproduced by the headphone receiver to cancel the noise, that is, to cancel the undesired speaker audio reaching the person using the headphones. Further, the analog signal from the microphones in each earpiece of the wireless headphone receiver can also be processed to produce an ambient anti-noise signal which can be used to cancel ambient noise, such as road or engine noise, for the person wearing the headphone receiver.

In the simplest case, the audio channel selected by switch 1190 to drive the speakers may also be available via transmitter driver 1168 and transmitter 1170 as one of the audio channels applied, for example, to headphone receiver 1172. Headphone receiver 1172 may determine which such channel is being used to drive the speakers and process that signal, with suitable corrections, to provide an anti-noise audio signal for subtraction from the signal selected for driving the sound output of headphone receiver 1172. The selection by switch 1190 may be conveniently used to inform headphone receiver 1172 by for example including such information, e.g. setting a bit or flag, in the digital bitstream applied by transmitter 1170.

As noted above, there may be more (or different) channels available via selection switch 1190 for use in driving the speakers than are available to headphones 1172 via digital bitstream 1224. In this more general case, it may be advantageous to include a specific channel of audio data transmitted via transmitter 1170 to headphones 1172 which provides a suitable copy or replica of the audio selected to drive the speakers. For example, in system 1189 channels 1 to a n (where n may be greater than 4) may be selected by switch and the audio channels which may be applied to receiver 1172 are limited, perhaps by available bandwidth or other system considerations, to a total of four channels. In this example, three of the four channels applied to headphones 1172 would be selected from the n channels available. The fourth channel applied to wireless headphone receiver 1172 may always be the speaker audio signal (which may conveniently be a pair of audio signals constituting a stereo signal or the like) selected by speaker selection switch 1190. In this embodiment, the audio channel necessary for noise cancellation in headphones 1172 of the audio provided to the fixed vehicle speakers will be available when needed in the audio applied to headphone 1172 and the placement of this audio on a specified channel, such as the fourth channel, may provide the information to headphones 1172 that this is the audio being played through the vehicle speakers.

By using the digital audio signal used to drive the fixed vehicle speakers (i.e. speaker audio 1238 shown in FIG. 30) as the basis for the anti-noise signal to be canceled or subtracted from the desired digital audio signal used to drive the headphone receiver (for example by shifting the relative phase by 180°), the accuracy of the cancellation may be increased over that achievable by producing the cancellation signal from an analog microphone pickup (such as microphones 1246 or 1247 of FIG. 30), especially if the analog microphone pickups are not of the highest quality. In addition to using the digital speaker audio to produce the cancellation audio, it may be desirable to synchronize the cancellation or anti-noise signal with the unwanted audio actually heard locally by the person using headphone receiver 1172 and to compensate for other phase and amplitudes variations resulting from direct and reflected air path length differences from the various speakers and reflecting surfaces to headphone 1172 as well as changing head positions for the wearer of the headphones. The speaker audio and cancellation audio may be at least partially synchronized by adding a delay related to or greater than the air path length delay from the closest speaker or reflector to headphone 1172.

As shown in the figure, one simple improvement in synchronization may be made by adding delay 1216 in an appropriate path so that the cancellation signal may be available after processing in a timely fashion at headphone receiver 1172. Delay 1216 may be added in the signal path to front speakers 1192, 1194 and 1196 while the rear speakers are driven by the same audio signals without delay. This approach may be useful if desired for other reasons, such as synchronizing the speaker audio for passengers in the front seats by delaying the sounds received from the front seat speakers, e.g. in a large vehicle. Alternately, or in addition, delay 1218 may be used in the signal path driving all speakers. Similarly, delays can be inserted in various locations through out the audio systems shown in earlier figures if desired.

It may also be desirable to compensate or adjust the cancellation audio for the location of headphones 1172. Once the location of headphones relative to the speakers is determined, the phase and amplitude of the audio received from the speakers via direct and indirect or multipath paths may be used to adjust the cancellation audio. In addition it may be desirable to cancel or compensate for other ambient noise such as road noise 1202.

Figure 30:
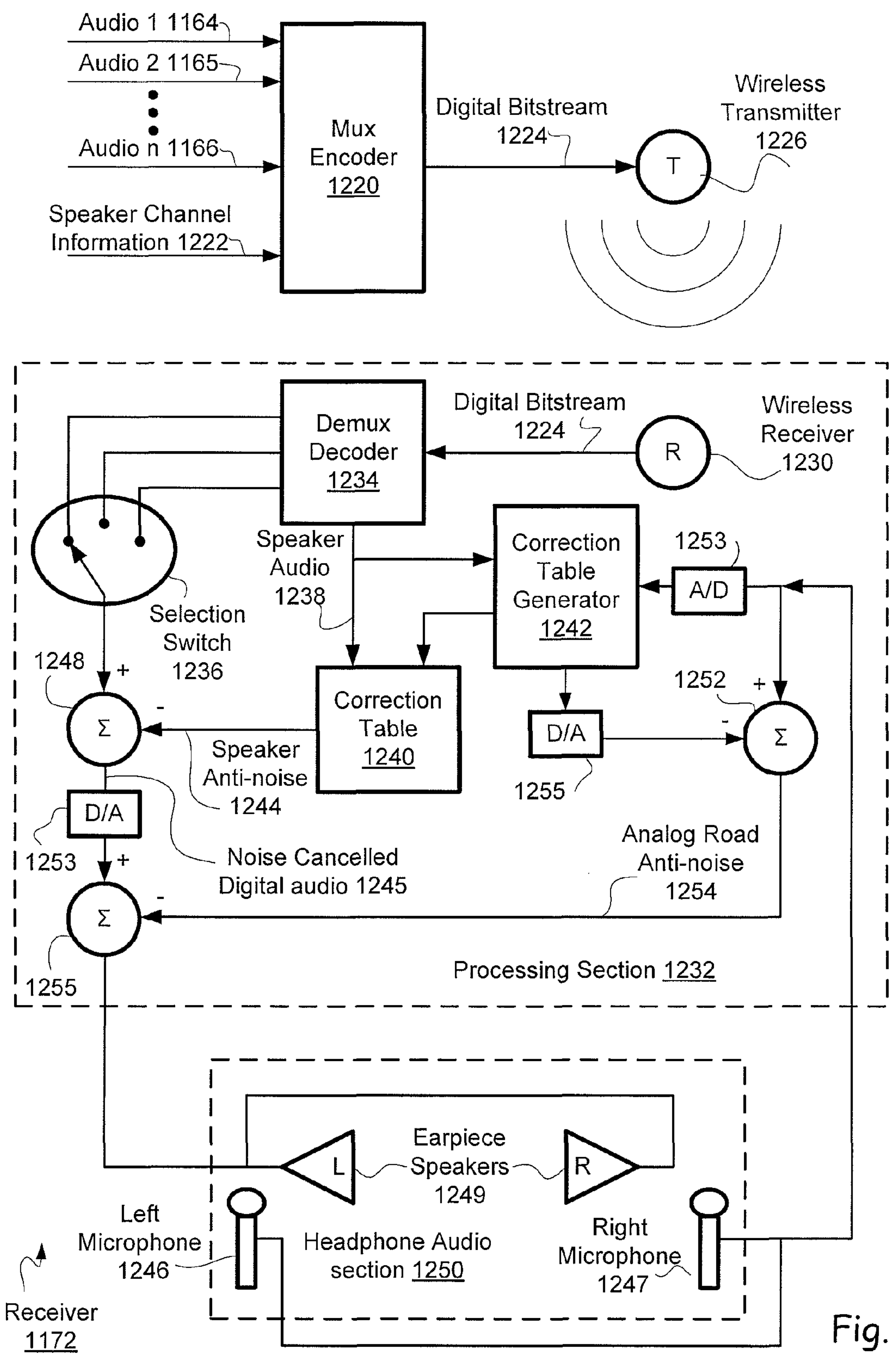
FIG. 30 is a block diagram of a noise canceling audio system.

Referring now to FIG. 30, a plurality of audio channels such as channels 1164, 1165 and 1166, together with speaker channel information 1222, are received and processed by multiplexer encoder 1220 to produce digital bitstream 1224 which is applied to wireless transmitter 1226. Speaker channel information 1222 may include an identification of an audio channel, already applied to mux encoder 1220, which has been selected by speaker selection switch 1190 shown in FIG. 29. Alternately, speaker channel information 1222 may be the actual audio channel being played through the vehicle speakers. In a preferred embodiment, the speaker channel audio may always be positioned on the same audio channels provided in digital bitstream 1224 and/or each channel may include a flag which when present indicates that the channel is being played on the speakers.

Wireless transmitted digital bitstream 1224 is recovered by wireless receiver 1230 in audio and noise processing section 1232 of receiver 1172 and the resultant noise suppressed audio will be applied to and played by headphone speaker section 1250 of receiver 1172. Demultiplexer decoder 1234 recovers the several audio channels which are applied to receiver audio selection switch 1236 and also recovers speaker audio 1238 which is applied to multipath correction table generator 1242 and/or correction tables 1240. Correction tables 1240 may also receive seat location information 1242. Multipath correction table 1240 contains the information necessary to adjust speaker audio 1238 to form speaker anti-noise signals 1244 which are combined in noise canceller 1248 in a conventional manner, for example, by subtracting a copy of the noise, that is, the audio received by receiver 1172 from the speakers, shown speaker anti-noise 1244, from the audio selected in headphone channel selector switch 1236. In this way, the audio applied to the left and right headphone earpiece speakers 1249 in audio production section 1250 of receiver 1172 will be heard by the user with the undesired audio from the vehicle speakers effectively cancelled.

Referring now also to FIG. 29, correction tables 1240 may be used to compensate speaker anti-noise signals 1244, produced from speaker audio 1238, for the differences in path lengths from the various vehicle speakers resulting from the location of receiver 1172, which may, for example, be in the left, middle or right side of the vehicle backseat. Data used in correction table generator 1242 may include data for each speaker in the car or for groupings of such speakers relative to one or more seat locations. It is important to note that anti-noise or correction tables 1240, or other mechanism for compensating for the speaker audio including the different path lengths from the speakers to receiver 1172, are applied to the same digital bitstream audio, as selected by switch 1236, originally applied as a digital channel to mux encoder 1220.

Correction table generator 1242 may identify the location of receiver 1172 relative to the fixed audio sources, such as the vehicle speakers 1192, 1194, 1196, 1198 and 1200, to determine the location of receiver 1172, for example, the right, middle or left seat locations identified as receivers 1172R, 1172M and 1172L shown in FIG. 29. In some embodiments, an audio microphone such as microphone 1246 may be used to pickup the unwanted speaker audio in one or more seat positions to help identify the location of wireless receiver and/or identify the audio channel applied as speaker audio 1238 if not otherwise identified. Although such fixed position microphones may be used for cancellation, it may also be advantageous to use one or more microphones, such as left and right microphones 1246 and 1247 attached to receiver 1172 as shown in FIG. 30, to detect the speaker and/or ambient noise actually heard by the user of headphones 1172. In this way, receiver 1172, which may preferably be a wireless headphone, may be used in any seat position. A further advantage of associating microphones 1246 and 1247 directly with each receiver 1172 is that rotation or other change of position of receiver 1172 such as when the user turns to look at a vehicle window, may be detected and used to improve the accuracy of the noise cancellation, if desired, by adjustment of the tables or other data in correction table 1240 to better compensate speaker audio 1238 for the orientation of receiver 1172 relative to the fixed vehicle speakers.

Microphones 1246 and 1247 may also be used to detect ambient noise, such as road noise, for further noise cancellation in receiver 1172. The outputs of microphones 1246 and 1247 may preferably be processed as separate channels.

The output of the noise canceling microphones 1246 and 1247 are applied via one or more analog to digital (A/D) converters 1253 to correction table generator 1242 which uses calibration data related to the path lengths from the various speakers and reflectors to determine correction factors to be applied to speaker audio 1238 to create speaker anti-noise data signal 1244. To provide a simple example, if there was only one speaker playing the unwanted audio selected by speaker selection switch 1190 (FIG. 29), and one earpiece speaker 1249 in headphone audio section 1250 of receiver 1172, correction table generator 1242 would create a simple entry in correction table generator 1242 which would create a speaker anti-noise signal 1244 from speaker audio 1238 having an opposite phase thereto and a magnitude and delay. The magnitude would represent the amplitude of the unwanted speaker audio arriving as sound through the air at the location of headphones 1172. The delay would represent the length of path from the speaker to headphones 1172.

In a typical vehicle, such as an auto, there will be multiple speakers. In a preferred embodiment there may be pair of left earphone and right earphone correction table entries required for each speaker. Additional pairs of entries may be required for reflections of the speaker audio, for example, from windows. The number of correction table entries may be reduced by grouping speakers according to distance from receiver 1172 and/or by grouping speakers according to frequency ranges such as treble, midrange and base. Correction table entries provide digital speaker anti-noise signals 1244, which when applied to canceller 1248 with the output of channel selector switch 1236, produce noise cancelled digital audio 1245 which can be applied to receiver 1172. Each table entry may consist of a magnitude and a delay.

Additional improvement to the audio produced by headphones 1172 can be achieved by canceling ambient road (or engine) noise from digital audio 1245 before that audio is applied to receiver 1172. In particular, analog road anti-noise signal 1254 may be applied to canceller 1255 to remove road noise from digital audio 1245. The signals applied by right and left microphones 1246 and 1247 to A/D converter 1253 include both the unwanted speaker and ambient road or engine noise which reaches headphone 1172 through the air. The unwanted speaker noise is removed from the analog microphone outputs applied to canceller 1252 to produce anti-road noise signals 1245. The speaker anti-noise signals may be provided by correction table generator 1242, via digital to analog (D/A) converter 1255 as shown, or from correction table 1240.

Figure 31:
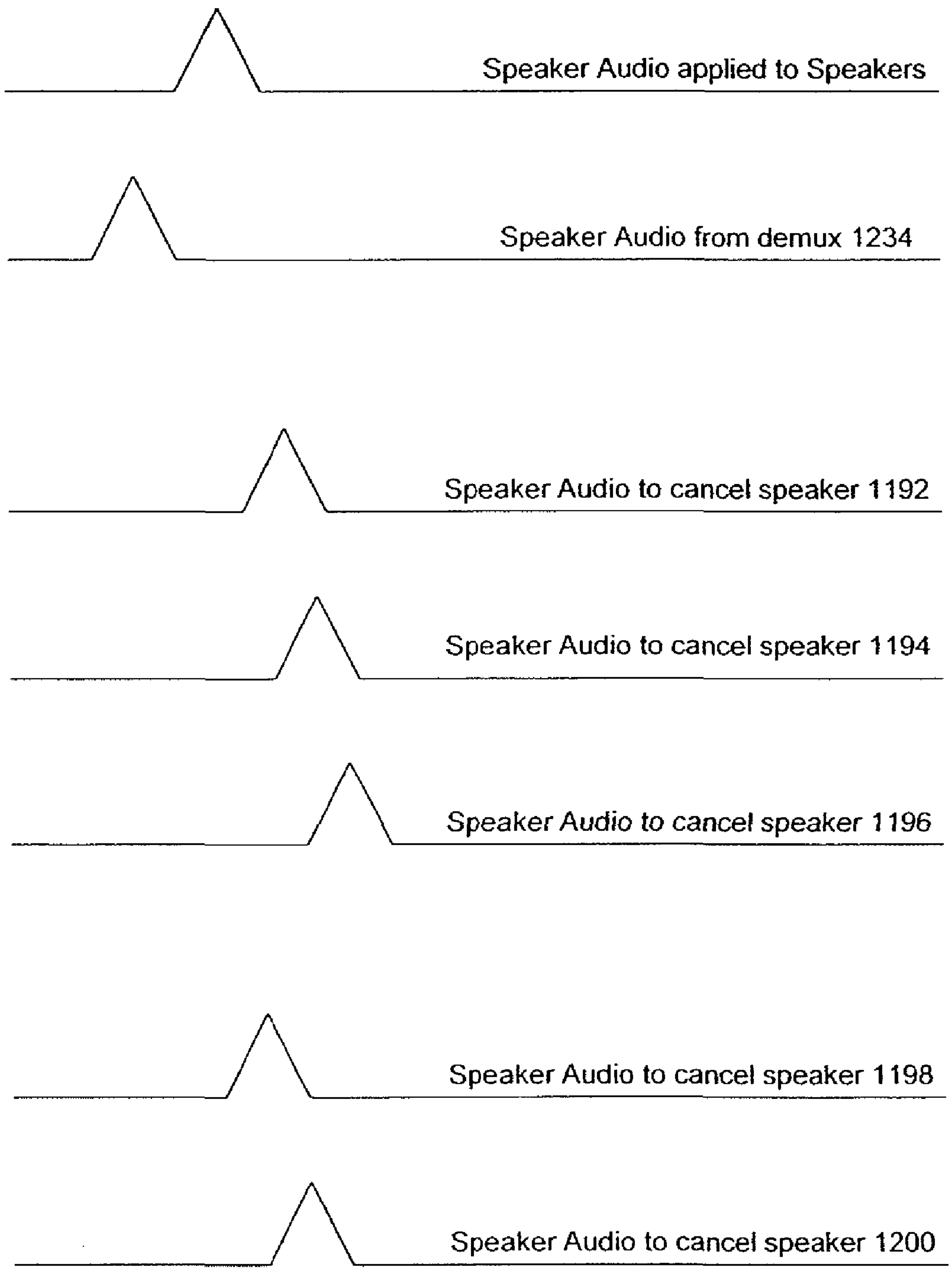
FIG. 31 is a graph illustrating the timing of the speaker audio at various locations for use in the multipath correction tables.

Referring now to FIG. 31, a series of graph lines are shown representing the timing (or path length delay) of a particular point in speaker audio 1238, shown as the apex of a triangle for simplicity at various locations. In particular, speaker audio 1238 applied from demux/decoder 1234 to correction tables 1240 is shown occurring at the earliest time. The speaker audio at the output of delay 1218 applied to the fixed vehicle speakers may be delayed so that any processing required in correction table 1242 to create speaker anti-noise signals 1244 may be accomplished before the audio from the various speakers reaches wireless headphones 1172 through the air.

Speaker anti-noise signals 1244 are a collection of variously delayed versions of speaker audio 1238, typically 180° out of phase with speaker audio 1238, each timed to be applied to audio section 1250 to occur in synchronization with the arrival through the air of the audio from a selected speaker and of sufficient magnitude to cancel the speaker audio receiver as heard by the headphones user. The audio from speaker 1198 would arrive at wireless headphones 1172R before the audio from any other speaker because the travel path is the shortest. Thereafter, the speaker audio from speaker 1200 would arrive. Depending on the dimensions of the vehicle, the speaker audio from speaker 1192 could arrive at about the same time, while the speaker audio from speakers 1194 and 1196 would arrive at a later time. Correction tables 1240 may simply be a table of transforms, applied to the digital audio signal representing speaker audio 1238, to delay the noise canceling versions of the speaker audio so that each such version arrived at the proper time, and at the proper magnitude, to cancel the audio from that speaker. The amplitude factor may be applied to compensate for the reduction in amplitude of the front seat speakers, relative to the rear seat speakers, when heard by the person wearing wireless headphones 1172.

Depending upon the configuration and placement of the various speakers, it may be satisfactory to simply form groups of the speakers so that fewer transforms are required. For example, all the front speakers might be grouped with a delay representing the average delay of that group, e.g. at the delay appropriate to cancel the speaker audio from speaker 1194 but with an amplitude related to the sum of the amplitudes of the audio from the speakers in the group. The audio ranges of the audio from the various speakers may also be treated differently. In some applications, the mid and high ranges of the audio from various speakers may be treated by individual transforms while the lower or base ranges of the audio may be grouped at a common delay.

It is important to note that the above described delay and/or amplitude transforms for the various speakers are applied to a digital version of speaker audio 1238 decoded from digital bitstream 1224 to produce speaker anti-noise signals 1244 while ambient anti-noise signals 1254 may be analog signals.

Referring now also to FIG. 30, microphones 1246 and 1247 may be utilized to develop or determine the various transforms required in multipath correction 1240 for the various speaker locations. A detectable signal may be generated by the speakers and will arrive at microphone 1246 and 1247 at different times. These different times may be determined by transmitting an identifiable signal, such as a tone or other pattern of detectable audio, from the speakers and detecting their magnitudes and times of arrival at headphones 1172 to develop the transforms needed for correction tables 1240 with regard to speaker anti-noise 1244. Alternately, the transforms may be determined for particular vehicle and speaker locations under laboratory or manufacturing conditions and stored for later use in multipath correction 1240 for all similar vehicle and speaker configurations. Reflected speaker audio, such as the speaker audio arriving at receiver 1172R along path 1214, may also be detected by microphones 1246 and 1247 so that appropriate transforms may be added to correction tables 1240 to cancel this portion of the speaker audio. Correction table generator 1242 and correction tables 1240 may be implement by a single digital signal processor (DSP) or similar device.

We claim:

1. A noise canceling wireless audio distribution system, comprising:

a selection switch for selecting a speaker audio channel, from a plurality of audio channels, to be played on a plurality of speakers in a vehicle;

a wireless transmitter for transmitting an uncompressed serial digital bitstream on a single communication channel, the uncompressed serial digital bitstream including at least a subset of the plurality of audio channels combined with digital control codes;

a wireless receiver responsive to the uncompressed serial digital bitstream for selecting, and playing on a headset associated with the wireless receiver, a headset audio channel from the plurality of audio channels; and a noise cancellation processor in the headset, for canceling noise related to the playing of the speaker audio channel on the speakers while the headset audio channel is played on the headset in accordance with the control codes in the uncompressed serial digital bitstream, by subtracting speaker anti-noise signals related to the wirelessly received speaker audio channel from the headset audio channel being played.

2. The invention of claim 1 wherein operation of the selector switch to select the speaker audio channel causes the speaker audio channel to be identified by the wireless receiver in the serial bitstream.

3. The invention of claim 2 wherein operation of the selector switch to select the speaker audio channel causes the speaker audio channel to be included in the serial bitstream in a known position related to the other audio channels.

4. The invention of claim 1 wherein the noise cancellation processor further comprises: a correction table for modifying the wirelessly received speaker audio channels, in accordance with a path between the headset and at least one of the plurality of speakers, to develop the anti-noise signals.

5. The invention of claim 4 further comprising: at least one microphone associated with the headset for detecting ambient audio.

6. The invention of claim 5 wherein characteristics of the path are applied to the correction table in response to the detected ambient audio.

7. The invention of claim 5 wherein the noise cancellation processor further comprises: a correction table generator for controlling the correction table in accordance with the wirelessly received speaker audio.

8. The invention of claim 5 wherein correction table generator is responsive to ambient audio to produce an analog anti-noise signal to be subtracted from the headset audio channel.

9. The invention of claim 8 further comprising: a digital to analog converter for converting the headset audio channel, after the speaker anti-noise signals have been subtracted therefrom, to analog signals so that the analog anti-noise signals can be subtracted therefrom to produce analog headset audio to be played by the headset.

10. A noise canceling wireless audio distribution system, comprising:

a selection switch configured to select a first audio source from a plurality of audio sources for play by one or more speakers in a vehicle;

a transmitter connected to the plurality of audio sources, wherein the transmitter is configured to wirelessly transmit an uncompressed serial digital bitstream on a single channel, the uncompressed serial digital bitstream comprising:

an audio signal from the first audio source;

an audio signal from at least one of the other of the plurality of audio sources; and digital control codes;

a wireless receiver responsive to the uncompressed serial digital bitstream, wherein the wireless receiver is configured to select, from the uncompressed serial digital bitstream, the audio signal from the at least one of the other of the plurality of audio sources for play by a headset associated with the wireless receiver; and a noise cancellation processor in the headset, wherein the noise cancellation processor is configured to:

generate an anti-noise signal based on the audio signal from the first audio source; and subtract the anti-noise signal from the audio signal selected by the wireless receiver to cancel noise associated with the play of the first audio source by the one or more speakers while the audio signal selected by the wireless receiver is played on the headset in accordance with the control codes in the uncompressed serial digital bitstream.

* * * * *